United States Patent Office 3,375,261
Patented Mar. 26, 1968

3,375,261
RING A UNSATURATED-20-OXO-11,17-BIS-OXY-GENATED 16-METHYL-STEROIDS OF THE PREGNANE SERIES
Glen E. Arth, Cranford, David Johnston, Warren Township, Somerset County, and Lewis H. Sarett, Princeton, N.J., assignors to Merck & Co., Inc., Rahway, N.J., a corporation of New Jersey
No Drawing. Continuation-in-part of application Ser. No. 642,655, Feb. 27, 1957. This application July 8, 1966, Ser. No. 563,658
27 Claims. (Cl. 260—397.45)

This is a continuation-in-part of applications Ser. No. 642,655, filed Feb. 27, 1957, now abandoned; Ser. No. 752,180, filed July 31, 1958, now abandoned; and Ser. No. 457,792, filed May 21, 1965, now abandoned; said Ser. No. 457,792 is a continuation-in-part of Ser. No. 103,187, filed Apr. 17, 1961, now abandoned, which, in turn, is a continuation-in-part of Ser. No. 753,407, filed Aug. 6, 1958, now abandoned, and Ser. No. 810,996, filed May 5, 1959, now abandoned; and said Ser. No. 810,996 is a continuation-in-part of Ser. No. 753,408, filed Aug. 6, 1958, now abandoned.

This invention is concerned generally with novel steroid compounds and with processes of preparing the same. More particularly, it relates to novel 17-oxygenated-20-keto-steroids of the pregnane series having a methyl substituent attached to the C–16 carbon atom, and to novel processes for preparing these 16-methyl-17-oxygenated-20-keto-pregnanes starting with 20-keto-pregnanes having a $\Delta^{16}$-double bond. These 16-methyl-17-oxygenated-20-keto-pregnanes include both nuclear saturated and unsaturated compounds, as for example 16-methyl-17-oxygenated-3,20-diketo-1,4-pregnadienes, 16-methyl-17-oxygenated-3,20-diketo-4-pregnenes, and the like. These novel 16-methyl-17-oxygenated-20-keto-pregnanes, particularly those having ring A nuclear unsaturation, possess extremely high anti-inflammatory activity, and are especially effective for the treatment of arthritis and related diseases since they can be administered for their cortisone-like action in extremely low dosage thereby minimizing undesired side effects.

The novel 16-methyl-17-oxygenated-20-keto-steroids of the pregnane series subject of the present invention include, as a preferred embodiment thereof, the 16-methyl-11,17-bis-oxygenated-steroid-3,20-diones having the following formula:

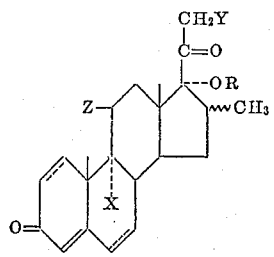

wherein X is hydrogen or halo, Y is hydrogen, hydroxy or lower hydrocarbon carboxylic acyloxy, Z is keto or hydroxy, R is hydrogen or lower hydrocarbon carboxylic acyl, and the dotted lines in rings A and B indicate that a double bond or bonds may be present in the 1,2- and/or 6,7-positions.

The 16-methyl-11,17-bis-oxygenated-steroid-3,20-diones unsaturated at $\Delta^{1,4}$ are conveniently prepared by contacting the corresponding 16-methyl-11,17-bis-oxygenated 4-pregnene-3,20-dione with the dehydrogenating activity of microorganisms of the class Schizomycetes, which includes microorganisms belonging to the orders Actinomycetales and Eubacteriales. The preferred Eubacteriales include microorganisms of the genus Acetobacter, the genus Aerobacter, and the genus Bacillus; the preferred Actinomycetales include microorganisms of the genus Nocardia and the genus Mycobacterium. We particularly prefer to employ microorganisms of the class Schizomycetes belonging to the following species, namely: Acetobacter xylinum, Aerobacter aerogenes, Bacillus sphaericus, Nocardia erythropolis, Nocardia blackwellii, Nocardia asteroides, Nocardia minima, Nocardia globerula, Nocardia leishmanii, Nocardia formica, Nocardia convoluta, Nocardia corallina, and Myobacterium smegmatis, Mycobacterium phlei, Mycobacterium lacticola, and Mycobacterium tuberculosis. The species Bacillus sphaericus, as defined in Bergey's Manual for Determinative Bacteriology, Sixth edition, comprises several varieties such as the rotana variety, the fusiformis variety, etc., and, in some collections, these varieties are referred to by the species names Bacillus rotana and Bacillus fusiformis. These microorganisms of the class Schizomycetes can be obtained from known sources such as the American Type Culture Collection, Washington, D.C., or they may be isolated from natural sources, such as soil, by known methods.

It is desired to emphasize that for any given species of Schizomycetes, the preferred dehydrogenating strains can be selected by the following test method: A nutrient medium containing 1 g. of cerelose, 1 g. of edamin, 0.25 ml. of cornsteep liquor, 0.05 g. of yeast extract, and sufficient distilled water to make 50 ml., is adjusted to pH 6.5, sterilized and inoculated with a culture of the particular microorganism strain to be tested for its $\Delta^1$ dehydrogenating activity. The resulting culture is incubated for a period of 24 hours at a temperature of 28° C., and a sample of the culture is transferred to a second 50 milliliter sample of the aforementioned nutrient medium which has likewise been adjusted to pH 6.5 and sterilized. The resulting inoculated culture is then incubated at a temperature of 28° C., with agitation, for a 24-hour period, and to the resulting culture is added a solution containing 10 mg. of hydrocortisone dissolved in 0.1 ml. of dimethylformamide. The culture containing the steroid compound is incubated, with agitation, for an additional period of about 10 hours at 28° C. The fermentation broth is repeatedly extracted with ethyl acetate, and the ethyl acetate extracts are combined and evaporated to dryness in vacuo. A portion of the residual material is dissolved in acetone and spotted on a paper chromatogram which is developed using formamide as the stationary phase and chloroform as the mobile phase. Two separate bands are ordinarily obtained, the lower band corresponding to unchanged hydrocortisone; the upper band corresponds to the $\Delta^1$-dehydro derivative. Both bands are cut off, separately eluted with methanol, and each of the methanol eluants are subjected to ultraviolet absorption analysis. The efficiency of the microorganism strain being tested in effecting $\Delta^1$-dehydrogenation is indicated by the relative proportions of $\Delta^1$-dehydro derivative and unchanged hydrocortisone as measured by this ultraviolet absorption analysis.

The novel, presently invented ring A unsaturated 16-methyl-11,17-bis-oxygenated-20-keto-steroids of the pregnane series also include, as a preferred embodiment, the 16-methyl-11-(keto or hydroxy)-4-pregnene-17α,21- diol-3,20-diones which may be chemically represented as follows:

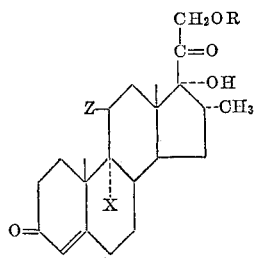

wherein X is hydrogen or fluoro, R stands for hydrogen or lower hydrocarbon carbonyl, and Z is a keto or hydroxy substituent. These 16-methyl-11-oxygenated-4-pregnene-17α,21-diol-3,20-diones, which themselves possess extremely high anti-inflammatory activity, and which are also useful as starting materials in the process hereinabove described, are conveniently prepared starting with the known 16-pregnene-3α-ol-11,20-dione 3-acetate in accordance with the following procedure: 16-pregnene-3α-ol-11,20-dione 3-acetate is reacted with methyl magnesium iodide in the presence of cuprous chloride thereby forming 16α-methyl-pregnane-3α-ol-11,20-dione 3-acetate, which is reacted with aqueous methanolic hydrochloric acid to form 16α-methyl-pregnane-3α-ol-11,20-dione. The latter compound, which is a potent anesthetic, is reacted with acetic anhydride in the presence of p-toluene sulfonic acid catalyst to form a mixture of enol acetates containing 16α-methyl-17,20-pregnene-3α,20-diol-11-one 3,20-diacetate; this mixture, after chromatographic purification to remove any unchanged starting material, is reacted with perbenzoic acid and the resulting 16α-methyl-17,20-epoxy-pregnane-3α,20-diol-11-one 3,20-diacetate is hydrolyzed with methanolic potassium bicarbonate to produce 16α-methyl-pregnane-3α,17α-diol-11,20-dione. The latter compound is reacted with bromine in chloroform to form 21-bromo-16α-methyl-pregnane-3α,17α - diol-11,20-dione which is reacted with sodium iodide in acetone to produce 21-iodo-16α-methyl-pregnane-3α,17α-diol - 11,20-dione which is converted without isolation to 16α-methyl-pregnane-3α,17α,21-triol-11,20-dione 21-acetate by reaction with anhydrous potassium acetate; this compound is reacted with chromium trioxide in pyridine to form 16α-methyl-pregnane-17α,21-diol-3,11,20-trione 21 acetate. The 16α-methyl-pregnane-17α,21-diol-3,11,20-trione 21 acetate is reacted with bromine in glacial acetic acid-chloroform to produce 4-bromo-16α-methyl-pregnane-17α,21-diol-3,11,20-trione, which is then reacted with semicarbazide to form 16α-methyl-4-pregnene-17α,21-diol-3,11,20-trione 3,20 - bis-semicarbazone 21 - acetate. This 3,20-bis-semicarbazone is reacted with sodium borohydride to form 16α-methyl-4-pregnene-11β,17α,21-triol 3,20-dione 3,20-bis-semicarbazone which is hydrolyzed under acid conditions to form 16α-methyl-4-pregnene-11β,17α,21-triol-3,20-dione; this compound is reacted with esterifying agents as for example benzoic anhydride or lower alkanoic anhydrides to form the corresponding 21-ester derivatives.

The 16α-methyl-4-pregnene-17α,21-diol-3,11,20-trione-3,20-bis-semicarbazone 21-acetate is reacted with potassium bicarbonate or potassium hydroxide in aqueous methanol to form 16α-methyl-4-pregnene-17α,21-diol-3,11,20-trione 3,20-bis-semicarbazone which is then hydrolyzed under acid conditions to produce 16α-methyl-4-pregnene-17α,21-diol 3,11,20-trione 21-free alcohol; this compound is esterified using the above-mentioned esterifying agents to produce the corresponding 21-ester derivatives.

The 16α-methyl-4-pregnene-11β,17α,21-triol - 3,20-dione, upon reaction with acetic anhydride in pyridine, gives the corresponding 21-acetate which is reacted with methane sulfonyl chloride followed by potassium acetate, or phosphorus oxychloride, to produce 16α-methyl-4,9(11)-pregnadiene-17α,21-diol-3,20-dione 21-acetate; the latter compound is reacted with hypobromous acid to produce 9α-bromo-16α-methyl-4-pregnene-11β,17α,21-triol - 3,20-dione 21-acetate which is reacted with anhydrous potassium acetate in ethanol to produce 16α-methyl-9,11-epoxy-4-pregnene-17α,21-diol-3,20-dione 21-acetate. This 9,11-epoxide is then reacted with hydrogen fluoride in tetrahydrofuran to produce 16α-methyl-9α-fluoro-4-pregnene-11β,17α,21-triol-3,20-dione 21-acetate; this compound is reacted with a hydrolyzing agent to form 16α-methyl-9α-fluoro-4-pregnene-11β,17α,21-triol - 3,20 - dione 21-free alcohol. This 21-free alcohol is reacted with esterifying agents such as benzoic anhydride, lower alkanoic anhydrides and the like to form the corresponding 21-ester derivatives.

The 16α-methyl-9α-fluoro-4-pregnene-11β,17α,21-triol-3,20-dione 21-acetate is reacted with chromium trioxide in pyridine to form 16α-methyl-9α-fluoro-4-pregnene-17α,21-diol-3,11,20-trione 21-acetate which, upon reaction with a hydrolyzing agent, forms 16α-methyl-9α-fluoro-4-pregnene-17α,21-diol-3,11,20-trione 21-free alcohol. This 21-free alcohol is reacted with esterifying agents such as benzoic anhydride, lower alkanoic anhydrides and the like to form the corresponding 21-ester derivatives.

Thus, these presently invented 16-methyl-11-oxygenated-4-pregnene-17α,21-diol-3,20-dione compounds include 16α-methyl-4-pregnene-17α,21-diol-3,11,20-trione and 21-esters thereof, and particularly 21-lower hydrocarbon carbonyl esters as for example 16α-methyl-4-pregnene-17α,21-diol-3,11,20-trione 21 - benzoate; 16α - methyl-4-pregnene-17α,21-diol-3,11,20-trione 21-lower alkanoates such as 16α-methyl-4-pregnene-17α,21-diol-3,11,20-trione 21-acetate; 16α-methyl-4-pregnene-17α,21-diol - 3,11,20-trione 21-propionate; 16α-methyl-4-pregnene-11β,17α,21-triol-3,20-dione and 21-esters thereof, and particularly 21-lower hydrocarbon carbonyl esters as for example 16α-methyl-4-pregnene-11β,17α,21-triol-3,20-dione 21 - benzoate; 16α-methyl-4-pregnene-11β,17α,21-triol-3,20-dione 21-lower alkanoates such as 16α-methyl-4-pregnene-11β,17α,21-triol-3,20-dione 21-acetate; 16α-methyl-4-pregnene - 11β,17α,21-triol - 3,20 - dione 21-propionate; 16α-methyl-9α-fluoro-4-pregnene-17α,21-diol-3,11,20 - trione and 21-esters thereof, and particularly 21-lower hydrocarbon carbonyl esters as for example 16α-methyl-9α-fluoro-4-pregnene-17α,21-diol-3,11,20-trione 21-benzoate; 16α-methyl-9α-fluoro-4-pregnene-17α,21-diol-3,11,20 - trione 21-lower alkanoates such as 16α-methyl-9α-fluoro-4-pregnene-17α-21-diol-3,11,20 - trione 21 - acetate; 16α-methyl-9α-fluoro-4-pregnene-17α,21-diol - 3,11,20 - trione 21-propionate; 16α-methyl-9α-fluoro-4-pregnene-11β,17α, 21-triol-3,20-dione and 21-esters thereof, and particularly 21-lower hydrocarbon carbonyl esters thereof, as for example 16α-methyl-9α-fluoro-4-pregnene-11β,17α,21 - triol-3,20-dione 21-benzoate; 16α-methyl-9α-fluoro - 4 - pregnene-11β,17α,21-triol-3,20-dione 21 - lower alkanoates such as 16α-methyl-9α-fluoro - 4 - pregnene-11β,17α,21-triol-3,20-dione 21-acetate; 16α-methyl-9α-fluoro-4-pregnene-11β,17α,21-triol-3,20-dione 21-propionate and the like.

In accordance with the present invention and utilizing the preferred strains of Schizomycetes microorganisms, the Δ¹-dehydrogenation of the 16-methyl-11-oxygenated-4-pregnene-17α,21-diol-3,20-dione compound is effected by contacting the steroid compound with the Schizomycetes microorganisms themselves or, if preferred, the enzyme systems of Schizomycetes microorganisms whereby the hydrogen attached to the C-1 and C-2 carbon atoms is selectively removed to produce the desired Δ¹-steroid substantially uncontaminated by unwanted by-products. When the 16-methyl-11-oxygenated-4-pregnene-17α,21-diol-3,20-dione compound is subjected to the dehydrogenating activity of the preferred dehydrogenating strains of Schizomycetes microorganisms, the corresponding 16-methyl-11-oxygenated-1,4-pregnadiene-17α,21-diol-3,20-dione compound is obtained directly and in high yield.

The presently-invented microbiological dehydrogenation procedure is conducted by contacting the 16-methyl-11-oxygenated - 4 - pregnene-17α,21-diol-3,20-dione compound with the dehydrogenating activity of Schizomycetes microorganisms. This can be effected by adding the steroid compound as a solid, or as a solution in a solvent as for example a dialkyl ketone such as acetone, a dialkyl-formamide such as dimethyl-formamide, and the like, under sterile conditions to a culture of the microorganism in a nutrient medium and agitating the resulting mixture thereby bringing about growth of the microorganism and dehydrogenation of the steroid compound. The steroid can be added at the time the nutrient medium is inoculated with the culture of Schizomycetes microorganisms or, alternatively, may be added to an established culture. Instead of adding the steroid compound to the established culture in the nutrient medium, the cell growth from such established culture may be filtered from the broth, washed with distilled water, then suspended in buffered aqueous solution containing the 16-methyl-11-oxygenated-4-pregnene-17α,21-diol-3,20-dione compound, and the resulting mixture agitated thereby effecting dehydrogenation of the steroid compound to form the corresponding 16-methyl - 11 - oxygenated-1,4-pregnadiene-17α,21 diol-3,20-dione. The latter is more readily recovered from this medium than from the mixture obtained when the steroid is incubated with the microorganism in the original nutrient medium. Alternatively, the 16-methyl-11-oxygenated-4-pregnene-17α,21-diol-3,20-dione compound may be contacted with dehydrogenating enzyme preparations from the growth of Schizomycetes microorganisms.

The nutrient mediums used in carrying out this bacteriological dehydrogenation are those ordinarily utilized in the propagation of Schizomycetes microorganisms. The usual nutrients include a nitrogen and carbon source, inorganic salts and growth factors when required. The carbon can be provided by compounds such as acetates, lactates, and the like. The nitrogen can be provided by an ammonium salt, amino acids, or proteins such as soybeans, oats, yeast, yeast extracts, tryptic digest of casein, meat extract, blood meal, protein meat and bone scrap, salmon meal, fish meals, fish solubles, distillers solubles, and the like. If desired, the Schizomycetes microorganisms can be propagated using proteins (or amino acids) without any carbohydrate being present in the medium, in which case the proteins or amino acids serve as the source of both the carbon and nitrogen required by the microorganisms.

While, as noted hereinabove, the dehydrogenation of the 16-methyl-11-oxygenated-4-pregnene-17α,21-diol-3,20-dione compound may be carried out using dehydrogenating enzyme preparations from the growth of Schizomycetes microorganisms, or by contacting the steroid compound with a suspension of an established culture in distilled water, it is ordinarily preferred to add the 16-methyl - 11 - oxygenated - 4 - pregnene-17α,21-diol-3,20-dione compound to a nutrient medium containing a 24-hour growth of Schizomycetes microorganisms. The proportion of steroid compound which may be added to the medium varies depending upon the particular substrate being dehydrogenated, but it is ordinarily preferred to employ a concentration of about 0.005% to 0.2% of 16 - methyl - 11 - oxygenated - 4 - pregnene-17α,21-diol-3,20-dione compound, although higher or lower concentrations may be employed, if desired. The culture containing the added steroid compound is then incubated, preferable with agitation and aeration for an additional period which ordinarily varies between about 10 hours and 50 hours although shorter or longer fermentation times may be advantageous for the dehydrogenation of particular substrates. In view of the fact that prolonged fermentations may result in destruction of a portion of the $\Delta^1$-dehydrogenated steroid product, it is ordinarily preferred to employ a fermentation time of about 10 hours to 24 hours which, depending upon the steroid substrate, has been found to result in maximal yields of the $\Delta^1$-dehydrogenated steroid product.

After completion of the dehydrogenation process, the 16-methyl - 11 - oxygenated-1,4-pregnadiene-17α,21-diol-3,20-dione product is conveniently recovered from the fermented broth by extraction with a water-immiscible solvent as for example a chlorinated hydrocarbon such as chloroform, a ketone such as methyl isobutyl ketone, an alkyl alkanoate such as ethyl acetate, and the like. The extract of $\Delta^1$-dehydrogenated steroid product and any unreacted starting material which may be present is conveniently purified by chromatography using silica gel, activated alumina, and the like or, if desired, by means of paper chromatograms. After separation of the dehydrogenated product from unreacted starting material, the product can be purified further, if desired, by recrystallization from a solvent such as ethyl acetate, ethyl acetate-petroleum ether, and the like.

In accordance with this microbiological dehydrogenation method, and using the 16-methyl-11-oxygenated-4-pregnene - 17α,21 - diol - 3,20 - dione starting materials enumerated hereinbelow, there are obtained 16-methyl-11-oxygenated - 1,4 - pregnadiene-17α,21-diol-3,20-dione compounds such as 16α-methyl-1,4-pregnadiene-17α,21-diol-3,11,20-trione; 16α - methyl-1,4-pregnadiene-11β,17α, 21-triol-3,20-dione; 16α-methyl - 9α - fluoro-17α,21-diol-3, 11,20-trione and 16α-methyl - 9α - fluoro-11β,17α,21-triol-3,20-dione.

Irrespective of whether the 16-methyl - 11 - oxygenated-4 - pregnene - 17α,21 - diol - 3,20 - dione starting material employed in this microbiological dehydrogenation reaction is a 21-free alcohol or a 21-ester thereof, the product obtained is the corresponding 16 - methyl-11-oxygenated - 1,4 - pregnadiene - 17α,21 - diol - 3,20-dione 21-free alcohol, since any 21-ester grouping which may be present is hydrolyzed during the microbiological dehydrogenation reaction. These 16 - methyl - 11 - oxygenated 1,4 - pregnadiene - 17α,21 - diol - 3,20-dione 21-free alcohols can be converted to the corresponding 21-esters by reaction with an acylating agent e.g. a phosphorylating agent, a lower hydrocarbon carboxylic acid acylating agent such as benzoic anhydride, tertiary butyl acetyl chloride, a lower alkanoic anhydride or lower alkanoyl halide such as acetic anhydride, propionic anhydride, a polybasic acid anhydride such as β,β - dimethyl-glutaric anhydride, succinic anhydride, and the like.

In accordance with this acylation procedure there are obtained 16α - methyl - 1,4-pregnadiene - 17α,21 - diol-3,11,20 - trione 21-esters as, for example, 16α-methyl-1,4-pregnadiene-17α,21-diol-3,11,20-trione
   21-phosphate;
16α-methyl-1,4-pregnadiene-17α,21-diol-3,11,20-trione
   21-lower hydrocarbon carbonyl esters such as
16α-methyl-1,4-pregnadiene-17α,21-diol-3,11,20-trione
   benzoate;
16α-methyl-1,4-pregnadiene-17α,21-diol-3,11,20-trione
   21-tertiary butyl acetate;
16α-methyl-1,4-pregnadiene-17α,21-diol-3,11,20-trione
   21-lower alkanoate such as
16α-methyl-1,4-pregnadiene-17α,21-diol-3,11,20-trione
   21-acetate;
16α-methyl-1,4-pregnadiene-17α,21-diol-3,11,20-trione
   21-propionate;
16α-methyl-1,4-pregnadiene-11β,17α,21-triol-3,20-dione
   21-esters as, for example,
16α-methyl-1,4-pregnadiene-11β,17α,21-triol-3,20-dione
   21-phosphate;
16α-methyl-1,4-pregnadiene-11β,17α,21-triol-3,20-dione
   21-lower hydrocarbon carbonyl esters, such as
16α-methyl-1,4-pregnadiene-11β,17α,21-triol-3,20-dione
   21-benzoate;

16α-methyl-1,4-pregnadiene-11β,17α,21-triol-3,20-dione 21-tertiary butyl acetate;
16α-methyl-1,4-pregnadiene-11β,17α,21-triol-3,20-dione 21-lower alkanoates such as
16α-methyl-1,4-pregnadiene-11β,17α,21-triol-3,20-dione 21-acetate;
16α-methyl-1,4-pregnadiene-11β,17α,21-triol-3,20-dione 21-propionate;
9α-fluoro-16α-methyl-1,4-pregnadiene-17α-21-diol-3,11,20-trione 21 esters as, for example,
9α-fluoro-16α-methyl-1,4-pregnadiene-17α,21-diol-3,11,20-trione 21-phosphate;
9α-fluoro-16α-methyl-1,4-pregnadiene-17α,21-diol-3,11,20-trione 21-lower hydrocarbon carbonyl esters such as
9α-fluoro-16α-methyl-1,4-pregnadiene-17α,21-diol-3,11,20-trione 21-benzoate;
9α-fluoro-16α-methyl-1,4-pregnadiene-17α,21-diol-3,11,20-trione 21-tertiary butyl acetate;
9α-fluoro-16α-methyl-1,4-pregnadiene-17α,21-diol-3,11,20-trione 21-lower alkanoates such as
9α-fluoro-16α-methyl-1,4-pregnadiene-17α,21-diol-3,11,20-trione 21-acetate;
9α-fluoro-16α-methyl-1,4-pregnadiene-17α,21-diol-3,11,20-trione 21-propionate;
9α-fluoro-16α-methyl-1,4-pregnadiene-11β,17α,21-triol-3,20-dione 21-esters as, for example,
9α-fluoro-16α-methyl-1,4-pregnadiene-11β,17α,21-triol-3,20-dione 21-phosphate;
9α-fluoro-16α-methyl-1,4-pregnadiene-11β,17α,21-triol-3,20-dione 21-lower hydrocarbon carbonyl esters, such as
9α-fluoro-16α-methyl-1,4-pregnadiene-11β,17α,21-triol-3,20-dione 21-benzoate;
9α-fluoro-16α-methyl-1,4-pregnadiene-11β,17α,21-triol-3,20-dione 21-tertiary butyl acetate;
9α-fluoro-16α-methyl-1,4-pregnadiene-11β,17α,21-triol-3,20-dione 21-lower alkanoates such as
9α-fluoro-16α-methyl-1,4-pregnadiene-11β-17α,21-triol-3,20-dione 21-acetate;
9α-fluoro-16α-methyl-1,4-pregnadiene-11β,17α,21-triol-3,20-dione 21-propionate, and the like.

Alternatively, instead of the above-mentioned microbiological dehydrogenation method, the 16 - methyl-4-pregnene - 17α - ol - 3,20-dione compound, or, if preferred, the corresponding saturated 16 - methyl-prenane-17α-ol-3,20 - dione compound is reacted with selenium dioxide thereby effecting ring A dehydrogenation to form the corresponding 16 - methyl - 1,4 - pregnadiene - 17α-ol-3,20 - dione compound. This selenium dioxide dehydrogenation procedure is conveniently conducted by bringing the 16 - methyl - 4 - pregnene - 17α-ol-3,20-dione compound, or 16 - methyl-pregnane - 17α-ol-3,20-dione compound, and selenium dioxide together in the presence of an organic solvent such as for example dioxane, an alcohol solvent such as t-butanol, etc., and heating the mixture at an elevated temperature. When t-butanol is used as the solvent, it is ordinarily preferred to carry out this reaction at the boiling point of the solvent, under which conditions the reaction is ordinarily complete in about fifteen hours. The reaction mixture is ordinarily filtered, thereby removing metallic selenium, and the filtered solution is evaporated to dryness in vacuo to give the desired 16-methyl - 1,4 - pregnadiene - 17α-ol-3,20-dione compound. The crude material obtained in this way is conveniently purified by paper strip chromatography in accordance with the procedure outlined hereinabove in connection with the purification of the 16-methyl - 1,4 - pregnadiene - 17α - ol - 3,20 - dione compounds produced by microbiological dehydrogenation.

The following examples illustrate methods of carrying out the present invention but it is to be understood that these examples are given for purposes of illustration and not of limitation.

Example 1

Fifty milliliters of a nutrient medium are prepared having the following composition:

Cerelose _____g-- 1
Edamin _____g-- 1
Cornsteep liquor _____ml__ 0.25
Distilled water to make 50 ml.

This medium is adjusted to pH 6.5 with KOH, sterilized and inoculated with about 2.5 to 5 ml. of a culture of *Bacillus sphaericus* (ATCC–245) microorganisms, and the inoculated culture is then incubated at a temperature of 28° C., with agitation, for a 24-hour period. To the resulting culture is added a solution containing 10 mg. of 16α - methyl - 4 - pregnene - 17α,21 - diol - 3,11,20-trione dissolved in 0.2 ml. of dimethylformamide. The culture containing the steroid compound is incubated, with agitation, for an addition period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene–50% chloroform as the mobile phase. After 8 hours development in a descending system, the upper bands for each chromatogram, corresponding to the Δ$^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 16α - methyl - 1,4-pregnadiene-17α-21-diol-3,11,20-trione.

The 16α - methyl-1,4-pregnadiene-17α,21-diol-3,11,20-trione is treated with acetic anhydride and pyridine to give the 21-acetyl derivative, which is purified by recrystallization from benzene-petroleum ether to give substantially pure 16α - methyl - 1,4 - pregnadiene-17α,21-diol-3,11,20-trione 21-acetate.

Example 2

Fifty millimeters of a nutrient medium are prepared having the following composition:

Cerelose _____g-- 1
Edamin _____g-- 1
Cornsteep liquor _____ml__ 0.25
Distilled water to make 50 ml.

This medium is adjusted to pH 6.5 with KOH, sterilized and inoculated with about 2.5 to 5 ml. of a culture of *Nocardia asteroides* (ATCC 9970) microorganisms, and the inoculated culture is then incubated at a temperature of 28° C., wtih agitation, for a 24-hour period. To the resulting culture is added a solution containing 10 mg. of 16α - methyl - 4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporaed in vacuo to a volume of about 5 ml. The concentrated solution is then streaked on paper chromatograms which are developed using dimethylformamide as the stationary phase and 50% benzene-50% chloroform as the mobile phase. The upper bands for each chromatogram corresponding to the Δ$^1$-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 16α-methyl-1,4-pregnadiene-11β,17α,21-triol-3,20-dione.

The 16α-methyl-1,4-pregnadiene-11β,17α,21-triol-3,20-dione is treated with acetic anhydride and pyridine, and the acetylated product recrystallized from benzene-petroleum ether to give substantially pure 16α-methyl-1,4-pregnadiene-11β,17α,21-triol-3,20-dione 21-acetate.

*Example 3*

Fifty milliliters of a nutrient medium are prepared having the following composition:

| | |
|---|---|
| Cerelose | g-- 1 |
| Edamin | g-- 1 |
| Cornsteep liquor | ml-- 0.25 |
| Distilled water to make 50 ml. | |

This medium is adjusted to pH 6.5 with KOH, sterilized and inoculated with about 2.5 to 5 ml. of a culture of *Mycobacterium smegmatis* (NRRL B-1667) microorganisms, and the inoculated culture is then incubated at a temperature of 28° C., with agitation, for a 24-hour period. To the resulting culture is added a solution containing 10 mg. of 16α-methyl-9α-fluoro-4-pregnent-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracs are combined and evaporated in vacuo to a volume of about 5 ml. The concentrated solution is then used to prepare streak-paper chromatograms which are developed utilizing dimethylformamide as the stationary liquid phase and 50% benzene-50% chloroform as the mobile liquid phase. Two bands are secured, one of which (corresponding to the more mobile component) shows ultra-violet adsorption maximum characteristic of the 16α-methyl-9α-fluoro-4-pregnene-11β,17α,21-triol-3,20-dione starting material, and the other (the less mobile component) shows an ultraviolet adsorption maximum at about 245 mμ. The paper chromatogram is dried, and the band corresponding to the 245 mμ adsorption is cut off and extracted with methanol. The material extracted wtih methanol is again subjected to streak-paper chromatography, using paper which has been extracted for 48 hours with methanol, and employing the chloroform-formamide system previously employed. The resulting chromatogram shows only a trace band corresponding to the starting material with the major band having an ultra-violet adsorption maximum of 245 mμ. The paper chromatogram is thoroughly dried, and the band corresponding to the 245 mμ adsorption maximum is cut off and extracted with methanol. The methanol extract is evaporated to dryness in vacuo to give 16α-methyl-9α-fluoro-1,4-pragnadiene-11β,17α,21-triol-3,20-dione.

The 16α-methyl-9α-fluoro-1,4-pregnadiene-11β,17α,21-triol-3,20-dione is reacted with excess acetic anhydride in pyridine to give the 21-acetyl derivative which is purified by recrystallization from benzene-petroleum ether to give substantially pure 16α-methyl-9α-fluoro-1,4-pregnadiene-11β,17α,21-triol-3,20-dione 21-acetate.

*Example 4*

The fermentation procedures of Examples 1, 2 and 3 are repeated but using, in place of the microorganisms and the 16α-methyl-11-oxygenated-4-pregnene-17α,21-diol-3,20-dione starting material employed in those examples, the microorganism strains and steroid starting compounds indicated in the table hereinbelow. The resulting fermentation broths are treated in accordance with the isolation methods described in Examples 1, 2 and 3 to give, for the particular microorganism strain and steroid substrate used, the 16α-methyl-11-oxygenated-1,4-pregnadiene-17α,21-diol-3,20-dione indicated in the following table:

| Expt. No. | Substrate | *Bacillus Sphaericus* Microorganisms | 16-methyl-11-oxygenated-1,4-pregnadiene-17α, 21-diol-3,20-dione product |
|---|---|---|---|
| 1 | 16α-methyl-4-pregnene-17α,21-diol-3,11,20-trione | ATCC-7054 | 16α-methyl-1,4-pregnadiene-17α,21-diol-3,11,20-trione; |
| 2 | 16α-methyl-4-pregnene-11β 17α,21-triol-3,20-dione | ATCC-245 | 16α-methyl-1,4-pregnadiene-11β,17α,21-triol-3,20-dione. |
| 3 | 16α-methyl-4-pregnene-11β,17α,21-triol-3,20-dione 21-acetate. | ATCC-4525 | Do. |
| 4 | 16α-methyl-4-pregnene-17α,21-diol-3,11,20-trione | ATCC-7055 | 16α-methyl-1,4-pregnadiene-17α-21-diol-3,11,20-trione; |
| 5 | 16α-methyl-9α-fluoro-4-pregnene-17α,21-diol-3,11,20-trione 21-acetate. | ATCC-7055 | 16α-methyl-9α-fluoro-1,4-pregnadiene-17α,21-diol-3,11,20-trione. |
| 6 | 16α-methyl-9α-fluoro-4-pregnene-11β,17α,21-triol-3,20-dione. | ATCC-245 | 16α-methyl-9α-fluoro-1,4-pregnadiene-11β,17α,21-triol-3,20-dione. |
| 7 | 16α-methyl-9α-fluoro-4-pregnene-11β,17α,21-triol-3,20-dione 21-acetate. | ATCC-7063 | Do. |
| | | *Nocardia* Microorganisms | |
| 8 | 16α-methyl-4-pregnene-11β,17α,21-triol-3,20-dione | *N. blackwellii* ATCC-6846 | 16α-methyl-1,4-pregnadiene-11β,17α,21-triol-3,20-dione. |
| 9 | 16α-methyl-4-pregnene-17α,21-diol-3,11,20-dione | *N. globerula* ATCC-9356 | 16α-methyl-1,4-pregnadiene-17α,21-diol-3,11,20-trione. |
| 10 | 16α-methyl-9α-fluoro-4-pregnene-17α,21-diol-3,11,20-trione. | *N. leishmanii* ATCC-6855 | 16α-methyl-9α-fluoro-1,4-pregnadiene-17α,21-diol-3,11,20-trione. |
| 11 | 16α-methyl-9α-fluoro-4-pregnene-11β,17α,21-triol-3,20-dione. | *N. formica* NRRL-2470 | 16α-methyl-9α-fluoro-1,4-pregnadiene-11β,17α,21-triol-3,20-dione. |
| | | *Mycobacterium* Microorganism | |
| 12 | 16α-methyl-4-pregnene-11β,17α,21-triol-3,20-dione | *M. phlei* ATCC-12,298 | 16α-methyl-1,4-pregnadiene-11β,17α,21-triol-3,20-dione. |
| 13 | 16α-methyl-4-pregnene-17α,21-diol-3,11,20-trione | *M. lacticola* ATCC-12,297 | 16α-methyl-1,4-pregnadiene-16α,21-diol-3,11,20-trione. |
| 14 | 16α-methyl-9α-fluoro-4-pregnene-17α,21-diol-3,11,20-trione. | *M. tuberculosis* ATCC-12,296 | 16α-methyl-9α-fluoro-1,4-pregnadiene-17α,21-diol-3,11,20-trione. |

*Example 5*

To a solution of 110 mg. of 16α-methyl-4-pregnene-17α-21-diol-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum and then with mixtures of ether and chloroform, increasingly rich in chloroform. The 4:6 ether-chloroform eluates are combined, evaporated to dryness, and the residual material recrystallized from ethyl acetate-ether to give 16α-methyl-1,4-pregnadiene-17α,21-diol - 3,11,20-trione 21-acetate; M.P. 208–212° C.

*Example 6*

To a solution of 110 mg. of 16α-methyl-4-pregnene-11β,17α,21-triol-3,20-dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 16α-methyl-1,4-pregnadiene-11β,17α,21-triol - 3,20-dione 21-acetate.

*Example 7*

In accordance with the selenious acid dehydrogenation procedure of Example 6, but using 9α-fluoro-16α-methyl-4-prengene - 17α,21-diol-3,11,20-trione 21-acetate as the starting material in place of the 16α-methyl-4-pregnene-17α,21-diol - 3,11,20-trione 21-acetate utilized in Example 6, there is obtained 9α-fluoro-16α-methyl-1,4-pregnadiene - 17α,21-diol-3,11,20-trione 21-acetate.

*Example 8*

In accordance with the selenious acid dehydrogenation procedure of Example 6, but using 9α-fluoro-16α-methyl-4-pregnene - 11β,17α,21-triol-3,20-dione 21-acetate as the starting material in place of the 16α-methyl-4-pregnene-17α,21-diol - 3,11,20-trione 21-acetate utilized in Example 6, there is obtained 9α-fluoro-16α-methyl-1,4-pregnadiene - 11β,17α,21-triol-3,20-dione 21-acetate.

*Example 9*

To a solution of 110 mg. of 16α-methyl-pregnane-17α,21-diol-3,11,20-trione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 16α-methyl-1,4-prgnadiene-17α,21-diol-2,11,20-trione 21-actate.

*Example 10*

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 16-pregnene-3α-ol-11,20-dione 3-acetate in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter matreial is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 16α-methylpregnane-3α-ol-11,20-dione 3-acetate.

To a solution of 0.8 g. of 16α-methylpregnane-3α-ol-11,20-dione 3-acetate in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 16α-methyl-pregnane-3α-ol-11,20-dione.

A solution of 22 g. of 16α-methyl-pregnane-3α-ol-11,20-dione 21-acetate and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml., and petroleum ether is added to the cloud point. The resulting solutiton is adsorbed on 660 g. of acid-washed alumina; the alumina adsorbate is then washed with 2 liters of petroleum ether. The adsorbate is then eluted with 85:15 petroleum ether mixture, and the first four liters of eluate is collected, and evaporated to dryness in vacuo to give a mixture of enol acetates containing 16α-methyl-17(20)-pregnene-3α-20-diol-11-one 3,20-diacetate. This mixture of enolates, weighing approximately 14 g., is dissolved in 50 ml. of benzene and treated with an excses of perbenzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 16α-methyl-17α,20-epoxy-pregnane-3α,20-diol-11-one 3,20-diacetate. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 16α-methyl-pregnane-3α,17α-diol-11,20-dione.

To a solution of 7.0 g. of 16α-methyl-pregnane-3α,17α-diol-11,20-dione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo-16α-methyl-pregnane-3α,17α-diol-11,20-dione.

This 5 g. of 21-bromo-16α-methyl-pregnane-3α,17α-diol-11,20-dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 16α-methyl-pregnane-3α,17α, 21-triol-11,20-dione 21-acetate.

A solution of 400 mg. of 16α-methyl-pregnane-3α,17α, 21-triol-11,20-dione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate to give 16α-methyl-pregnane-17α,21-diol-3,11,20-trione 21-acetate.

To 100 mg. of 16α-methyl-pregnane-17α,21-diol-3,11,20-trione 21-acetate dissolved in 2 ml. of chloroform and 2.25 ml. of glacial acetic acid, at a temperature of —55° C., is added two drops of a 0.001 N solution of dry HBr in glacial acetic acid. To about 0.38 ml. of 0.001 N HBr in glacial acetic acid, at —55° C., is added 0.43 ml. of a solution containing 40 mg. of bromine in chloroform, and the resulting solution is added, over about a 10-minute period, to the solution of the steroid, while maintaining the reaction mixture at about —55° C. The reaction mixture is allowed to stand at —55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4 - bromo-16α-methyl-pregnane-17α,21-diol-3,11,20-trione 21-acetate.

A mixture of 48 mg. of semicarbazide, 48 mg. of 4-bromo - 16α-methyl-pregnane-17α,21-diol-3,11,20-trione 21-acetate, 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 16α-methyl-4-pregnene-17α,21-diol - 3,11,20 - trione-3,20-bis-semicarbazone 21-acetate. Fifty milligrams of 16α-methyl-4-pregnene-17α,21-diol-3,11,20-trione-3,20-bis-semicarbazone 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 16α-methyl - 4 - pregnene-17α,21-diol-3,11,20-trione-3,20-bis-semicarbazone.

A mixture of 60 mg. of 16α-methyl-4-pregnene-17α-21-diol-3,11,20-trione-3,20-bis-semicarbazone, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 16α-methyl-4-pregnene-17α,21-diol-3,11,20-trione.

*Example 11*

A solution of 45 mg. of 16α-methyl-4-pregnene-17α, 21 - diol-3,11,20-trione-3,20-bis-semicarbazone 21-acetate, 17 mg. of sodium borohydride, 1 ml. of tetrahydrofuran and 0.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 16α-methyl-4-pregnene-11β-17α, 21-triol-3,20-dione 3,20-bis-semicarbazone.

A mixture of 60 mg. of 16α-methyl-4-pregnene-11β, 17α,21-triol-3,20-dione 3,20-bis-semicarbazone, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 16α-methyl-4-pregnene-11β,17α,21-triol-3,20-dione. The latter material is reacted with an excess of acetic anhydride in pyridine at room temperature for a period of about fifteen hours, and the crude acetylated product is recrystallized from ethyl acetate to give 16α-methyl-4-pregnene-11β,17α,21-triol-3,20-dione 21-acetate.

*Example 12*

To a cooled solution of 600 mg. of 16α-methyl-4-pregnene-11β,17α,21-triol-3,20-dione 21 acetate in 5.0 ml. of dry pyridine is added 0.15 ml. of phosphorous oxychloride, and the mixture is allowed to stand at room temperature for a period of approximately 15 hours. The reaction solution is evaporated in vacuo at a temperature of about 20° C. to a volume of 2–3 ml. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized from ethyl acetate-ether to give 16α-methyl-4,9(11)-pregnadiene-17α,21-diol-3,20-dione 21-acetate. A suspension of 330 mg. of 16α- methyl-4,9(11)-pregnadiene-17α,21-diol-3,20 - dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-16α-methyl-4-pregnene-11β,17α,21-triol-3,20-dione 21-acetate.

A solution of 210 mg. of 9α-bromo-16α-methyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 16α-methyl-9,11-epoxy-4-pregnene-17α,21-diol-3,20-dione 21 - acetate.

To a solution of 83 mg. of anhydrous hydrogen fluoride in 4.7 ml. of ice-cold alcohol-free chloroform is added an ice-cold solution of 416 mg. of 16α-methyl-9,11-epoxy-4-pregnene-17α,21-diol-3,20-dione 21-acetate. The solution is mixed thoroughly and maintained at 0° C. for 2 hours, at the end of which time 13.0 ml. of ice-cold 20% aqueous sodium acetate is added, and the resulting mixture agitated vigorously. The layers are separated, and the chloroform layer is washed with water until free of acid, dried and the chloroform evaporated in vacuo. The residual material is crystallized from acetone-petroleum ether to give 16α-methyl-9α-fluoro-4-pregnene-11β,17α,21-triol-3,20 - dione 21-acetate.

*Example 13*

Fifty milligrams of 16a-methyl-9a-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 16α-methyl-9α-fluoro-4-pregnene-11β,17α,21-triol-3,20 - dione.

*Example 14*

A solution of 400 mg. of 16α-methyl-9α-fluoro-4-pregnene-11β,17α,21-triol-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate-ether to give 16α-methyl-9α-fluoro-4-pregnene-17α,21-diol-3,11,20 - trione 21-acetate.

*Example 15*

Fifty milligrams of 16α-methyl-9α-fluoro-4-pregnene-17α,21-diol-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 16α-methyl-9α-fluoro-4-pregnene-17α,21-diol-3,11,20-trione.

*Example 16*

Diazomethane is generated by warming the generation flask to 40–45° C. and cautiously adding the N-methyl-N-nitrosotosylamide-ether from the dropping funnel. Nitrogen is utilized to sweep the diazomethane into a solution of 20 g. of 3α-acetoxy-16-pregnene-11,20-dione in 100 ml. of tetrahydrofuran and 120 ml. of ether. The process is continued until the steroid solution remains yellow for several hours. The product, 3α-acetoxy-16α,17α-methyleneazo-pregnane-11,20-dione largely precipitates from the reaction mixture. After 16 hours, the mixture is filtered, washed with ether and dried in air. Yield about 14 grams.

37.4 g. of 3α-acetoxy-16α,17α-methyleneazo-pregnane-11,20-dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It has $\lambda_{\max}^{CH_3OH}$ 249 E percent 191 and is taken up in about 150 ml. of acetone, filtered through diatomaceous earth, concentrated to about 100 ml., and ether is slowly added to the boiling solution until crystallization occurs. These crystals of 3α-acetoxy-16-methyl-16-pregnene-11,20-dione weigh about 19.0 g.

A solution of 20.0 g. of 3α - acetoxy - 16 - methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultraviolet maximum at 249 has completely disappeared. Then 600 ml. of saturated salt water is slowly added, the crystalline precipitate is filtered, washed with water, and dried in air and in vacuum. The 16α,17α - epoxy - 3α - hydroxy - 16β - methyl - pregnane-11,20-dione thus formed weighs about 17 g.

To a solution of 2.69 g. of 16α,17α-epoxy-3α-hydroxy-16β-methyl-pregnane-11,20-dione in 55 ml. dioxane is added 27 ml. of 2 M aqueous perchloric acid. The clear solution is kept at 25–30° C. for 65 hours. Cold water (175 ml.) is added, the slurry chilled to 8° C. and filtered after 30 minutes. The precipitate, containing a mixture of 3α,17α - dihydroxy - 16 - methyl - 15 - pregnene - 11, 20-dione and 3α,17α-dihydroxy-16-methylene-pregnane-11,20-dione is washed with water, and dried in air and finally at 50° C. in vacuum. Yield: approximately 2 g.; the relative proportion of 3α,17α-dihydroxy-16-methyl-15-pregnene-11,20-dione and 3α,17α-hydroxy-16-methylene-pregnane-11,20-dione is estimated to be of the order of 1:1.

A solution 3.05 g. (8.47 millimols) of the olefin mixture of 3α-17α-dihydroxy-16-methylene-pregnane-11,20-dione in 80 ml. of methanol is reduced in hydrogen at 1 atmosphere and 25° C. in the presence of 2.0 g. of 25% palladium-calcium carbonate catalyst. Modification of the hydrogen conditions, pH, solvent, catalyst, etc. alters the isomer ratio significantly. Uptake of the calculated amount of hydrogen is complete in 45 minutes. The mixture is stirred an additional 30 minutes and filtered through diatomaceous earth. The colorless filtrate is taken to dryness and crystallized from ether; a mixture of 3α,17α-dihydroxy-16α-methyl-pregnane-11,20-dione and 3α,17α-dihydroxy-16β-methyl-pregnane-11,20-dione is obtained; weight about 3 g.. The product consists of 3α,17α-dihydroxy-16α-methyl-pregnane-11,20-dione and 3α,17α-dihydroxy-16β-methyl-pregnane-11,20-dione in the ratio ca. 7:3 as determined by the amounts of end product isolated below.

One gram of this hydrogenation product containing 3α, 17α-dihydroxy-16α-methyl-pregnane-11,20-dione and 3α, 17α-dihydroxy-16β-methyl-pregnane-11,20-dione, is chromatographed on 100 g. of activated magnesium silicate. The 100% chloroform eluates give 3α,17α-dihydroxy-16α-methyl-pregnane-11,20-dione, M.P. 188–191° C: the 5% methanol-chloroform eluates give 3α,17α-dihydroxy-16β-methyl-pregnane-11,20-dione, hexagonal plates from benzene-ethyl-acetate; M.P. 192–197° C.

A solution of 3.50 g. (9.7 millimols) of 3α,17α-dihydroxy-16β-methyl-pregnane-11,20-dione in 40 mg. of chloroform is warmed to 40–45° C. A solution of 1.76 g. (11 millimols) of bromine in 25 ml. of chloroform is added dropwise to the stirred solution such that the color is not darker than pale yellow (ca. 2 drops/sec., total time—1 hour). The nearly colorless solution is cooled to 20° C. and 200 ml. of ether is added. The mixture is extracted with excess cold 5% potassium bicarbonate solution, sodium bisulfite solution, and water, and dried over magnesium sulfate. The colorless residue after removal of solvent, 21-bromo-3α,17α-dihydroxy-16β-methyl-pregnane-11,20-dione (about 4 grams) gives a positive tetrazolium test.

To 4.30 g. of 21-bromo-3α,17α-dihydroxy-16β-methyl-pregnane-11,20-dione in 90 ml. of acetone and 0.01 ml. of acetic acid is added 4.83 of anhydrous potassium acetate and 3.85 g. of potassium iodide. The stirred mixture is refluxed for 18 hours and concentrated on the water pump to a small volume. Water is added, the product extracted into ethyl acetate, and the organic extract dried over magnesium sulfate to give 4 grams of a colorless foam that partly crystallizes from acetone-ether to give 3α,17α,21 - trihydroxy - 16β - methyl - pregnane - 11,20-dione 21-acetate.

To a solution of 3α,17α,21-trihydroxy-16β-methyl-pregnane-11,20-dione 21-acetate (4.9 g.) in 100 ml. t-butanol and 20 ml. of water cooled to 10–15° C., is added 3.5 g. N-bromo-succinimide. The suspension is stirred at 15° C. until all the N-bromosuccinimide has dissolved (90 minutes). The reaction mixture is kept at 2° C. for about sixteen hours and at 25° C. for 2 hours. Sodium sulfite solution is added to destroy bromine and the mixture concentrated on the water pump to a low volume. A granular precipitate forms; water is added, the precipitate filtered and washed with water; chromatography on neutral alumina and elution with mixtures of chloroform and benzene gives 17α,21-dihydroxy-16β-methyl-pregnane-3,11,20-trione 21-acetate.

To a stirred solution of 585 mg. of 17α,21-dihydroxy-16β - methyl - pregnane - 3,11,20 - trione 21 - acetate in 10 ml. of acetic acid and 8 ml. of chloroform kept at −10° C. is added slowly 230 mg. of bromine in 6 ml. of chloroform. After addition is complete, 1.2 g. of sodium acetate in 7 ml. of cold water is added and the mixture is extracted with chloroform. The chloroform extract is washed with dilute potassium bicarbonate, water and dried over sodium sulfate. The residue is triturated with ether to give 480 mg. of crystalline 4-bromo-17α,21-dihydroxy-16β-methyl-pregnane-3,11,20-trione 21- acetate.

To 583 mg. of 4-bromo-17α,21-dihydroxy-16β-methyl-pregnane-3,11,20-trione 21-acetate in 20 ml. of acetonitrile under nitrogen is added a slurry of 600 mg. of semicarbazide hydrochloride and 410 mg. sodium bicarbonate in 4 ml. of water. After 2 hours, the acetonitrile is removed in vacuo, water is added and about 540 mg. of crystalline 3-semicarbazone of 17α,20-dihydroxy-16β-methyl-4-pregnene-3,11,20-trione 21-acetate filtered, washed with water and dried.

540 mg. of the 3-semicarbazone of 17α,21-dihydroxy-16β-methyl-4-pregnene-3,11,20-trione 21-acetate is dissolved in 20 mg. of acetic acid, 1.5 ml. of pyruvic acid and 5 ml. of water. After 18 hours at 25° C., water is added and the mixture extracted with chloroform. The chloroform extract is washed with aqueous potassium bicarbonate, water and dried over sodium sulfate. Removal of solvent gives crude 17α,21-dihydroxy-16β-methyl-4-pregnene-3,11,20-trione 21-acetate which is purified by chromatography on neutral alumina and crystallization from acetone-ether (hexagonal plates).

Example 17

100 mg. of 17α,21-dihydroxy-16β-methyl-4-pregnene-3,11,20-trione 21-acetate in 3 ml. of methanol is treated with 0.1 g. of potassium bicarbonate in 1 ml. of water, the methanol is evaporated in vacuo, and the residual material is extracted with ethyl acetate. Evaporation of the ethyl acetate solution gives crystalline 17α,21-dihydroxy-16β-methyl-4-pregnene-3,11,20-trione.

Example 18

To a stirred solution of 500 mg. of 17α,21-dihydroxy-16β-methyl-4-pregnene-3,11,20-trione 21-acetate in 12.5 ml. of methanol and 3 ml. of dimethylformamide kept under nitrogen is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After 2 hours at 0° C. the precipitate of 3,20-bis-semicarbazido-17α,21-dihydroxy-16β-methyl-4-pregnene-3,11,20-trione 21-acetate is filtered, washed with water until free of chloride ion and dried in air.

To a stirred solution of 600 mg. of 3,20-bis-semicarbazido-17α,21-dihydroxy - 16β - methyl-4-pregnene-3, 11,20-trione 21-acetate in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product 3,20-bis-semicarbazido - 11β,17α,21 - trihydroxy-16β-methyl-4-pregnene-3,20-dione is filtered, washed with water, and dried in air.

To a solution of 510 mg. of reduced 3,20-bis-semicarbazido-11β,17α,21-trihydroxy - 16β - methyl-4-pregnene-3,20-dione in 5 ml. of acetic acid is added 1.20 ml. of water and 0.50 ml. of pyruvic acid. The solution is kept at 25° C. for eighteen hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-16β-methyl-4-pregnene-3,20-dione.

Example 19

A solution of 100 mg. of 11β,17α,21-trihydroxy-16β-methyl-4-pregnene-3,20-dione in 1.0 ml. of pyridine and 0.5 ml. of acetic anhydride is prepared. After 18 hours at 25° C., the solution is taken to dryness in vacuo and the solid residue purified by crystallization from acetone-ether to give 11β,17α,21-trihydroxy-16β-methyl-4-pregnene-3,20-dione 21-acetate.

Example 20

A solution of 400 mg. of 11β,17α, 21-trihydroxy-16β-methyl-4-pregnene-3,20-dione 21-acetate in 2.0 ml. dimethyl formamide, 0.8 ml. of pyridine and 0.4 ml. of methane-sulfonyl chloride is kept at 75° C. for one hour. The mixture is cooled, water added, and the precipitate filtered, washed with water and dried in air. The desired 17α,21-dihydroxy-16β-methyl - 4,9(11) - pregnadiene-3,20-dione 21-acetate is purified by chromatography on alumina (20 g.) and elution of the column with benzene. Crystallization of material eluted by benzene gives pure 17α,21-dihydroxy-16β-methyl-4,9(11)-pregnadiene-3,20-dione 21-acetate.

*Example 21A*

To a mixture of 620 mg. of 17α,21-dihydroxy-16β-methyl-4,9(11)-pregnadiene - 3,20-dione 21-acetate and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and crystalline bromohydrin, 9α-bromo-11β,17α,21-trihydroxy-16β-methyl - 4 - pregnene-3,20-dione 21-acetate, is filtered, washed with water, and dried in air.

*Example 21B*

To a stirred solution of 100 mg. of the 9α-bromo-11β,17α,21-trihydroxy-16β-methyl - 4 - pregnene-3,20-dione 21-acetate in 3 ml. of tetrahydrofuran and 1 ml. of methanol under nitrogen is aded 1.02 ml. of 0.215 N methanolic sodium methoxide. After 10 minutes at 25° C., 0.2 ml. of acetic acid is added and the methanol removed in vacuo. The residue is acetylated with 1.00 ml. of pyridine and 0.5 ml. of acetic anhydride at 60° C. for 70 minutes. The mixture is taken to dryness in vacuo, water added, and the product extracted into chloroform. The residue is crystallized from ether-acetone to give pure 9β,11β-epoxy-17α,21-dihydroxy - 16β - methyl - 4-pregnene-3,20-dione 21-acetate.

To a solution of 200 mg. of 9β,11β-epoxy-17α,21-dihydroxy-16β-methyl-4-pregnene-3,20-dione 21-acetate in 2 ml. of chloroform and 2 ml. of tetrahydrofuran in a polyethylene bottle at —60° C. is added 2 ml. of a 2:1 (by weight) mixture of anhydrous hydrogen fluoride and tetrahydrofuran. After 4 hours at —10° C. the mixture is cooled to —60° C. and cautiously added to a stirred mixture of 30 ml. of 25% aqueous potassium carbonate and 25 ml. of chloroform kept at —5° C. The aqueous phase is further extracted with chloroform and the latter phase washed with water and dried over magnesium sulfate. The residue on crystallization from acetone-ether gives pure 9α-fluoro-11β,17α,21-trihydroxy-16β-methyl-4-pregnene-3,20-dione 21-acetate.

*Example 22*

To a stirred solution of 110 mg. of 9α-fluoro-11β,17α,21-trihydroxy-16β-methyl - 4 - pregnene-3,20-dione 21-acetate in 5 ml. of methanol under nitrogen at 25° C. is added 1.00 ml. of 0.26 M methanolic sodium methoxide. After 15 minutes, 0.2 ml. of acetic acid in 1 ml. of water is added and the mixture concentrated nearly to dryness. The residue is taken up in ethyl acetate and the ethyl acetate solution is washed with water, dried over magnesium sulfate, and concentrated to dryness. Crystallization of the residue from ethyl acetate gives pure 9α-fluoro-11β,17α,21-trihydroxy - 16β - methyl-4-pregnene-3,20-dione.

*Example 23*

To a solution of 100 mg. of 9β,11β-epoxy-17α,21-dihydroxy-16β-methyl-4-pregnene-3,20-dione 21-acetate in 4 ml. of chloroform is added 5 ml. of concentrated hydrochloric acid. The two-phase mixture is stirred at 25° C. for 1 hour. Addition of water and chloroform extraction gives a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether affords pure 9α-chloro-11β,17α,21-trihydroxy-16β-methyl-4-pregnene-3,20-dione 21-acetate. This compound is hydrolyzed by treatment with potassium bicarbonate in aqueous methanol to give 9α-chloro-11β,17α,21-trihydroxy - 16β - methyl-4-pregnene-3,20-dione.

*Example 24*

To a stirred solution of 682 mg. of 17α,21-dihydroxy-16β-methyl-pregnane-3,11,20-trione 21-acetate in 20 ml. of chloroform and 2.25 ml. of acetic acid maintained at —20° C. is added dropwise one-half of a solution of 540 mg. of bromine in 2 ml. of chloroform and 3 ml. of acetic acid. The mixture is warmed to 0° C. and the remainder of the bromine added. Sodium acetate (0.4 g.) in 2 ml. of water is added followed by 20 mg. of sodium sulfite. The mixture is concentrated in vacuo to remove the chloroform and 20 ml. of water is added. The white powdery precipitate of 2,4-dibromo-17α,21-dihydroxy-16β-methyl-pregnane-3,11,20-trione 21-acetate is filtered, washed with water and dried in air. Yield: 920 mg., M.P. 122–130° C. dec.

To a solution under nitrogen of 900 mg. of the 2,4-dibromo - 17α,21 - dihydroxy-16β-methyl-pregnane-3,11,20-trione 21-acetate in 5 ml. dimethyl formamide is added 200 mg. of sodium bromide. After 1 hour at 25° C., 1 ml. of dimethylaniline is added and the mixture maintained at 135° C. for 2½ hours. The mixture is cooled, added dropwise to dilute hydrochloric acid, and solid crude product filtered, washed with dilute hydrochloric acid, water and dried in air. Treatment with charcoal, followed by crystallization from acetone gives 17α,21 - dihydroxy - 16α-methyl-1,4-pregnadiene-3,11,20-trione 21- acetate, M.P. 230°–233° C.

*Example 25*

To a stirred solution of 682 mg. of 17α,21-dihydroxy-16α-methyl-pregnane-3,11,20-trione 21-acetate in 20 ml. of chloroform and 2.25 ml. of acetic acid maintained at —20° C. is added dropwise one-half of a solution of 540 mg. of bromine in 2 ml. of chloroform and 3 ml. of acetic acid. The mixture is warmed to 0° C. and the remainder of the bromine added. Sodium acetate (0.4 g.) in 2 ml. of water is added followed by 20 mg. of sodium sulfite. The mixture is concentrated in vacuo to remove the chloroform and 20 ml. of water is added. The white powdery precipitate of 2,4-dibromo-17α,21-dihydroxy-16α-methyl-pregnane-3,11,20-trione 21-acetate is filtered, washed with water and dried in air. Yield: 920 mg., M.P. 122–130° C. dec.

To a solution under nitrogen of 900 mg. of the 2,4-dibromo - 17α,21 - dihydroxy-16α-methyl-pregnane-3,11,20-trione 21-acetate in 5 ml. dimethyl formamide is added 200 mg. of sodium bromide. After 1 hour at 25° C., 1 ml. of dimethylaniline is added and the mixture maintained at 135° C. for 2½ hours. The mixture is cooled, added dropwise to dilute hydrochloric acid, and solid crude product filtered, washed with dilute hydrochloric acid, water and dried in air. Treatment with charcoal, followed by crystallization from acetone gives 17α,21 - dihydroxy - 16α - methyl-1,4-pregnadiene-3,11,20-trione 21-acetate, M.P. 230°–233° C.

*Example 26*

1.0 g. of 17α,21-dihydroxy-16β-methyl-1,4-pregnadiene-3,11,20-trione 21-acetate in 30 ml. of methanol is treated with 1 g. of potassium bicarbonate in 10 ml. of water under reflux temperature for 7 minutes. The mixture is cooled, neutralized with 1 ml. of acetic acid in 10 ml. of water, the methanol removed in vacuo and the product extracted into ethyl acetate. Removal of the ethyl acetate gives crystals (about 0.9 g.) of the desired 17α,21 - dihydroxy - 16β-methyl-1,4-pregnadiene-3,11,20-trione; M.P. 195°–200° C.

*Example 27*

1.0 g. of 17α,21 - dihydroxy - 16α-methyl-1,4-pregnadiene-3,11,20-trione 21-acetate in 30 ml. of methanol is treated with 1 g. of potassium bicarbonate in 10 ml. of water under nitrogen at reflux temperature for 7 minutes. The mixture is cooled, neutralized with 1 ml. of acetic acid in 10 ml. of water, the methanol removed in vacuo and the product extracted into ethyl acetate. Removal of the ethyl acetate gives crystals (about 0.9 g.) of the desired 17α,21 - dihydroxy-16α-methyl-1,4-pregnadiene-3,11,20-trione; M.P. 195°–200° C.

*Example 28*

To 100 mg. 11β -17α,21 - trihydroxy-16β-methyl-4-pregnene-3,20-dione 21-acetate in 5 ml. of acetic acid is added 50 mg. of selenium dioxide. The mixture is refluxed under nitrogen 18 hours, 50 mg. of selenium dioxide is added and the mixture refluxed an additional 24 hours. The mixture is filtered, and the filtrate taken to dryness. The residue is taken up in ethyl acetate and washed successively with aqueous sodium bicarbonate, ammonium sulfide, dilute ammonia water, water, dilute hydrochloric acid and water and dried over magnesium sulfate. It is then treated with activated charcoal and concentrated to dryness. Crystallization of the residue from acetone-ether gives pure 11β,17α,21-trihydroxy-16β-methyl-1,4-pregnadiene-3,20-dione 21-acetate.

*Example 29*

100 mg. of 11β,17α,21 - trihydroxy - 16β-methyl-1,4-pregnadiene-3,20-dione 21-acetate in 3 ml. of methanol is treated with 0.1 g. of potassium bicarbonate in 10 ml. of water under nitrogen at reflux temperature for 7 minutes. The mixture is cooled, neutralized with 0.1 ml. of acetic acid in 1 ml. of water, the methanol is evaporated in vacuo and the residual material is extracted with ethyl acetate. Evaporation of the ethyl acetate gives crystalline 11β,17α,21 - trihydroxy - 16β - methyl-1,4-pregnadiene-3,20-dione.

In a similar manner, 100 mg. of 9α-fluoro-11β,17α,21-trihydroxy - 16β - methyl - 4 - pregnene-3,20-dione 21-acetate is treated with selenium dioxide to produce the corresponding 9α - fluoro - 11β,17α,21 - trihydroxy-16β-methyl - 1,4-pregnadiene - 3,20 - dione 21-acetate. This compound is hydrolyzed with potassium bicarbonate in aqueous methanol in accordance with the procedure described in the preceding paragraph to give 9α - fluoro-11β, 17α,21 - trihydroxy - 16β - methyl - 1,4-pregnadiene - 3,20-dione. Similarly, 100 mg. of 9α - chloro - 11β,17α,21-trihydroxy - 16β - methyl - 4 - pregnene-3,20-dione 21-acetate is treated with selenium dioxide to produce 9α-chloro - 11β,17α,21- trihydroxy - 16β - methyl-1,4-pregnadiene - 3,20 - dione 21-acetate, which is hydrolyzed by treatment with potassium bicarbonate in aqueous methanol to give 9α - chloro - 11β,17α,21 - trihydroxy - 16β-methyl-1,4-pregnadiene-3,20-dione.

*Example 30*

A solution of 100 mg. of 9α-fluoro-11β,17α,21-trihydroxy - 16β-methyl-1,4-pregnadiene-3,20-dione 21-acetate in 1 ml. of pyridine is added to the complex formed by the addition of 100 mg. of chromium trioxide to 1 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulphuric acid at about 0° C., and then with water until neutral. The organic solvent layer is then dried, the solvents are evaporated therefrom in vacuo, and the residual crystalline material is purified by crystallization from ethyl acetate-ether to give 9α-fluoro-1α,21-dihydroxy-16β-methyl-1,4-pregnadiene-3,11,20-trione 21-acetate. This compound is hydrolyzed by treatment with potassium bicarbonate in aqueous methanol to form 9α-fluoro-17α,21-dihydroxy-16β-methyl-1,4-pregnadiene-3,11,20-trione.

In a similar manner, 9α-chloro-11β,17α,21-trihydroxy-16β-methyl-1,4-pregnadiene-3,20-dione 21-acetate is reacted with chromium trioxide-pyridine complex to give 9α - chloro - 17α,21-dihydroxy-16β-methyl-1,4-pregnadiene-3,11,20-trione 21-acetate, which is hydrolyzed by treatment with potassium bicarbonate in aqueous methanol to give 9α-chloro-17α,21-dihydroxy-16β-methyl-1,4-pregnadiene-3,11,20-trione.

Similarly, 9α-fluoro-11β,17α,21-trihydroxy-16β-methyl-4-pregnene-3,20-dione 21-acetate is reacted with chromium trioxide-pyridine complex to form 9α-fluoro-17α,21-dihydroxy - 16β-methyl-4-pregnene-3,11,20-trione 21-acetate which is hydrolyzed by treatment with potassium bicarbonate in aqueous methanol to produce 9α-fluoro-17α,21-dihydroxy-16β-methyl-4-pregnene-3,11,20-trione.

Similarly, 9α-chloro-11β,17α,21-trihydroxy-16β-methyl-4-pregnene-3,20-dione 21-acetate is reacted with chromium trioxide-pyridine complex to form 9α-chloro-17α,21-dihydroxy - 16β-methyl-4-pregnene-3,11,20-trione 21-acetate which is hydrolyzed by treatment with potassium bicarbonate in aqueous methanol to produce 9α-chloro-17α,21-dihydroxy-16β-methyl-4-pregnene-3,11,20-trione.

*Example 31*

To a suspension of 25.0 g. of 11β,17α,21-trihydroxy-16α-methyl-4,6-pregnadiene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted with chloroform. The combined organic layers are washed twice with a 5% solution of sodium bicarbonate, and twice with a saturated salt solution. The solution is dried over magnesium sulfate and evaporated to dryness under reduced pressure. The pressure is triturated with methanol to afford a crystalline solid. This material contains no detectable amount of starting material by paperstrip chromatography. A 2.425 g. aliquot is recyrstallized three times from a mixture of benzene and n-hexane to give 17α,20,20,21-bis(methylenedioxy)-11β-hydroxy-16α-methyl-4,6-pregnadiene-3-one which is used in the subsequent step of the synthesis without further purification.

The 17α,20,20,21 - bis(methylenedioxy)-11β-hydroxy-16α-methyl-4,6-pregnadiene-3-one (1.350 g.) is disoslved in 25 ml. of dry, hot benzene and the remaining solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated solution of sodium dihydrogen phosphate and extracted into ether and into chloroform. The combined organic extracts are dried over sodium sulfate and evaporated to dryness to give 17α,20,20,21-bis(methylenedioxy)-11β-hydroxy-2-hydroxymethylene-16α-methyl-4,6-pregnadiene-3-one.

The 17α,20,20,21-bis(methylenedioxy)-11β-hydroxy-2-hydroxymethylene - 16α - methyl - 4,6-pregnadiene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-11β-hydroxy-16α-methyl-4,6-pregnadieno-[3,2-c]pyrazole.

To a solution of 100 mg. of 17α,20,20,21 bis(methylenedioxy) - 11β - hydroxy - 16α-methyl-4,6-pregnadieno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,20,20,21-bis-(methylenedioxy) - 11β-hydroxy-16α-methyl-4,6-pregnadieno-[3,2-c]pyrazole which is isolated by the addition of water and filtration.

In accordance with the above procedure, but using an equivalent quantity of another acylating agent in place of acetic anhydride there is obtained the corresponding N-acyl-steroid.

The N - acetyl-17α,20,20,21-bis(methylenedioxy)-11β-hydroxy - 16α - methyl-4,6-pregnadieno-[3,2-c]pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give an amorphous solid which is a mixture of N-acetyl-11β,17α,21-trihydroxy-16α-methyl-20-oxo-4,6-pregnadieno-[3,2-c]pyrazole and N-acetyl-21 - formyloxy - 11β,17α-dihydroxy-16α-methyl-20-oxo-4,6-pregnadieno-[3,2-c]pyrazole which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21-trihydroxy-16α-methyl-20-oxo-4,6-pregnadieno-[3,2-c-]pyrazole.

To a solution of 100 mg. of N-acetyl-11β,17α,21-trihydroxy-16α-methyl-20-oxo-4,6-pregnadieno-[3,2-c] - pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The N-acetyl-11β,17α-21-trihydroxy-16α-methyl-20-oxo-4,6-pregnadieno-[3,2 - c]pyrazole 21-acetate is then isolated by addition of water and filtration.

In accordance with the above procedures, but using an equivalent quantity of another acylating agent in place of acetic anhydride, there is obtained the corresponding N-acetyl-11β,17α,21-trihydroxy-16α-methyl-20 - oxo - 4,6-pregnadieno-[3,2-c]pyrazole 21--acylate.

In accordance with the above procedure, but starting with the 11β,17α,21-trihydroxy-16α-methyl-20 - oxo - 4,6-pregnadieno-[3,2-c]pyrazole and using two milli-equivalents of another acylating agent there is obtained the corresponding N-acyl-11β,17α,21-trihydroxy - 16α - methyl-20-oxo-4,6-pregnadieno-[3,2-c]pyrazole 21-acylate.

A solution of 5.73 g. of N-acetyl-11β,17α,21-trihydroxy-16α-methyl-20-oxo-4,6-pregnadieno-[3,2 - c] - pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords 11β,17α,21-trihydroxy - 16α - methyl - 20-oxo-4,6-pregnadieno-[3,2-c]pyrazole 21-acetate.

To a solution of 85 mg. of N-acetyl-11β,17α,21-trihydroxy-16α-methyl-20-oxo-4,6 - pregnadieno - [3,2 - c] pyrazole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-acetyl-11β,17α,21-trihydroxy-16α-methyl-20-oxo-4,6-pregnadieno - [3,2 - c]pyrazole 21-mesylate.

To 180 mg. of N-acetyl-11β,17α,21 - trihydroxy - 16α-methyl-20-oxo-4,6-pregnadieno[3,2-c]pyrazole 21 - mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-acetyl-11β,17α--dihydroxy-21-iodo - 16α - methyl-20-oxo-4,6-pregnadieno-[3,2-c]pyrazole.

The N-acetyl-11β,17α-dihydroxy-21-iodo-16α - methyl-20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-acetyl-11β,17α-dihydroxy-16α-methyl-20-oxo-4,6 - pregnadieno-[3,2-c]pyrazole.

To a solution of 62 mg. of N-acetyl-11β,17α,21-trihydroxy-16α-methyl-20-oxo-4,6-pregnadieno - [3,2 - c]pyrazole-21mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21-epoxy-11β-hydroxy-16α-methyl-20-oxo - 4,6 - pregnadieno-[3,2-c]pyrazole and N-acetyl-21-fluoro-11β,17α-dihydroxy-16α-methyl-20-oxo-4,6-pregnadieno - [3,2 - c] pyrazole, which compounds are separated by partition chromatography or by chromatography on silica gel.

A 500 mg. aliquot of the N-acetyl-21-fluoro-11β,17α-dihydroxy-16α-methyl-20-oxo-4,6-pregnadieno - [3,2 - c] pyrazole is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give the 21-fluoro-11β,17α-dihydroxy-16α-methyl - 20-oxo-4,6-pregnadieno-[3,2-c]pyrazole.

*Example 32*

A 5 g. sample of 9α-fluoro-11β,17α,21-trihydroxy-16α-methyl-4,6-pregnadiene-3,20-dione is dissolved in a mixture of 235 ml. of chloroform and 150 ml. of methylene chloride, cooled in an ice bath with stirring and treated with 85 ml. of formaldehyde (37%). An equal volume (85 ml.) of cold concentrated hydrochloric acid is added from a funnel over a 5-minute interval with stirring and cooling. The mixture is stirred at room temperature for four hours. The layers are separated and the organic layer is washed free of acid by washing three times with water and then with a 5% solution of sodium bicarbonate. The organic layers are washed free of bicarbonate, dried over magnesium sulfate and taken to dryness. The gummy residue is treated with enough hot methanol on a steam bath to effect trituration, and the resulting crystalline solid is separated by filtering the mixture while hot. (The filtrate is set aside and may deposit additional product overnight.) The crude product is dried to constant weight and purified by chromatography. The product is partially dissolved in 250 ml. of hot chloroform and diluted with an equal volume of hot benzene to complete solution. After cooling, the mixture is adsorbed in 100 g. of basic alumina and eluted with benzene and chloroform to give 17α,20,20,21 - bis - (methylenedioxy) - 9α - fluoro - 16α-methyl-11β-hydroxy-4,6-pregnadiene-3-one.

The 17α,20,20,21-bis-(methylenedioxy)-9α-fluoro-16α-methyl-11β-hydroxy-4,6-pregnadiene-3-one (3.25 g.) is dissolved in 76 ml. of dry pyridine and added to a cold solution prepared by the cautious addition of 3.25 g. of chromium trioxide (in portions) to 34.7 ml. of cold pyridine. The mixture is allowed to stand at room temperature overnight. The mixture is poured into water and extracted three times with ethyl acetate, avoiding excessive shaking especially during the third extraction. The combined ethyl acetate extracts are washed three times with 1 N sulfuric acid and then with water until neutral. The combined ethyl acetate extracts are dried over magnesium sulfate and taken to dryness to give 2.94 g. of product. The product is dissolved in benzene, adsorbed on basic alumina and eluted with 8:2 benzene: chloroform to give 17α,20,20,21-bis(methylenedioxy)-9α-fluoro-16α-methyl-4,6-pregnadiene-3,11-dione.

A 2.60 g. sample of 17α,20,20,21-bis(methylenedioxy)-9α-fluoro-16α-methyl-4,6-pregnadiene-3,11-dione is dissolved in 95 ml. of dry benzene using dry equipment and treated with 2.43 ml. of freshly distilled ethyl formate. About 1.19 g. of a dispersion of sodium hydride in mineral oil (about 51%) is added, followed by about 1.19 g. of freshly prepared dry sodium methoxide (dried at about 175° C. oil pump for 4 hours). The air in the system is again replaced with nitrogen and the mixture, which turns yellow at once, is stirred at room temperature for one and one-half hours. At this point the color of the reaction mixture is a dark orange. The mixture is chilled in an ice bath and a cold, saturated solution of sodium dihydrogen phosphate is added gradually to decompose excess sodium hydride and neutralize the sodium methoxide. Ether is added and the layers are separated. The aqueous layers are back-extracted with ether and the combined organic layers are washed free of acid with water and then extracted three to four times with a 5% aqueous solution of sodium bicarbonate. These extracts are set aside. The product is now extracted four to five times with a 2% aqueous solution of sodium hydroxide. (In order to avoid emulsification, the aqueous alkali is gently poured into the separatory funnel and the layers are separated without shaking the funnel. The last two extracts may be shaken with care.) The dark liquor is back-extracted two times with ether, and finally acidified in the cold with saturated aqueous solution of sodium dihydrogen phosphate. The neutral ether-benzene fraction should be set aside and processed as described below. The product is extracted into ether, and the ether extracts are washed free of acid with a saturated solution of sodium chloride. After drying over magnesium sulfate, the ether solution is taken to dryness and the amorphous product is crystallized from methanol to give 17α,20,20,21-bis(methylenedioxy) - 9α - fluoro - 2-hydroxy-methylene-16α-methyl-4,6-pregnadiene-3,11-dione. This material is satisfactory for use in the next step.

A 1.00 g. aliquot of 17α,20,20,21-bis(methylenedioxy)-9α - fluoro-2-hydroxymethylene-16α-methyl-4,6-pregnadiene-3,11-dione is suspended in 44 ml. of absolute ethanol and treated with 0.38 ml. of hydrazine hydrate (99–100%). The air in the system is replaced with nitrogen and the mixture is quickly brought to the reflux temperature. After refluxing for one hour the mixture is taken to dryness; the residual oil is treated with water and the resulting amorphous solid is removed by filtration, washed thoroughly with water and dried. The yield is about 900 mg. The crude product is dissolved in absolute ethanol and concentrated in vacuo until the solid separates. The solid is redissolved by heating, and then allowed to crystallize slowly to afford 17α,20,20,21-bis(methylenedioxy)-9α - fluoro-16α-methyl-11-oxo-4,6-pregnadieno-[3,2-c] pyrazole.

A 455 mg. aliquot of 17α,20,20,21-bis(methylenedioxy)-9α - fluoro - 16α-methyl-11-oxo-4,6-pregnadieno[3,2-c]-pyrazole is suspended in 75 ml. of a solution of sodium borohydride in isopropanol which is prepared by suspending an excess of sodium borohydride in isopropanol, stirring vigorously for about 15 minutes, and filtering to separate the excess of sodium borohydride. To the suspension is added an 0.816 ml. aliquot of a solution of 0.55 ml. of triethylamine in 1.45 ml. of isopropanol. The mixture is stirred, and enough methylene chloride (about 30 ml.) is added, with cooling, to make the system homogeneous. One drop of water (ca. 1/20 ml.) is added and the mixture is stirred in a nitrogen atmosphere at room temperature overnight. Insolubles generally separate out in the course of the reaction. The mixture is then cooled, and the excess of sodium borohydride is decomposed by the addition of cold 2.5 N hydrochloric acid. The mixture (pH ca. 5) is taken to dryness in vacuo and the residue is washed with water and dried to give 17α,20,20,21-bis (methylenedioxy) - 9α-fluoro-11β-hydroxy-16α-methyl-4, 6-pregnadieno-[3,2-c]-pyrazole.

To a solution of 100 mg. of 17α,20,20,21-bis(methylenedioxy) - 9α - fluoro-11β-hydroxy-16α-methyl-4,6-pregnadieno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethylacetate is then distilled at about 40° C. in vacuo to afford the N-acetyl-17α,20,20,21-bis (methylenedioxy) - 9α - fluoro-11β-hydroxy-16α-methyl-4,6-pregnadieno-[3,2-c]-pyrazole which is isolated by the addition of water and filtration.

In accordance with the above procedure, but using an equivalent quantity of another acylating agent in place of acetic anhydride, there is obtained the corresponding N-acyl derivative.

The N - acetyl-17α,20,20,21-bis(methylenedioxy)-9α-fluoro - 11β - hydroxy-16α-methyl-4,6-pregnadieno[3,2-c]-pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of N-acetyl-9α - fluoro - 11β-17α,21-trihydroxy-16α-methyl-20-oxo-4, 6-pregnadieno-[3,2-c]pyrazole and N-acetyl-9α-fluoro-21-formyloxy - 11β,17α - dihydroxy-16α-methyl-20-oxo-4,6-pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-fluoro-11β,17α,21-trihydroxy-16α-methyl-20 - oxo - 4,6-pregnadieno-[3,2-c]-pyrazole.

To a solution of 100 mg. of N-acetyl - 9α - fluoro-11β,17α,21-trihydroxy - 16α - methyl-20-oxo - 4,6-pregnadieno[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The N-acetyl-9α-fluoro-11β,17α-21-trihydroxy-16α-methyl - 20 - oxo - 4,6-pregnadieno[3,2-c]pyrazole 21-acetate is then isolated by addition of water and filtration.

In accordance with the above procedure, but using an equivalent quantity of another acylating agent in place of acetic anhydride, there is obtained the corresponding N-acetyl-9α-fluoro-11β,17α,21 - trihydroxy - 16α-methyl-20-oxo-4,6-pregnadieno-[3,2-c]pyrazole 21-acylate.

In accordance with the above procedure, but starting with the 9α-fluoro-11β,17α,21-trihydroxy-16α-methyl-20-oxo-4,6-pregnadieno-[3,2-c]pyrazole and using two milliequivalents of another acylating agent, there is obtained the corresponding N-acyl-21-acylate thereof.

A solution of 5.73 g. of N-acyl-9α-fluoro-11β,17α,21-trihydroxy-16α-methyl-20-oxo - 4,6-pregnadieno-[3,2-c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords 9α-fluoro-11β,17α,21 - trihydroxy - 16α-methyl-20-oxo-4,6 - pregnadieno-[3,2-c]pyrazole 21-acetate.

To a solution of 85 mg. of N - acetyl - 9α - fluoro-11β,17α,21-trihydroxy - 16α - methyl-20-oxo - 4,6 - pregnadieno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-acetyl-9α-fluoro-11β-17α,21-trihydroxy-16α-methyl - 20 - oxo - 4,6-pregnadieno-[3,2-c]pyrazole 21 mesylate.

To 180 mg. of N-acetyl-9α-fluoro - 11β,17α,21 - trihydroxy-16α-methyl-20-oxo - 4,6 - pregnadieno-[3,2-c]-pyrazole 21-mesylate dissolved in 10 ml. of acetone is added 300 mg. of sodium iodide. The resulting mixture is heated at reflux temperature for a period of approximately one hour, and the reaction solution is cooled to room temperature and diluted with water. The material which precipitates is recovered by filtration, washed with water, and dried to give N-acetyl-9α-fluoro-11β,17α-dihydroxy-21-iodo-16α-methyl-20-oxo - 4,6 - pregnadieno-[3,2-c]pyrazole.

The N-acetyl-9α-fluoro-11β,17α-dihydroxy - 21 - iodo-16α-methyl-20-oxo-4,6 - pregnadieno - [3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, the material which separates is recovered by filtration. The product is washed with water, dried and recrystallized from ethyl acetate to give N-acetyl-9α-fluoro-11β,17α-dihydroxy - 16α - methyl-20-oxo-4,6-pregnadieno-[3,2-c]pyrazole.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-fluoro-11β,17α-dihydroxy-16α-methyl-20-oxo - 4,6-pregnadieno - [3,2-c]pyrazole.

To a solution of 62 mg. of N-acetyl - 9α - fluoro-11β,17α,21-trihydroxy-16α-methyl - 20 - oxo - 4,6-pregnadieno-[3,2-c]pyrazole 21-mesylate in 1 ml. of freshly distilled anhydrous dimethyl-formamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21-epoxy-9α-fluoro - 11β - hydroxy-16α-methyl-20-oxo-4,6-pregnadieno - [3,2-c]pyrazole and N-acetyl-9α,21-difluoro-11β,17α-dihydroxy - 16α - methyl-20-oxo - 4,6 - pregnadieno-[3,2-c]pyrazole, which compounds are separated by partition chromatography, or by chromatography on silica gel.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,21-difluoro-17α,21-dihydroxy-16α-methyl-20-oxo-4,6 - pregnadieno - [3,2-c]-pyrazole.

*Example 33*

A suspension of 16α-methyl-11β,17α-dihydroxy-21-acetoxy-4-pregnene-3,20-dione (111 mg.) and 243 mg. of chloranil in 5 ml. of t-butanol is heated at reflux temperature for about 3 hours. The solvent is then removed by concentration to dryness in vacuo leaving a solid residue comprising the 4,6-pregnadiene product. The product is extracted from the solid mass with chloroform. The chloroform is then washed successively with portions of aqueous sodium thiosulfate, aqueous potassium hydroxide and water. The chloroform extract of product is then dried and concentrated to a crude crystalline solid which is recrystallized from ethyl-acetate to give substantially pure 16α - methyl - 11β,17α - dihydroxy - 21-acetoxy-4,6-pregnadiene-3,20-dione;

$$\lambda_{max.}^{MeOH} \ 283 \ m\mu.$$

The product is converted to 16α-methyl-11β,17α,21-trihydroxy-4,6-pregnadiene-3,20-dione by treatment with a solution of potassium bicarbonate in aqueous methanol.

In similar manner 16β-methyl-11β,17α-dihydroxy-21-acetoxy-4-pregnene-3,20-dione is converted to 16β-methyl-11β,17α - dihydroxy - 21 - acetoxy - 4,6 - pregnadiene - 3, 20 - dione and 16β - methyl - 11β,17α,21 - trihydroxy-4,6-pregnadiene-3,20-dione.

*Example 34*

In the manner given in Example 33, 16α-methyl-17α-hydroxy - 21 - acetoxy - 4 - pregnene - 3,11,20 - trione is dehydrogenated with chloranil to give 16α-methyl-17α-hydroxy - 21 - acetoxy - 4,6 - pregnadiene - 3,11,20 - trione which is then hydrolyzed with potassium bicarbonate in aqueous methanol to give 16α-methyl-17α,21-dihydroxy-4,6-pregnadiene-3,11,20-trione.

In the manner given in Example 33, dehydrogenating with chloranil 16β-methyl-17α-hydroxy-21-acetoxy-4-pregnene - 3,11,20 - trione yields 16β - methyl - 17α-hydroxy-21-acetoxy-4,6-pregnadiene-3,11,20-trione which is hydrolyzed with potassium bicarbonate to give 16β-methyl - 17α,21 - dihydroxy - 4,6 - pregnadiene - 3,11, 20-trione.

Example 35

In the manner given in Example 33, 16α-methyl-17α-hydroxy - 21 - acetoxy - 9α - fluoro - 4 - pregnene - 3,11,20-trione is hydrogenated with chloranil and t-butanol to give 16α - methyl - 17α - hydroxy - 21 - acetoxy - 9α-fluoro - 4,6-pregnadiene - 3,11,20 - trione and 16α-methyl - 17α - hydroxy - 21 - acetoxy - 9α - chloro - 4-pregnene-3,11,20-trione is dehydrogenated to give 16α-methyl - 17α - hydroxy - 21 - acetoxy - 9α - chloro - 4,6-pregnadiene-3,11,20-trione. These 21-acetoxy-4,6-pregnadienes are hydrolyzed with potassium bicarbonate and aqueous methanol to give respectively, the 9α-fluoro and 9α-chloro derivatives of 16α-methyl-17α,21-dihydroxy-4,6-pregnadiene-3,11,20-trione.

In the manner given in Example 33, and dehydrogenating with chloranil 16β-methyl-17α-hydroxy-21-acetoxy-4 - pregnene - 3,11,20 - trione yields 16β - methyl - 17α-hydroxy - 21 - acetoxy - 4,6 - pregnadiene - 3,11,20 - trione which is hydrolyzed with potassium bicarbonate and aqueous methanol to give 16β-methyl-17α,21-dihydroxy-4,6-pregnadiene-3,11,20-trione.

Example 36

In the manner given in Example 33, the 9α-fluoro and 9α-chloro derivatives of 16α-methyl-11β,17α-dihydroxy-21-acetoxy-4-pregnene-3,20-dione are dehydrogenated with chloranil and refluxing t-butanol to give, respectively, the 9α-fluoro and 9α-chloro derivatives of 16α-methyl-11β,17α - dihydroxy - 21 - acetoxy - 4,6 - pregnadiene - 3,20-dione which are hydrolyzed with potassium bicarbonate and aqueous methanol to give, respectively, 16α-methyl-11β,17α,21 - trihydroxy - 9α - fluoro - 4,6 - pregnadiene-3,20-dione and 16α-methyl-11β,17α,21-trihydroxy-9α-chloro-4,6-pregnadiene-3,20-dione.

In the manner given in Example 33, and dehydrogenating with chloranil the 9α-fluoro and 9α-chloro derivatives of 16β - methyl - 11β,17α - dihydroxy - 21 - acetoxy - 4-pregnene-3,20-dione yield, respectively, the 9α-fluoro and 9α-chloro derivatives of 16β-methyl-11β,17α-dihydroxy-21 - acetoxy - 4,6 - pregnadiene - 3,20 - dione which are hydrolyzed with potassium bicarbonate and aqueous methanol to give, respectively, 16β-methyl-11β,17α,21-trihydroxy - 9α - fluoro - 4,6 - pregnadiene - 3,20 - dione and 16β - methyl - 11β,17α,21 - trihydroxy - 9α - chloro-4,6-pregnadiene-3,20-dione.

Example 37

Fifty milliliters of a nutrient medium are prepared having the following composition:

Cerelose _____ g__ 1
Edamin _____ g__ 1
Cornsteep liquor _____ ml__ 0.25
Distilled water to make 50 ml.

This medium is adjusted to pH 6.5 with KOH, sterilized and inoculated with about 2.5 to 5 ml. of a culture of *Bacillus sphaericus* (ATCC–245) microorganisms, and the inoculated culture is then incubated at a temperature of 28° C., with agitation for a 24-hour period. To the resulting culture is added a solution containing 10 mg. of 16α - methyl - 11β,17α,21 - trihydroxy - 4,6 - pregnadiene-3,20-dione dissolved in 0.2 ml. of dimethylformamide. The culture containing the steroid compound is incubated, with agitation for an additional period of about 24 hours at 28° C.

The fermentation broth is extracted with four 50 ml. portions of ethyl acetate and the ethyl acetate extracts are combined and evaporated in vacuo to a volume of about 5 ml. The concentrated solution is then streaked on paper chromatograms which are developed using formamide as the stationary phase and chloroform as the mobile phase. After 6 hours development in a descending system, the bands for each chromatogram corresponding to the 1,4,6-pregnatriene product are located by the characteristic ultraviolet absorption, cut off and extracted with methanol. The methanol extract from the second chromatography is evaporated to dryness in vacuo to give a residue comprising 16α-methyl-11β,17α,21-trihydroxy-1,4,6-pregnatriene-3,20-dione which may be further purified by crystallization from ethyl acetate. The 16α-methyl-11β,17α,21 - trihydroxy - 1,4,6 - pregnatriene - 3,20-dione is treated with acetic anhydride and pyridine to give 16α-methyl - 11β,17α - dihydroxy - 21 - acetoxy - 1,4,6-pregnatriene-3,20-dione.

Example 38

The fermentation procedure of Example 37, is repeated but using, in place of 16α-methyl-11β,17α,21-trihydroxy-4,6-pregnadiene-3,20-dione employed in Example 37, the steroid starting compound indicated in the table hereinbelow. The resulting fermentation broths are treated in accordance with the isolation methods described in Example 37 to give, for the steroid substrate used, the 16-methyl-11-oxygenated 17α,21-dihydroxy-1,4,6 - pregnatriene indicated in the following table:

| Expt. No. | Substrate | 16-methyl-11-oxygenated 17α, 21-dihydroxy-1,4,6-pregnatriene-3,20-dione product |
|---|---|---|
| 1 | 16α-methyl-11β,17α-dihydroxy-21-acetoxy-4,6-pregnadiene-3,20-dione. | 16α-methyl-11β,17α,21-trihydroxy-1,4,6-pregnatriene-3,20-dione |
| 2 | 16β-methyl-11β,17α,21-trihydroxy-4,6-pregnadiene-3,20-dione. | 16β-methyl-11β,17α,21-trihydroxy-1,4,6-pregnatriene-3,20-dione. |
| 3 | 16α-methyl-11β,17α,21-trihydroxy-9α-fluoro-4,6-pregnadiene-3,20-dione. | 16α-methyl-11β,17α,21-trihydroxy-9α-fluoro-1,4,6-pregnatriene-3,20-dione. |
| 4 | 16α-methyl-11β,17α-dihydroxy-21-acetoxy-9α-fluoro-4,6-pregnadiene-3,20-dione. | Do. |
| 5 | 16α-methyl-11β,17α-dihydroxy-4,6-pregnadiene-3,11,20-trione. | 16α-methyl-17α,21-dihydroxy-1,4,6-pregnatriene-3,11,20-trione. |
| 6 | 16β-methyl-17α-hydroxy-21-acetoxy-4,6-pregnadiene-3,11,20-trione. | 16β-methyl-17α,21-dihydroxy-1,4,6 pregnatriene-3,11,20-trione. |

Example 39

A mixture of 0.58 g. 9α-fluoro-21-acetoxy-16α-methyl-11β,17α-dihydroxy-1,4-pregnadiene-3,20-dione and 1.2 g. chloranil in 30 ml. of xylene is maintained at the reflux temperature in an atmosphere of nitrogen for a period of about 16 hours. The entire reaction mixture is cooled to about 25° C. and diluted with approximately 60 ml. of chloroform. The diluted reaction mixture is then washed sequentially with 60 ml. cold aqueous 10% sodium thiosulfate solution, 60 ml. cold aqueous 5% potassium hydroxide solution and two 30 ml. portions of ice water. The entire reaction mixture is then dried and chromatographed over alumina to separate it into two main fractions. The first fraction which is obtained by elution of the alumina with benzene contains very little of the desired product and is not further characterized. The second fraction which is obtained by elution with chloroform contains the desired product 9α-fluoro-21-acetoxy-11β,17α-dihydroxy-1,4,6-pregnatriene-3,20-dione which could be recognized by its characteristic absorption peak at 298 mμ. To further separate and purify the product the chloroform eluate is subjected to partition chromatography in the following manner: A suitable solvent system for this separation is composed of a stationary phase which consists of ethylene glycol equilibrated with a mixture of 30% iso-octane and 70% ethylene dichloride, and a mobile phase complementary to the stationary phase, i.e. 30% iso-octane-70% ethylene dichloride equilibrated with ethylene glycol. The chromatograph column having a diameter of approximately 27 mm. and a bed length of about 100 cm. is prepared so that it will contain approximately 120–130 g. of Super-Cel and have a hold up volume of about 370 ml. To prepare the column the desired quantity of Super-Cel is slurried with the mobile phase while 0.5 ml. of the stationary phase per gram of support is titrated into the slurry. The column is packed by allowing the slurry to "rain" down into the column which has been filled with the mobile phase. The packing is then completed by applying 5 lbs. of nitrogen pressure until the bed length is approximately 120–130 ml.

The chloroform eluate from the alumina chromatography containing the desired product is then evaporated in vacuo to remove the solvent and dissolved in approximately 10–30 ml. of the mobile phase which is charged to the top of the column. The column is then developed using the mobile phase and the ultraviolet absorption of the column eluate observed to detect the presence of the characteristic absorption peak of the 1,4,6-trienone product at 298 m$\mu$. After collection of the fraction containing this product, the fraction is washed with water to remove ethylene glycol, dried and evaporated leaving as a residue the 9$\alpha$-fluoro-21-acetoxy-16$\alpha$-methyl-11$\beta$,17$\alpha$ - dihydroxy-1,4,6-pregnatriene-3,20-dione in crystalline form. The product is further crystallized from ethyl acetate to give substantially pure material having the following characteristics, M.P. 204–209°; $\alpha_D^{23}$ +55° (c. 0.8, CHCl$_3$).

In the manner described above and using as the steroid starting material

9$\alpha$-chloro-21-acetoxy-16$\alpha$-methyl-11$\beta$,17$\alpha$-dihydroxy-1,4-pregnadiene-3,20-dione;
9$\alpha$-fluoro-21-acetoxy-16$\beta$-methyl-11$\beta$,17$\alpha$-dihydroxy-1,4-pregnadiene-3,20-dione;
9$\alpha$-chloro-21-acetoxy-16$\beta$-methyl-11$\beta$,17$\alpha$-dihydroxy-1,4-pregnadiene-3,20-dione;
9$\alpha$-fluoro-21-acetoxy-16$\alpha$-methyl-17$\alpha$-hydroxy-1,4-pregnadiene-3,11,20-trione;
9$\alpha$-chloro-21-acetoxy-16$\alpha$-methyl-17$\alpha$-hydroxy-1,4-pregnadiene-3,11,20-trione;
9$\alpha$-chloro-21-acetoxy-16$\beta$-methyl-17$\alpha$-hydroxy-1,4-pregnadiene-3,11,20-trione and
9$\alpha$-fluoro-21-acetoxy-16$\beta$-methyl-17$\alpha$-hydroxy-1,4-pregnadiene-3,11,20-trione, the products obtained after dehydrogenation and chromatography are, respectively, 9$\alpha$-chloro-21-acetoxy-16$\alpha$-methyl-11$\beta$,17$\alpha$-dihydroxy-1,4,6-pregnatriene-3,20-dione;
9$\alpha$-fluoro-21-acetoxy-16$\beta$-methyl-11$\beta$,17$\alpha$-dihydroxy-1,4,6-pregnatriene-3,20-dione;
9$\alpha$-chloro-21-acetoxy-16$\beta$-methyl-11$\beta$,17$\alpha$-dihydroxy-1,4,6-pregnatriene-3,20-dione;
9$\alpha$-fluoro-21-acetoxy-16$\alpha$-methyl-17$\alpha$-hydroxy-1,4,6-pregnatriene-3,11,20-trione;
9$\alpha$-chloro-21-acetoxy-16$\alpha$-methyl-17$\alpha$-hydroxy-1,4,6-pregnatriene-3,11,20-trione;
9$\alpha$-chloro-21-acetoxy-16$\beta$-methyl-17$\alpha$-hydroxy-1,4,6-pregnatriene-3,11,20-trione and
9$\alpha$-fluoro-21-acetoxy-16$\beta$-methyl-17$\alpha$-hydroxy-1,4,6-pregnadiene-3,11,20-trione;

*Example 40*

10 grams of 16$\alpha$-methyl-4-pregnene-17$\alpha$,21-diol-3,11-20-trione are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17$a$,20,20,21-bismethylenedioxy-16$a$-methyl-4-pregnene-3,11-dione.

10 grams of 17$\alpha$,20,20,21-bismethylenedioxy-16$\alpha$-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is adsorbed from its solution in benzene on 250 g. of acid-washed alumina, and the resulting adsorbate is eluted utilizing mixtures of ether-petroleum ether to give 3-ethylenedioxy-17$\alpha$,20,20,21-bismethylenedioxy-16$\alpha$-methyl-5-pregnene-11-one.

A mixture of 10 grams of 3-ethylenedioxy-17$\alpha$,20,20,21-bismethylenedioxy-16$\alpha$-methyl-5-pregnene-11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture to give 3-ethylenedioxy-17$\alpha$,20,20,21-bismethylenedioxy - 16$\alpha$ - methyl-5,6-epoxy-pregnane-11-one.

The latter product is dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sulfate, and evaporated in vacuo to give a mixture of 17$\alpha$,20,20,21-bismethylenedioxy - 16$\alpha$ - methyl-6-formyloxy-pregnane-5-ol-3,11-dione and 17$\alpha$,20,20,21-bismethylenedioxy-16$\alpha$-methyl - 5 - formyloxy-pregnane-6-ol-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution dried over anhydrous sodium sulfate, and evaporated to dryness in vacuo. The residual material is crystallized from methanol to give 17$\alpha$,20,20,21-bismethylenedioxy - 16$\alpha$ - methyl-allopregnane-3,6,11-trione.

A solution containing about 5 grams of 17$\alpha$,20,20,21-bismethylenedioxy - 16$\alpha$ - methyl - allopregnane-3,6,11-trione and 0.1 g. of p-toluenesulfonic acid in 120 cc. butanone dioxolane is heated under reflux for a period of about 10 minutes. The reaction solution is cooled to about 0–5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give a 3-ethylenedioxy-17$\alpha$,20,20,21-bismethylenedioxy - 16$\alpha$ - methyl-allopregnane-6,11-dione.

A solution containing about 5 grams of 3-ethylenedioxy - 17$\alpha$,20,20,21 - bismethylenedioxy - 16$\alpha$ - methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17$\alpha$,20,20,21-bismethylenedioxy - 6α,16α-dimethyl-allopregnane-6β-ol-11-one.

A solution containing 5.5 cc. of freshly distilled thionyl chloride in 26 cc. of cold anhydrous pyridine is added dropwise, with stirring, to a solution of 5.0 g. of 3-ethylenedioxy - 17α,20,20,21 - bismethylenedioxy-6α,16α-dimethyl-allopregnane-6β-ol-11-one in 32 cc. of anhydrous pyridine, while maintaining the temperature of the reaction mixture at approximately 40° C. The reaction solution is stirred for an additional 30-minute period following the addition of the thionyl chloride reagent, and the reaction mixture is then cooled to about 0-5° C. and poured into 180 cc. ice water. The aqueous mixture is extracted with chloroform and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy-17α,20,20,21-bismethylenedioxy - 6,16α - dimethyl-5-pregnene-11-one.

A solution containing about 5 grams of 3-ethylenedioxy-17α,20,20,21-bismethylenedioxy - 6,16α - dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 6α,16α - dimethyl-4-pregnene-3,11-dione.

About 0.1 gram of 17α,20,20,21-bismethylenedioxy-6α,16α-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0-5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-4-pregnene-17α,21-diol-3,11,20-trione 21-acetate.

To a solution of 100 mg. of 6α,16α-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6α,16α-dimethyl-1,4-pregnadiene-17α,21-diol-3,11,20-trione 21-acetate.

*Example 41*

To a solution of 100 mg. of 17α,20,20,21-bismethylenedioxy-6α,16α-dimethyl-4-pregnene - 3,11 - dione, prepared as described in Example 40 hereinabove, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 17α,20,20,21-bismethylenedioxy-6α,16α-dimethyl - 1,4 - pregnadiene-3,11-dione.

About 0.1 gram of 17α,20,20,21-bismethylenedioxy-6α,16α-dimethyl-1,4-pregnadiene-3,11-dione is suspended in 18 cc. of 30% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α, 16α-dimethyl-1,4-pregnadiene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0-5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-17α,21-diol-3,11,20-trione 21-acetate.

*Example 42*

About 5 grams of 3-ethylenedioxy-17α,20,20,21-bismethylenedioxy-6,16α-dimethyl-5-pregnene-11-one, which can be prepared as described in Example 40 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21-bismethylenedioxy-6,16α-dimethyl-4-pregnene-11β-ol.

A solution containing about 5 grams of 3-ethylenedioxy-17α,20,20,21-bismethylenedioxy-6,16α-dimethyl-5-pregnene-11β-ol, 500 cc. of anhydrous acetone and about 0.5 g. of p-toluenesulfonic acid monohydrate is allowed to stand for a period of about 15 hours. The reaction solution is poured into water and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy-6α,16α-dimethyl-4-pregnene-11β-ol-3-one.

About 0.1 gram of 17α,20,20,21-bismethylenedioxy-6α,16α-dimethyl-4-pregnene-11β-ol-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-4-pregnene-11β,17α21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-4-pregnene-11β,17α,21-triol-3,20-dione 21-acetate.

To a solution of 100 mg. of 6α,16α-dimethyl-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Super-Cel) to give 6α,16α-dimethyl-1,4-pregnadiene-11β,17α,21-triol-3,20-dione 21-acetate.

*Example 43*

To a solution of 100 mg. of 17α,20,20,21-bismethylenedioxy-6α,16α-dimethyl-4-pregnene-11β-ol-3-one, prepared as described in Example 40 hereinabove, in 6 ml. t-butanol and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Super-Cel) to give 17α,20,20,21-bismethylenedioxy-6α,16α-dimethyl-1,4-pregnadiene-11β-ol-3-one.

About 0.1 gram of 17α,20,20,21-bismethylenedioxy-6α,16α-dimethyl-1,4-pregnadiene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16α-dimethyl-1,4-pregnadiene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16α-dimethyl-1,4-pregnadiene-11β,17α,21-triol-3,20-dione 21-acetate.

*Example 44*

To a cooled solution of 436 mg. of 6α,16α-dimethyl-4-pregnene-11β,17α,21-triol-3,20-dione 21-acetate (which can be prepared as described in Example 42 hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6α,16α-dimethyl-4,9(11)-pregnadiene-17α,21-diol-3,20-dione 21-acetate. A suspension of 330 mg. of 6α,16α-dimethyl-4,9(11)-pregnadiene-17α,21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two-and-one-half hours during which time the solid material slowly dissolves. The resulting yellow solution is treated with 1.0 ml. of allyl alcohol to discharge the color and the remaining N-bromo-succinimide, and the remaining solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-6α,16α-dimethyl-4-pregnene-11β,17α,21-triol-3,20-dione 21-acetate.

A solution of 210 mg. of 9α-bromo-6α,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6α,16α-dimethyl - 9,11-epoxy-4-pregnenes-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6α,16α-dimethyl-9,11-epoxy-4-pregnene-17α,21-diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 6α,16α-dimethyl-9α-fluoro-4 - pregnene-11β,17α,21-triol-3,20-dione 21-acetate. Fifty milligrams of 6α,16α-dimethyl-9α-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-11β,17α,21-triol-3,20-dione.

To a solution of 100 mg. of 6α,16α-dimethyl-9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Super-Cel), to give 6α,16α - dimethyl-9α-fluoro-1,4-pregnadiene-11β,17α,21-triol-3,20-dione 21-acetate. This material is hydrolyzed using 1 N methanolic potassium hydroxide in benzene as described above for the hydrolysis of 6α,16α-dimethyl-9α-fluoro - 4-pregnene-11β,17α,21-triol-3,20-dione 21-acetate to give 6α,16α - dimethyl-9α-fluoro-1,4-pregnadiene-11β,17α,21-triol-3,20-dione.

Example 45

A solution of 400 mg. of 6α,16α-dimethyl-9α-fluoro-4 - pregnene - 11β,17α,21-triol-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 6α,16α - dimethyl - 9α-fluoro-4-pregnene-17α,21-diol-3,11,20-trione 21-acetate. Fifty milligrams of 6α,16α-dimethyl - 9α - fluoro-4-pregnene-17α,21-diol-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-17α,21-diol-3,11,20-trione.

To a solution of 100 mg. of 6α,16α-dimethyl-9α-fluoro-4 - pregnene - 17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6α,16α-dimethyl-9α-fluoro-1,4-pregnadiene-17α,21-diol-3,11,20-trione 21-acetate. This material is hydrolyzed using 1 N methanolic potassium hydroxide in benzene as described hereinabove for the hydrolysis of 6α,16α - dimethyl - 9α-fluoro-4-pregnene-17α,21-diol-3,11,20-trione 21-acetate to give 6α,16α-dimethyl-9α-fluoro-1,4-pregnadiene-17α,21-diol-3,11,20-trione.

Example 46

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of *Bacillus sphaericus* (ATCC 245) microorganisms, and the inoculated culture is then incubated at a temperature of 28° C., with agitation, for a 24-hour period. To the resulting culture is added a solution containing 10 mg. of 6α,16α-dimethyl-4-pregnene-17α,21-diol-3,11,20-trione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene-50% chloroform as the mobile phase. After 8 hours development in a descending system, the upper bands for each chromatogram, corresponding to the Δ¹-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-17α,21-diol-3,11,20-trione.

The 6α,16α-dimethyl-1,4-pregnadiene-17α,21-diol - 3,11, 20-trione is treated with acetic anhydride and pyridine to give the 21-acetyl derivative, which is purified by recrystallization to give substantially pure 6α,16α-dimethyl-1,4-pregnadiene-17α,21-diol-3,11,20-trione 21-acetate.

Example 47

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make 50 ml. | | |

This medium is adjusted to pH 6.5 KOH, sterilized and inoculated with about 2.5 to 5 ml. of a culture of *Nocardia asteroides* (ATCC 9970) microorganisms, and the inoculated culture is then incubated at a temperature of 28° C., with agitation, for a 24-hour period. To the resulting culture is added a solution containing 10 mg. of 6α,16α- dimethyl-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate and the ethyl acetate extracts are combined and evaporated in vacuo to a volume of about 5 ml. The concentrated solution is then streaked on paper chromatograms which are developed using formamide as the stationary phase and 50% benzene-50% chloroform as the mobile phase. The upper bands for each chromatogram corresponding to the Δ¹-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-11β,17α,21-triol-3,20-dione.

The 6α,16α-dimethyl-1,4-pregnadiene-11β,17α,21-triol-3,20-dione is treated with acetic anhydride and pyridine, and the acetylated product recrystallized to give substantially pure 6α,16α-dimethyl-1,4-pregnadiene - 11β,17α,21-triol-3,20-dione 21-acetate.

*Example 48*

Fifty milliliters of a nutrient medium are prepared having the following composition:

Cerelose _____ g__ 1
Edamin _____ g__ 1
Cornsteep liquor _____ ml__ 0.25
Distilled water to make 50 ml.

This medium is adjusted to pH 6.5 KOH, sterilized and inoculated with about 2.5 to 5 ml. of a culture of *Mycobacterium smegmatis* (NRRL B-1667) microorganisms, and the inoculated culture is then incubated at a temperature of 28° C., with agitation, for a 24-hour period. To the resulting culture is added a solution containing 10 mg. of 6α,16α-dimethyl-9α - fluoro-4-pregnene - 11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml. portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and 50% benzene-50% chloroform as the mobile liquid phase. Two bands are secured, one of which corresponds to the more mobile component, the 6α,16α-dimethyl-9α-fluoro-4-pregnene-11β,17α,21-triol-3,20-dione starting material, and the other corresponds to the less mobile component, the Δ¹-dehydro derivative. The paper chromatogram is dried, and the latter band is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the starting material with the major band that corresponding to the less mobile component, the Δ¹-dehydro derivative. The paper chromatogram is thoroughly dried, and the band corresponding to the less mobile component is cut off and extracted with methanol. The methanol extract is evaporated to dryness in vacuo to give 6α,16α-dimethyl-9α-fluoro-1,4-pregnadiene-11β,17α,21-triol-3,30-dione.

The 6α,16α-dimethyl-9α - fluoro - 1,4-pregnadiene-11β,17α,21-triol-3,20-dione is reacted with excess acetic anhydride in pyridine to give the 21-acetyl derivative which is purified by recrystallization from benzene-petroleum ether to give substantially pure 6α,16α-dimethyl-9α-fluoro-1,4-pregnadiene-11β,17α,21-triol-3,20-dione 21-acetate.

*Example 49*

The fermentation procedures of Examples 46, 47 and 48 are repeated but using, in place of the microorganisms and the 6α,16α-dimethyl-11-oxygenated-4-pregnene-17α,21-diol-3,20-dione starting material employed in those examples, the microorganism strains and steroid starting compounds indicated in the table hereinbelow. The resulting fermentation broths are treated in accordance with the isolation methods described in Examples 46, 47 and 48 to give, for the particular microorganism strain and steroid substrate used, the 6α,16α - dimethyl-11-oxygenated-1,4-pregnadiene-17α,21-diol-3,20-dione indicated in the following table:

| Expt. No. | Substrate | Microorganism | 6α,16α-dimethyl-11-oxygenated-1,4-pregnadiene-17α,21-diol-3,20-dione product |
|---|---|---|---|
| 1 | 6α,16α-dimethyl-9α-fluoro-4-pregnene-17α,21-diol-3,11,20-trione 21-acetate. | *Bacillus sphaericus* ATCC-7055. | 6α,16α-dimethyl-9α-fluoro-1,4-pregnadiene-17α,21-diol-3,11,-20-trione. |
| 2 | 6α,16α-dimethyl-9α-fluoro-4-pregnene-11β,17α,21-triol-3,20-dione 21-acetate. | *Bacillus sphaericus* ATCC-7063. | 6α,16α-dimethyl-9α-fluoro-1,4-pregnadiene-11β,17α,21-triol-3,20-dione. |
| 3 | 6α,16α-dimethyl-9α-fluoro-4-pregnene-17α-21-diol-3,11,20-trione. | *Nocardia leishmanii* ATCC-6855. | 6α,16α-dimethyl-9α-fluoro-1,4-pregnadiene-17α,21-diol-3, 11, 20-trione. |
| 4 | 6α,16α-dimethyl-9α-fluoro-4-pregnene-11β,17α,21-triol-3,20-dione. | *Nocardia formica* NRRL-2470. | 6α,16α-dimethyl-9α-fluoro-1,4-pregnadiene-11β,17α,21-triol-3,20-dione. |
| 5 | 6α,16α-dimethyl-4-pregnene-11β,17α,21-triol-3,20-dione. | *Mycobacterium phlei* ATCC-12,298. | 6α,16α-dimethyl-1,4-pregnadiene-11β, 17α,21-triol-3,20-dione. |
| 6 | 6α,16α-dimethyl-4-pregnene-17α,21-diol-3,11,20-trione. | *Mycobacterium lacticola* ATCC-21,297. | 6α,16α-dimethyl-1,4-pregnadiene-17α,21-diol-3,11,20-trione. |

*Example 50*

About 400 mg. of 3-ethylenedioxy-17α,20,20,21-bis-methylenedioxy - 16α - methyl - 5,6-epoxy - pregnane-11-one is dissolved in about 100 ml. of benzene, and the solution purged with nitrogen. To the resulting solution is added about 3.7 ml. of a 3-molar solution of methyl magnesium bromide, and the resulting mixture is stirred at a temperature of about 70° C. in a nitrogen atmosphere for a period of about 5 hours. The reaction solution is cooled to about 0–5° C., and approximately 9 g. of ammonium chloride in 90 ml. of water is added over a 20-minute period. The layers are separated, and the aqueous layer extracted with a small portion of benzene. The benzene extracts are combined, washed with three 25 ml. portions of water, dried over magnesium sulfate, and evaporated to dryness in vacuo to give 3-ethylenedioxy-17α,20,20,21 - bismethylenedioxy - 6β,16α-dimethyl-allopregnane-5α-ol-11-one.

Approximately 100 mg. of 3-ethylenedioxy-17α,20,20,21 - bismethylenedioxy-6β,16α-dimethyl-allopregnane-5α-ol-11-one is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy-6β,16α-dimethyl-allopregnane-3,11-dione-5α-ol.

About 100 mg. of 17α,20,20,21-bismethylenedioxy-6β,16α-dimethyl-allopregnane-3,11-dione-5α-ol is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene and mixtures of benzene and ether, as the eluting solvents. The product obtained by evaporation of the ether-rich fractions is recrystallized from mixtures of ethyl acetate and ether to give substantially pure 17α,20,20,21 - bismethylenedioxy - 6β,16α - dimethyl-4-pregnene-3,11-dione.

About 0.1 gram of 17α,20,20,21-bismethylenedioxy-6β,16α - dimethyl-4-pregnene-3,11 - dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16α - dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate and evaporated to dryness in vacuo. The residual material dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16α - dimethyl-4-pregnene-17α,21 - diol-3,11,20-trione 21-acetate.

To a solution of 100 mg. of 6β-16α-dimethyl-4-pregnene-17α,21-diol-3,11,20-trione 21-acetate, in 6 ml. t-butanol, and 10.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6β,16α-dimethyl-1,4-pregnadiene-17α,21-diol-3,11,20-trione 21-acetate.

Example 51

The procedure of Example 41 is repeated but using, in place of the 17α,20,20,21-bismethylenedioxy-6α,16α-dimethyl-4-pregnene-3,11-dione starting material therein employed, 100 mg of 17α,20,20,21-bismethylenedioxy-6β,16α-dimethyl-4-pregnene-3,11-dione, prepared as described in Example 50 hereinabove. In accordance with this procedure there is obtained, via the intermediate formation of 17α,20,20,21-bismethylenedioxy-6β,16α-dimethyl-1,4-pregnadiene-3,11-dione, as final products 6β,16α-dimethyl-1,4-pregnadiene - 17α,21-diol-3,11,20-trione and 6β,16α-dimethyl-1,4-pregnadiene-17α,21-diol-3,11,20-trione 21-acetate.

Example 52

About 5 g. of 3-ethylenedioxy-17α,20,20,21-bismethylenedioxy-6β,16α-dimethyl - allopregnane - 11 - one-5α-ol, which can be prepared as described in Example 50 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21-bismethylenedioxy-6β,16α-dimethyl-allopregnane-5α,11β-diol.

Approximately 100 mg. of 3-ethylenedioxy-17α,20,20,21-bismethylenedioxy-6β,16α-dimethyl - allopregnane-5α-11β-diol is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy-6β,16α-dimethyl-allopregnane-5α,11β-diol-3-one.

About 100 mg. of 17α,20,20,21-bismethylenedioxy-6β,16α - dimethyl - allopregnane-5α,11β-diol-3-one is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene, and mixtures of benzene and ether, as the eluting solvents. The product obtained by evaporation of the ether-rich fractions is recrystallized from mixtures of ethyl acetate and ether to give substantially pure 17α,20,20,21 - bismethylenedioxy - 6β,16α-dimethyl-4-pregnene-11β-ol-3-one.

About 0.1 gram of 17α,20,20,21-bismethylenedioxy-6β,16α-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16α - dimethyl-4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16α-dimethyl-4-pregnene - 11β,17α,21 - triol-3,20-dione 21-acetate.

To a solution of 100 mg. of 6β,16α-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6β,16α-dimethyl-1,4-pregnadiene-11β,17α,21-triol-3,20-dione 21-acetate.

*Example 53*

To a cooled solution of 436 mg. of 6β,16α-dimethyl-4-pregnene-11β,17α,21-triol-3,20-dione 21-acetate (which can be prepared as described in Example 52 hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6β,16α-dimethyl-4,9(11)-pregnadiene-17α,21-diol-3,20-dione 21-acetate. A suspension of 330 mg. of 6β, 16α-dimethyl-4,9(11)-pregnadiene-17α,21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two-and-one-half hours during which time the solid material slowly dissolves. The resulting yellow solution is treated with 1.0 ml. of allyl alcohol to discharge the color and the remaining N-bromo-succinimide, and the remaining solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give bromo-6β,16α-dimethyl-4-pregnene-11β,17α,21 - triol - 3,20-dione 21-acetate.

A solution of 210 mg. of 9α-bromo-6β,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6β,16α-dimethyl-9,11-epoxy-4-pregnene-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6β,16α-dimethyl-9,11-epoxy-4-pregnene-17α,21-diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 6β,16α-dimethyl-9α-fluoro-4-pregnene-11β,17α,21-triol-3,20-dione 21-acetate. Fifty milligrams of 6β,16α-dimethyl-9α-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6β,16α-dimethyl-9α-fluoro-4-pregnene-11β,17α,21-triol-3,20-dione.

To a solution of 100 mg. of 6β,16α-dimethyl-9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Super-Cel), to give 6β,16α-dimethyl-9α-fluoro-1,4-pregnadiene-11β,17α,21-triol-3,20-dione 21-acetate. This material is hydrolyzed using 1 N methanolic potassium hydroxide in benzene as described above for the hydrolysis of 6β,16α-dimethyl-9α-fluoro-4-pregnene-11β,17α,21-triol-3,20-dione 21-acetate to give 6β,16α-dimethyl-9α-fluoro-1,4-pregnadiene-11β,17α,21-triol - 3,20-dione.

*Example 54*

The procedure of Example 45 is repeated but using, in place of the 6α,16α-dimethyl-9α-fluoro-4-pregnene-11β,17α,21-triol-3,20-dione 21-acetate employed in that example, 400 mg. of 6β,16α-dimethyl-9α-fluoro-4-pregnene-11β,17α,21-triol-3,20-dione 21-acetate, which can be prepared as described in Example 53 hereinabove. In accordance with this procedure there are obtained as products 6β,16α-dimethyl-9α-fluoro-4-pregnene-17α,21-diol-3,11,20-trione 21-acetate; 6β,16α-dimethyl-9α-fluoro-4-pregnene-17α,21-diol-3,11,20-trione; 6β,6α-dimethyl-9α-fluoro-1,4-pregnadiene-17α,21-diol-3,11,20-trione 21-acetate and 6β,16α-dimethyl-9α-fluoro-1,4-pregnadiene-17α,21 - diol-3,11,20-trione, respectively.

*Example 55*

10 grams of 16β-methyl-4-pregnene-17α,21-diol-3,11,20-trione are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16β-methyl-4-pregnene-3,11-dione.

10 grams of 17α,20,20,21-bismethylenedioxy-16β-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is adsorbed from its solution in benzene on 250 g. of acid-washed alumina, and the resulting adsorbate is eluted utilizing mixtures of ether-petroleum ether to give 3-ethylenedioxy-17α,20,20,21-bismethylenedioxy - 16β - methyl - 5 - pregnene-11-one.

A mixture of 10 grams of 3-ethylenedioxy-17α,20,20,21 - bismethylenedioxy - 16β - methyl - 5 - pregnene - 11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture to give 3-ethylenedioxy - 17α,20,20,21 - bismethylenedioxy - 16β - methyl-5,6-epoxy-pregnane-11-one.

The latter product is dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sodium sulfate, and evaporated in vacuo to give a mixture of 17α,20,20,21-bismethylenedioxy-16β-methyl-6-formyloxy-pregnane-5-ol-3,11-dione and 17α,20,20,21-bismethylenedioxy - 16β - methyl - 5 - formyloxy - pregnane-6-ol-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 20 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α,20,20,21-bismethylenedioxy-16β-methyl-allopregnane-3,6,11-trione.

A solution containing about 5 grams of 17α,20,20,21-bismethylenedioxy - 16β - methyl - allopregnane - 3,6,11-trione and 0.1 g. of p-toluenesulfonic acid in 120 cc. butanone dioxolane is heated under reflux for a period of about 10 minutes. The reaction solution is cooled to about 0-5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give 3-ethylenedioxy - 17α,20,20,21 - bismethylenedioxy - 16β-methyl-allopregnane-6,11-dione.

A solution containing about 5 grams of 3-ethylenedioxy - 17α,20,20,21 - bismethylenedioxy - 16β - methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17α,20,20,21-bismethylenedioxy - 6α,16β - dimethyl - allopregnane-6β-ol-11-one.

A solution containing 5.5 cc. of freshly distilled thionyl chloride in 26 cc. of cold anhydrous pyridine is added dropwise, with stirring, to a solution of 5.0 g. of 3-ethylenedioxy - 17α,20,20,21 - bismethylenedioxy - 6α,16β-dimethyl-allopregnane-6β-ol-11-one in 32 cc. of anhydrous pyridine, while maintaining the temperature of the reaction mixture at approximately 40° C. The reaction solution is stirred for an additional 30-minute period following the addition of the thionyl chloride reagent, and the reaction mixture is then cooled to about 0-5° C. and poured into 180 cc. ice water. The aqueous mixture is extracted with chloroform, and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy-17α,20,20,21-bismethylenedioxy-6,16β-dimethyl-5-pregnene-11-one.

A solution containing about 5 grams of 3-ethylenedioxy - 17α,20,20,21 - bismethylenedioxy - 6,16β - dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 6α,16β - dimethyl - 4-pregnene-3,11-dione.

About 0.1 gram of 17α,20,20,21-bismethylenedioxy-6α,16β-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16β-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0-5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform and then with 50 cc. of a 3:7 mixture of ether-chloroform. The eluates are evaporated in vacuo, and the residual material is crystallized from methanol to give 6α,16β-dimethyl-4-pregnene-17α,21-diol-3,11,20-trione 21-acetate.

To a solution of 100 mg. of 6α,16β-dimethyl-4-pregnene-17α,21-diol-3,11,20-trione 21-acetate, in 6 ml. t- butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated. The residual material thus obtained is separated using partition chromatography on diatomaceous silica (Super-Cel) to give 6α,16β-dimethyl-1,4-pregnadiene-17α,21-diol-3,11,20-trione 21-acetate.

Example 56

About 400 mg. of 3-ethylenedioxy-17α,20,20,21-bismethylenedioxy-16β-methyl - 5,6 - epoxy-pregnane-11-one is dissolved in about 100 ml. of benzene, and the solution is purged with nitrogen. To the resulting solution is added about 3.7 ml. of a 3-molar solution of methyl magnesium bromide, and the resulting mixture is stirred at a temperature of about 70° C. in a nitrogen atmosphere for a period of about 5 hours. The reaction solution is cooled to about 0–5° C., and approximately 9 g. of ammonium chloride in 90 ml. of water is added over a 20-minute period. The layers are separated, and the aqueous layer extracted with a small portion of benzene. The benzene extracts are combined, washed with three 25-ml. portions of water, dried over magnesium sulfate, and evaporated to dryness in vacuo to give 3-ethylenedioxy-17α,20,20,21-bismethylenedioxy - 6β,16β - dimethyl-allopregnane-5α-ol-11-one.

Approximately 100 mg. of 3-ethylenedioxy-17α,20,20,21-bismethylenedioxy - 6β,16β - dimethyl-allopregnane-5α-ol-11-one is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21-bismethylenedioxy-6β,16β-dimethyl-allopregnane-3,11-dione 5α-ol.

About 100 mg. of 17α,20,20,21-bismethylenedioxy-6β,16β-dimethyl-allopregnane-3,11-dione-5α-ol is mixed with about 35 cc. of an 0.25% solution of potassium hydroxide in methanol; the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina, utilizing benzene, and mixtures of benzene and ether, as the eluting solvents. The product obtained by evaporation of the ether-rich fractions is recrystallized from mixtures of ethyl acetate and ether to give substantially pure 17α,20,20,21-bismethylenedioxy-6β,16β-dimethyl-4-pregnene-3,11-dione.

About 0.1 gram of 17α,20,20,21-bismethylenedioxy-6β,16β-dimethyl-4-pregnene-3,311-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16β-dimethyl-4-pregnene-17α,21-diol-3,11,20-trione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6β,16β-dimethyl-4-pregnene-17α,21-diol-3,11,20-trione 21-acetate.

To a solution of 100 mg. of 6β,16β-dimethyl-4-pregnene-17α,21-diol-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6β,16β-dimethyl-1,4-pregnadiene-17α,21-diol-3,11,20-trione 21-acetate.

Example 57

The procedure of Example 41 is repeated but using, in place of the 17α,20,20,21-bismethylenedioxy-6α,16α-dimethyl-4-pregnene-3,11-dione starting material there employed, 100 mg. of 17α,20,20,21-bismethylenedioxy-6α,16β-dimethyl-4-pregnene-3,11-dione, which can be prepared as described in Example 55 hereinabove. In accordance with this procedure there are obtained, via the intermediate formation of 17α,20,20,21-bismethylenedioxy-6α,16β-dimethyl-1,4-pregnadiene-3,11-dione, the final products 6α,16β - dimethyl - 1,4-pregnadiene-17α,21-diol-3,11,20-trione and 6α,16β-dimethyl-1,4-pregnadiene-17α,21-diol-3,11,20-trione 21-acetate.

Example 58

The procedure of Example 41 is repeated but using, in place of the 17α,20,20,21 - bismethylenedioxy - 6α,16α-dimethyl-4-pregnene-3,11-dione starting material there employed, 100 mg. of 17α,20,20,21 - bismethylenedioxy-6β,16β-dimethyl-4-pregnene-3,11-dione, which can be prepared as described in Example 56 hereinabove. In accordance with this procedure there are obtained, via the intermediate formation of 17α,20,20,21-bismethylenedioxy-6β,16β-dimethyl-1,4-pregnadiene-3,11-dione, the final products 6β,16β - dimethyl-1,4-pregnadiene-17α,17-diol-3,11,20-trione and 6β,16β - dimethyl - 1,4 - pregnadiene-17α,21-diol-3,11,20-trione 21-acetate.

Example 59

About 5 grams of 3-ethylenedioxy - 17α,20,20,21 - bismethylenedioxy-6,16β-dimethyl-5-pregnene-11-one, which can be prepared as described in Example 55 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21 - bismethylenedioxy-6,16β-dimethyl-5-pregnene-11β-ol.

A solution containing about 5 g. of 3-ethylenedioxy-17α,20,20,21-bismethylenedioxy-6,16β - dimethyl-5-pregnene-11β-ol, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution dried over anhydrous sodium sulfate, and the chloroform solution is evaporated to dryness in vacuo. The residual material is crystallized from benzene to give 17α,20,20,21-bismethylenedioxy - 6α,16β - dimethyl-4-pregnene-11β-ol-3-one.

About 0.1 gram of 17α,20,20,21-bismethylenedioxy-6α,16β-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6α,16β-dimethyl-4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 6α,16β-dimethyl-4-pregnene-11β,17α,21-triol-3,20 - dione 21-acetate.

To a solution of 100 mg. of 6α,16β-dimethyl-4-pregnene-11β,17α,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over an hydrous sodium sulfate. The benzene solution is stirred with mercury overnight then centrifuged and the clear benzene solution is evaporated in vacuo. The residual material thus obtained is separated using partition chromatography on diatomaceous silica (Super-Cel) to give 6α,16β-dimethyl-1,4-pregnadiene-11β,17α,21-triol-3,20-dione 21-acetate.

*Example 60*

About 5 g. of 3-ethylenedioxy-17α,20,20,21-bismethylenedioxy - 6β,16β - dimethyl - allopregnane - 11 - one-5α-ol, which can be prepared as described in Example 56 hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21 - bis - methylenedioxy - 6β,16β - dimethyl - allopregnane-5α,11β-diol.

Approximately 100 mg. of 3-ethylenedioxy-17α,20,20,21 - bismethylenedioxy - 6β,16β - dimethyl - allopregnane-5α,11β-diol is dissolved in about 5 ml. of methanol, and the solution is purged with nitrogen. To this solution is then added 0.4 ml. of an 8% aqueous sulfuric acid solution, and the resulting mixture is heated under reflux for a period of about 35 minutes in a nitrogen atmosphere. At the end of this reflux period, the reaction solution is cooled to 0–5° C., and to the solution is slowly added, over a 10-minute period, a solution of approximately 0.4 g. of sodium carbonate in 12 ml. of water. The resulting slurry is cooled, and the precipitated material is recovered and dried to give 17α,20,20,21 - bismethylenedioxy-6β,16β-dimethyl-allopregnane-5α,11β-diol-3-one.

About 100 mg. of 17α,20,20,21-bismethylenedioxy-6β,16β - dimethyl - allopregnane - 5α,11β - diol - 3 - one is mixed with about 35 cc. of an 0.25% solution of potassium hydroxide in methanol, the resulting mixture is heated under reflux for a period of approximately 2 hours under a nitrogen atmosphere. The reaction mixture is then diluted with water, and the aqueous mixture extracted with ethyl acetate. The ethyl acetate extracts are dried, evaporated to dryness, and the residual material is subjected to chromatographic purification using about 10 g. of washed alumina utilizing benzene, and mixtures of benzene and ether, as the eluting solvents. The produce obtained by evaporation of the ether-rich fractions is recrystallized from mixtures of ethyl acetate and ether to give substantially pure 17α,20,20,21-bismethylenedioxy-6β,16β-dimethyl-4-pregnene-11β-ol-3-one.

About 0.1 gram of 17α,20,20,21-bismethylenedioxy-6β,16β-dimethyl-4-pregnene-11β-ol-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 6β,16β - dimethyl-4-pregnene-11β,17α,21-triol-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then elueated with 250 cc. of a 5:5 mixture of ether-chloroform and then with 50 cc. of a 3:7 mixture of ether-chloroform. The eluates are evaporated in vacuo, and the residual material is crystallized from methanol to give 6β,16β-dimethyl-4-pregnene-11β,17α,21-triol-3,20-dione 21-acetate.

To a solution of 100 mg. of 6β,16β-dimethyl-4-pregnene-11β,17α,21-triol-3,21-triol-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight then centrifuged and the clear benzene solution is evaporated in vacuo. The residual material thus obtained is separated using partition chromatography on diatomaceous silica (Super-Cel) to give 6β,16β - dimethyl - 1,4 - pregnadiene - 11β,17α,21 - triol-3,20-dione 21-acetate.

*Example 61*

The procedure of Example 44 is repeated but using, in place of the 6α,16α-dimethyl-4-pregnene-11β,17α-triol-3,20-dione 21-acetate starting material there employed, about 435 mg. of 6α,16β-dimethyl-4-pregnene-11β,17α,21-triol-3,20-dione 21-acetate, which can be prepared as described in Example 59 hereinabove. In accordance with this procedure, there are obtained, via the intermediate formation of 6α,16β-dimethyl-4,9(11)-pregnadiene-17α,21-diol-3,20-dione 21-acetate; 9α-bromo-6α,16β-dimethyl-4 - pregnene - 11β,17α,21 - triol - 3,20 - dione 21 - acetate and 6α,16β - dimethyl - 9,11 - epoxy - 4 - pregnene - 17α,21-diol-3,20-dione 21-acetate, as final products 6α,16β-dimethyl - 9α - fluoro - 4 - pregnene - 11β,17α,21 - triol 3,20-dione 21-acetate; 6α,16β-dimethyl-9α-fluoro-4-pregnene - 11β,17α, 21-triol-3,20-dione; 6α,16β-dimethyl-9α-fluoro - 1,4 - pregnadiene - 11β,17α,21 - triol - 3,20 - dione 21-acetate and 6α,16β-dimethyl-9α-fluoro-1,4-pregnadiene-11β,17α,21-triol-3,20-dione, respectively.

*Example 62*

The procedure of Example 44 is repeated, but using, in place of 6α,16α-dimethyl-4-pregnene-11β,17α,21-triol-3,20-dione 21-acetate starting material there employed, about 435 mg. of 6β,16β-dimethyl-4-pregnene-11β,17α,21-triol-3,20-dione 21-acetate, which can be prepared as described in Example 60 hereinabove. In accordance with this procedure, there are obtained, via the intermediate formation of 6β,16β-dimethyl-4,9(11)-pregnadiene-17α,21-diol-3,20-dione 21-acetate; 9α-bromo-6β,16β-dimethyl-4-pregnene-11β,17α,21-triol-3,20-dione 21-acetate and 6β,16β - dimethyl - 9,11-epoxy-4-pregnene-17α,21-diol-3,20-dione 21-acetate, as final products 6β,16β-dimethyl-9α-fluoro - 4-pregnene-11β,17α,21-triol-3,20-dione 21-acetate; 6β,16β - dimethyl - 9α-fluoro-4-pregnene-11β,17α,21-triol-3,20 - dione; 6β,16β-dimethyl-9α-fluoro-1,4-pregnadiene-11β,17α,21-triol-3,20-dione 21-acetate and 6β,16β-dimethyl - 9α-fluoro-1,4-pregnadiene-11β,17α,21-triol-3,20-dione, respectively.

*Example 63*

The procedure of Example 45 is repeated but using, in place of the 6α,16α-dimethyl-9α-fluoro-4-pregnene-11β,17α,21-triol-3,20-dione 21-acetate employed, 400 mg. of 6α,16β-dimethyl-9α-fluoro-4-pregnene-11β,17α,21-triol-3,20-dione 21-acetate, which can be prepared as described in Example 61 hereinabove. In accordance with this procedure there are obtained as final products 6α,16β - dimethyl-9α-fluoro-4-pregnene-17α,21-diol-3,11,20-trione 21-acetate– 6α,16β-dimethyl-9α-fluoro-4 - pregnene-17α,21-diol-3,11,20-trione; 6α,16β-dimethyl-9α - fluoro-1,4-pregnadiene-17α,21-diol-3,11,20-trione 21-acetate and 6α,16β-dimethyl-9α-fluoro-1,4-pregnadiene-17α,21-diol-3,11,20-trione, respectively.

*Example 64*

The procedure of Example 45 is repeated but using, in place of the 6α,16α-dimethyl-9α-fluoro-4-pregnene-11β,17α,21-triol-3,20-dione 21-acetate starting material there employed, 400 mg. of 6β,16β-dimethyl-9α-fluoro-4-pregnene-11β,17α,21-triol-3,20-dione 21-acetate which can be prepared as described in Example 62 hereinabove. In accordance with this procedure there are obtained as final products, 6β,16β - dimethyl-9α-fluoro-4-pregnene-17α,21-diol-3,11,20-trione 21-acetate; 6β,16β-dimethyl-9α-fluoro-4 - pregnene-17α,21-diol-3,11,20-trione; 6β,16β-dimethyl-9α- fluoro-1,4-pregnadiene-17α,21-diol-3,11,20-trione 21-acetate and 6β,16β - dimethyl-9α-fluoro-1,4-pregnadiene-17α,21-diol-3,11,20-trione, respectively.

*Example 65*

A suspension containing 300 mg. of 17α,21-dihydroxy-6α,16α-dimethyl-4-pregnene-3,11,20-trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 17α,21-dihydroxy-6,16α-dimethyl - 4,6-pregnadiene-3,11,20-trione 21-acetate. This product is then hydrolyzed by treatment with a solution of potassium bicarbonate in aqueous methanol to form 17α,21 - dihydroxy - 6,16α-dimethyl-4,6-pregnadiene-3,11,20-trione.

In accordance with the above procedure but starting with 17α,21 - dihydroxy-6α,16β-dimethyl-4-pregnene-3,11,20-trione 21-acetate there are obtained 17α,21-dihydroxy-6,16β-dimethyl-4,6-pregnadiene-3,11,20-trione and its 21-acetate.

*Example 66*

A suspension containing 300 mg. of 11β,17α,21-trihydroxy - 6α,16α-dimethyl-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 11β,17α,21-trihydroxy-6,16α-4,6-pregnadiene-3,20-dione 21-acetate. This product is then hydrolyzed by treatment with a solution of potassium bicarbonate in aqueous methanol to form 11β,17α,21-trihydroxy-6,16α-dimethyl-4,6-pregnadiene-3,20-dione.

In accordance with the above procedure but starting with 11β,17α,21 - trihydroxy-6α,16β-dimethyl-4-pregnene-3,20-dione 21-acetate there are obtained 11β,17α,21-trihydroxy-6,16β-dimethyl-4,6-pregnadiene-3,20-dione and its 21-acetate.

*Example 67*

A suspension containing 300 mg. of 9α-fluoro-11β,17α, 21-trihydroxy-6α,16α-dimethyl-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 9α-fluoro-11β,17α,21-trihydroxy - 6,16α-dimethyl-4,6-pregnadiene-3,20-dione 21-acetate. This product is then hydrolyzed by treatment with a solution of potassium bicarbonate in aqueous methanol to form 9α-fluoro-11β,17α,21-trihydroxy-6,16α-dimethyl-4,6-pregnadiene-3,20-dione.

In accordance with the above procedure but starting with 9α-chloro-11β,17α,21-trihydroxy-6α,16α-dimethyl-4-pregnene-3,20-dione 21-acetate, there are obtained the corresponding 9α - chloro - 11β,17α,21-trihydroxy-6,16α-dimethyl-4,6-pregnadiene-3,20-dione and its 21-acetate.

In accordance with the above procedure but starting with 9α-fluoro-11β,17α,21-trihydroxy-6,16α-dimethyl-4-pregnene-3,20-dione 21-acetate, there are obtained the corresponding 9α-bromo - 11β,17α,21 - trihydroxy-6,16α-dimethyl-4,6-pregnadiene-3,20-dione and its 21-acetate.

Similarly, in accordance with the above procedure but starting with 9α-fluoro-11β,17α,21-trihydroxy-6α,16β-dimethyl-4-pregnene-3,20-dione 21-acetate, there is obtained the corresponding 9α-fluoro-11β,17α,21-trihydroxy-6,16β-dimethyl-4,6-pregnadiene-3,20-dione and its 21-acetate.

Similarly, in accordance with the above procedure but starting with 9α-chloro-11β,17α,21-trihydroxy-6α,16β-dimethyl-4-pregnene-3,20-dione 21-acetate, there is obtained the corresponding 9α-chloro-11β,17α,21-trihydroxy-6,16β-dimethyl-4,6-pregnadiene-3,20-dione and its 21-acetate.

Similarly, in accordance with the above procedure but starting with 9α-bromo-11β,17α,21-trihydroxy-6α,16β-dimethyl-4-pregnene-3,20-dione 21-acetate, there is obtained the corresponding 9α-bromo-11β,17α,21-trihydroxy-6,16β-dimethyl-4,6-pregnadiene-3,20-dione and its 21-acetate.

*Example 68*

A suspension containing 300 mg. of 9α-fluoro-17α,21-dihydroxy-6α,16α-dimethyl-4-pregnene-3,11-20-trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 9α-fluoro-17α,21-dihydroxy-6,16α-dimethyl-4,6-pregnadiene - 3,11,20 - trione 21-acetate. This product is then hydrolyzed by treatment with a solution of potassium bicarbonate in aqueous methanol to form 9α-fluoro-17α,21-dihydroxy-6,16α-dimethyl-4,6-pregnadiene-3,11,20-trione.

In accordance with the above procedures but starting with 9α-chloro-17α,21-dihydroxy-6α,16α-dimethyl-4-pregnene-3,11,20-trione 21-acetate there are obtained the corresponding 9α-chloro-17α,21-dihydroxy-6,16α-dimethyl-4,6-pregnadiene-3,11,20-trione and its 21-acetate.

In accordance with the above procedure but starting with 9α-bromo-17α,21-dihydroxy-6α,16α-dimethyl-4-pregnene-3,11,20-trione 21-acetate there are obtained the corresponding 9α-bromo-17α,21-dihydroxy-6,16α-dimethyl-4,6-pregnadiene-3,11,20-trione and its 21-acetate.

Similarly, in accordance with the above procedure but starting with 9α-fluoro-17α,21-dihydroxy-6α,16β-dimethyl-4-pregnene-3,11,20-trione 21-acetate, there are obtained the corresponding 9α-fluoro-17α,21-dihydroxy-6,16β-dimethyl-4,6-pregnadiene-3,11,20-trione and its 21-acetate.

Similarly, in accordance with the above procedure but starting with 9α-chloro-17α,21-dihydroxy-6α,16β-dimethyl-4-pregnene-3,11,20-trione 21-acetate, there are obtained the corresponding 9α-chloro-17α,21-dihydroxy-6,16β-dimethyl-4,6-pregnadiene-3,11,20-trione and its 21-acetate.

Similarly, in accordance with the above procedure but starting with 9α-bromo-17α,21-dihydroxy-6α,16β-dimethyl-4-pregnene-3,11,20-trione 21-acetate, there are obtained the corresponding 9α-bromo-17α,21-dihydroxy-6,16β-dimethyl-4,6-pregnadiene-3,11,20-trione and its 21-acetate.

*Example 69*

To a solution of 200 mg. of 17α,21-dihydroxy-6,16α-dimethyl-4,6-pregnadiene-3,11,20-trione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 17α, 21-dihydroxy-6,16α-dimethyl-1,4,6-pregnatriene-3,11,20-trione 21-acetate. This product is then hydrolyzed by treatment with a solution of potassium bicarbonate in aqueous methanol to form 17α,21-dihydroxy-6,16α-dimethyl-1,4,6-pregnatriene-3,11,20-trione.

In accordance with the above procedure but starting with 17α,21-dihydroxy-6,16β-dimethyl-4,6-pregnadiene-3,11,20-trione 21-acetate there are obtained 17α,21-dihydroxy-6,16β-dimethyl - 1,4,6 - pregnatriene-3,11,20-trione and its 21-acetate.

*Example 70*

To a solution of 200 mg. of 11β,17α,21-trihydroxy-6,16α-dimethyl-4,6-pregnadiene-3,20-dione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 11β,17α,21-trihydroxy-6,16α-dimethyl-1,4,6-pregnatriene-3,20-dione 21-acetate. This product is then hydrolyzed by treatment with a solution of potassium bicarbonate in aqueous methanol to form 11β,17α,21-trihydroxy-6,16α-dimethyl-1,4,6-pregnatriene-3,20-dione.

In accordance with the above procedure but starting with 11β,17α,21-trihydroxy-6,16β-dimethyl-4,6-pregnadiene-3,20-dione 21-acetate there are obtained 11β,17α,21-trihydroxy-6,16β-dimethyl - 1,4,6 - pregnatriene-3,20-dione and its 21-acetate.

*Example 71*

To a solution of 200 mg. of 9α-fluoro-11β,17α,21-trihydroxy-6,16α-dimethyl-4,6-pregnadiene-3,20-dione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 9α-fluoro-11β,17α,21-trihydroxy-6,16α-dimethyl-1,4,6-pregnatriene-3,20-dione 21-acetate. This product is then hydrolyzed by treatment with a solution of potassium bicarbonate in aqueous methanol to form 9α-fluoro-11β,17α,21-trihydroxy-6,16α-dimethyl-1,4,6-pregnatriene-3,20-dione.

In accordance with the above procedure but starting with 9α-chloro-11β,17α,21-trihydroxy-6,16α-dimethyl-4,6-pregnadiene-3,20-dione 21-acetate there are obtained 9α-chloro - 11β,17α,21 - trihydroxy - 6,16α - dimethyl - 1,4,6-pregnatriene-3,20 dione and its 21-acetate.

Similarly, in accordance with the above procedure but starting with 9α - bromo - 11β,17α,21-trihydroxy-6,16α-dimethyl-4,6-pregnadiene-3,20-dione 21-acetate there are obtained 9α - bromo - 11β,17α,21-trihydroxy-6,16α-dimethyl-1,4,6-pregnatriene-3,20-dione and its 21-acetate.

In accordance with the above procedure but starting with 9α-fluoro-11β,17α,21-trihydroxy-6,16β-dimethyl-4,6-pregnadiene-3,20-dione 21-acetate there are obtained 9α-fluoro - 11β,17α,21 - trihydroxy - 6,16β - dimethyl - 1,4,6-pregnatriene-3,20-dione and its 21-acetate.

In accordance with the above procedure but starting with 9α-chloro-11β,17α,21-trihydroxy-6,16β-dimethyl-4,6-pregnadiene-3,20-dione 21-acetate there are obtained 9α-chloro - 11β,17α,21 - trihydroxy - 6,16β - dimethyl - 1,4,6-pregnatriene-3,20-dione and its 21-acetate.

In accordance with the above procedure but starting with 9α-bromo-11β,17α,21-trihydroxy-6,16β-dimethyl-4,6-pregnadiene-3,20-dione 21-acetate there are obtained 9α-bromo - 11β,17α,21 - trihydroxy - 6,16β - dimethyl - 1,4,6-pregnatriene-3,20-dione and its 21-acetate.

*Example 72*

To a solution of 200 mg. of 9α-fluoro-17α,21-dihydroxy-6,16α-dimethyl-4,6-pregnadiene-3,11,20-trione 21 - acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 9α-fluoro-17α,21-dihydroxy-6,16α-dimethyl-1,4,6-pregnatriene-3,11,20-trione 21-acetate. This product is then hydrolyzed by treatment with a solution of potassium bicarbonate in aqueous methanol to form 9α-fluoro - 17α,21 - dihydroxy - 6,16α - dimethyl - 1,4,6-pregnatriene-3,11,20-trione.

In accordance with the above procedure but starting with 9α - chloro - 17α,21 - dihydroxy - 6,16α-dimethyl-4,6-pregnadiene-3,11,20-trione 21-acetate there are obtained 9α - chloro - 17α,21 - dihydroxy - 6,16α - dimethyl - 1,4,6-pregnatriene-3,11,20-trione and its 21-acetate.

Similarly, in accordance with the above procedure but starting with 9α-bromo-17α,21-dihydroxy-6,16α-dimethyl-4,6-pregnadiene-3,11,20-trione 21-acetate there are obtained 9α - bromo-17α,21-dihydroxy-6,16α-dimethyl-1,4,6-pregnatriene-3,11,20-trione and its 21-acetate.

In accordance with the above procedure but starting with 9α - fluoro - 17α,21 - dihydroxy - 6,16β-dimethyl-4,6-pregnadiene-3,11,20-trione 21-acetate there are obtained 9α - fluoro - 17α,21 - dihydroxy - 6,16β - dimethyl - 1,4,6-pregnatriene-3,11,20-trione and its 21-acetate.

In accordance with the above procedure but starting with 9α - chloro - 17α,21 - dihydroxy - 6,16β-dimethyl-4,6-pregnadiene-3,11,20-trione 21-acetate there are obtained 9α - chloro - 17α,21 - dihydroxy - 6,16β - dimethyl - 1,4,6-pregnatriene-3,11,20-trione and its 21-acetate.

In accordance with the above procedure but starting with 9α - bromo - 17α,21 - dihydroxy - 6,16β-dimethyl-4,6-pregnadiene-3,11,20-trione 21-acetate there are obtained 9α - bromo - 17α,21 - dihydroxy - 6,16β - dimethyl - 1,4,6-pregnatriene-3,11,20-trione and its 21-acetate.

*Example 73*

To a solution of 85 mg. of 17α,21-dihydroxy-6,16α-dimethyl-4,6-pregnadiene-3,11,20-trione in 0.5 ml. of pyridine, cooled to 0° C., is added 0.03 ml. of methanesulfonyl chloride. The resulting mixture is allowed to stand at a temperature of approximately 0° C., for a period of approximately 1 hour. Water is then added to the reaction mixture and the crystalline precipitate which forms is recovered, washed with water, and dried to give 17α,21-dihydroxy - 6,16α - dimethyl - 4,6 - pregnadiene - 3,11,20-trione 21-methane sulfonate.

To 180 mg. of 17α,21-dihydroxy-6,16α-dimethyl-4,6-pregnadiene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α-hydroxy-6,16α-dimethyl-4,6-pregnadiene-3,11,20-trione.

This 21-iodo-17α-hydroxy-6,16α-dimethyl-4,6-pregnadiene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 17α-hydroxy-6,16α-dimethyl-4,6-pregnadiene-3,11,20-trione.

In accordance with the above procedures but starting with 17α,21 - dihydroxy - 6,16β-dimethyl-4,6-pregnadiene-3,11,20-trione there is obtained, following the reaction with methane-sulfonyl chloride, 17α,21-dihydroxy-6,16β-dimethyl-4,6-pregnadiene-3,11,20-trione 21-methane sulfonate which upon reaction with sodium iodide in acetone is converted to 21-iodo-17α-hydroxy-6,16β-dimethyl-4,6-pregnadiene-3,11,20-trione, which upon reaction with sodium bisulfite is converted to 17α-hydroxy-6,16β-dimethyl-4,6-pregnadiene-3,11,20-trione.

*Example 74*

To a solution of 85 mg. of 17α,21-dihydroxy-6,16α-dimethyl-1,4,6-pregnatriene-3,11,20-trione in 0.5 ml. of pyridine, cooled to 0° C., is added 0.03 ml. of methanesulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 17α,21 - dihydroxy - 6,16α - dimethyl - 1,4,6 - pregnatriene - 3,11,20-trione 21-methane sulfonate.

To 180 mg. of 17α,21-dihydroxy-6,16α-dimethyl-1,4,6-pregnatriene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α-hydroxy-6,16α - dimethyl-1,4,6-pregnatriene-3,11,20-trione.

This 21-iodo-17α-hydroxy-6,16α-dimethyl-1,4,6-pregnatriene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 17α-hydroxy-6,16α-dimethyl-1,4,6-pregnatriene-3,11,20-trione.

In accordance with the above procedures but starting with 17α,21-dihydroxy-6,16β-dimethyl-1,4,6-pregnatriene-3,11,20-trione there is obtained, following the reaction with methane-sulfonyl chloride, 17α,21-dihydroxy-6,16β-dimethyl-1,4,6-pregnatriene-3,11,20 - trione 21-methane sulfonate, which upon reaction with sodium iodide in acetone is converted to 21-iodo-17α - hydroxy-6,16β-dimethyl-1,4,6-pregnatriene-3,11,20-trione, which, upon reaction with sodium bisulfite, is converted to 17α-hydroxy-6,16β-dimethyl-1,4,6-pregnatriene-3,11,20-trione.

Example 75

To a solution of 85 mg. of 11β,17α,21-trihydroxy-6,16α-dimethyl-4,6-pregnadiene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 11β,17α,21 - trihydroxy-6,16α - dimethyl-4,6-pregnadiene-3,20-dione 21-methane sulfonate.

To 180 mg. of 11β,17α,21-trihydroxy-6,16α-dimethyl-4,6-pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-11β,17α-dihydroxy-6,16α - dimethyl-4,6-pregnadiene-3,20-dione.

This 21-iodo-11β,17α-dihydroxy - 6,16β - dimethyl-4,6-pregnadiene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 11β,17α-dihydroxy-6,16α - dimethyl - 4,6-pregnadiene-3,20-dione.

In accordance with the above procedures but starting with 11β,17α,21-trihydroxy-6,16β - dimethyl-4,6-pregnadiene-3,20-dione there is obtained, following the reaction with methane-sulfonyl chloride, 11β,17α,21-trihydroxy-6,16β-dimethyl-4,6-pregnadiene-3,20 - dione 21-methane sulfonate, which upon reaction with sodium iodide in acetone is converted to 21-iodo-11β,17α-dihydroxy-6,16β-dimethyl-4,6-pregnadiene-3,20-dione, which, upon reaction with sodium bisulfite, is converted to 11β,17α-dihydroxy-6,16β-dimethyl-4,6-pregnadiene-3,20-dione.

Example 76

To a solution of 85 mg. of 11β,17α,21-trihydroxy-6,16α-dimethyl-1,4,6-pregnatriene-3,20-dione in 0.5 ml. of pyridine, cooled to 0° C., is added 0.03 ml. of methane-sulfonyl chloride. The resulting mixture is allowed to stand for a temperature of approximately 0° C. for a period of approximately 1 hour. Water is then added to the reaction mixture and the crystalline precipitate which forms is recovered, washed with water, and dried to give 11β,17α,21-trihydroxy - 6,16α - dimethyl - 1,4,6-pregnatriene-3,20-dione 21-methane sulfonate.

To 180 mg. of 11β,17α,21-trihydroxy-6,16α-dimethyl-1,4,6-pregnatriene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-11β,17α-dihydroxy-6,16α - dimethyl-1,4,6 - pregnatriene-3,20-dione.

This 21-iodo-11β,17α-dihydroxy-6,16α - dimethyl-1,4,6-pregnatriene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 11β,17α-dihydroxy-6,16α-dimethyl-1,4,6-pregnatriene-3,20-dione.

In accordance with the above procedures but starting with 11β,17α,21-trihydroxy-6,16β - dimethyl-1,4,6-pregnatriene-3,20-dione there is obtained, following the reaction with methane-sulfonyl chloride, 11β,17α,21-trihydroxy-6,16α-dimethyl-1,4,6-pregnatriene-3,20-dione 21-methane sulfonate which, upon reaction with sodium iodide in acetone is converted to 21-iodo 11β,17α-dihydroxy-6,16β-dimethyl-1,4,6-pregnatriene-3,20-dione which, upon reaction with sodium bisulfite is converted to 11β,17α-dihydroxy-6,16β-dimethyl-1,4,6-pregnatriene-3,20-dione.

Example 77

To a solution of 85 mg. of 9α-fluoro-11β,17α,21-trihydroxy-6,16α-dimethyl-4,6-pregnadiene-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-11β,17α,21-trihydroxy-6,16α-dimethyl-4,6-pregnadiene-3,20-dione 21-methane sulfonate.

To 180 mg. of 9α-fluoro-11β,17α,21-trihydroxy-6,16α-dimethyl - 4,6 - pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-21-iodo-11β,17α-dihydroxy-6,16α-dimethyl-4,6-pregnadiene-3,20-dione.

This 9α - fluoro - 21-iodo-11β,17α-dihydroxy-6,16α-dimethyl-4,6-pregnadiene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-11β,17α-dihydroxy-6,16α-dimethyl-4,6-pregnadiene-3,20-dione.

In accordance with the above procedure but starting with 9α-chloro-11β,17α,21-trihydroxy-6,16α-dimethyl-4,6-pregnadiene-3,20-dione there is obtained, following the reaction with mehane sulfonyl chloride, 9α-chloro-11β,17α,21 - trihydroxy-6,16α-dimethyl-4,6-pregnadiene-3,20-dione 21-methane sulfonate which, upon reaction with sodium iodide in acetone is converted to 9α-chloro-21-iodo-11β,17α-dihydroxy-6,16α-dimethyl-4,6 - pregnadiene-3,20-dione which, upon reaction with sodium bisulfite is converted to 9α - chloro - 11β,17α - dihydroxy - 6,16α-dimethyl-4,6-pregnadiene-3,20-dione.

In accordance with the above procedure but starting with 9α - bromo - 11β,17α,21 - trihydroxy-6,16α-dimethyl-4,6-pregnadiene-3,20-dione there is obtained, following the reaction with methane-sulfonyl chloride, 9α-bromo-11β,17α,21 - trihydroxy-6,16α-dimethyl-4,6-pregnadiene-3,20-dione 21-methane sulfonate which, upon reaction with sodium iodide in acetone is converted to 9α-bromo-21-iodo-11β,17α-dihydroxy-6,16α-dimethyl - 4,6 - pregnadiene-3,20-dione which, upon reaction with sodium bisulfite is converted to 9α - bromo - 11β,17α-dihydroxy-6,16α-dimethyl-4,6-pregnadiene-3,20-dione.

Similarly, in accordance with the above procedure but starting with 9α-fluoro-11β,17α,21-trihydroxy - 6,16β - dimethyl-4,6-pregnadiene-3,20-dione there is obtained following the reaction with methane-sulfonyl chloride 9α-fluoro - 11β,17α,21-trihydroxy-6,16β-dimethyl-4,6-pregnadiene-3,20-dione 21-methane sulfonate which, upon reaction with sodium iodide in acetone is converted to 9α-fluoro-21-iodo-11β,17α-dihydroxy - 6,16β - dimethyl - 4,6-pregnadiene-3,20-dione which, upon reaction with sodium bisulfite, is converted to 9α-fluoro-11β,17α-dihydroxy-6-16β-dimethyl-4,6-pregnadiene-3,20-dione.

Similarly, in accordance with the above procedure but starting with 9α - chloro - 11β,17α,21-trihydroxy-6,16β-dimethyl-4,6-pregnadiene-3,20-dione, there is obtained, following the reaction with methane-sulfonyl chloride 9α-chloro - 11β, 17α,21 - trihydroxy - 6,16β - dimethyl - 4,6-pregnadiene-3,20-dione 21-methane sulfonate which, upon reaction with sodium iodide in acetone is converted to 9α-chloro - 21 - iodo-11β,17α-dihydroxy-6,16β-dimethyl-4,6-prenadiene-3,20-dione which, upon reaction with sodium bisulfite, is converted to 9α-chloro-11β,17α-dihydroxy-6,16β-dimethyl-4,6-pregnadiene-3,20-dione.

Similarly, in accordance with the above procedure but starting with 9α - bromo-11β,17α,21-trihydroxy-6,16β-dimethyl-4,6-pregnadiene-3,20-dione, there is obtained, following the reaction with methane-sulfonyl chloride, 9α-bromo - 11β,17α,21 - trihydroxy-6,16β-dimethyl-4,6-pregnadiene-3,20-dione 21-methane sulfonate which, upon reaction with sodium iodide in acetone is converted to 9α-bromo - 21 - iodo-11β,17α-dihydroxy-6,16β-dimethyl-4,6-pregnadiene-3,20-dione which, upon reaction with sodium bisulfite, is converted to 9α-bromo-11β,17α-dihydroxy-6,16β-dimethyl-4,6-pregnadiene-3,20-dione.

*Example 78*

To a solution of 85 mg. of 9α-fluoro-11β,17α,21-trihydroxy-6,16α-dimethyl - 1,4,6 - pregnatriene - 3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water and dried to give 9α-fluoro - 11β,17α,21 - trihydroxy - 6,16α - dimethyl-1,4,6-pregnatriene-3,20-dione 21-methane sulfonate.

To 180 mg. of 9α-fluoro-11β,17α,21-trihydroxy-6,16α-dimethyl-1,4,6-pregnatriene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-21-iodo-11β,17α-dihydroxy-6,16α-dimethyl - 1,4,6-pregnatriene-3,20-dione.

This 9α - fluoro - 21 - iodo-11β,17α-dihydroxy-6,16α-dimethyl-1,4,6-pregnatriene-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α - fluoro - 11β,17α-dihydroxy-6,16α-dimethyl-1,4,6-pregnatriene-3,20-dione.

In accordance with the above procedure but starting with 9α-chloro-11β,17α,21-trihydroxy-6,16α-dimethyl-1,4,6-pregnatriene-3,20-dione there is obtained, following the reaction with methane-sulfonyl chloride, 9α-chloro-11β,17α,21-trihydroxy - 6,16α-dimethyl - 1,4,6 - pregnatriene-3,20-dione 21-methane sulfonate which, upon reaction with sodium iodide in acetone is converted to 9α-chloro-21-iodo-11β,17α-dihydroxy-6,16α-dimethyl - 1,4,6 - pregnatriene-3,20-dione which, upon reaction with sodium bisulfite, is converted to 9α - chloro-11β,17α-dihydroxy-6,16α-dimethyl-1,4,6-pregnatriene-3,20-dione.

In accordance with the above procedure but starting with 9α-bromo-11β,17α,21-trihydroxy-6,16α-dimethyl-1,4,6-pregnatriene-3,20-dione there is obtained, following the reaction with methane-sulfonyl chloride, 9α-bromo-11β,17α,21 - trihydroxy - 6,16α - dimethyl - 1,4,6 - pregnatriene-13,20-dione 21-methane sulfonate which, upon reaction with sodium iodide in acetone is converted to 9α-bromo - 21 - iodo - 11β,17α - dihydroxy - 6,16α - dimethyl-1,4,6-pregnatriene-3,20-dione which, upon reaction with sodium bisulfite, is converted to 9α-bromo-11β,17α-dihydroxy-6,16α-dimethyl-1,4,6-pregnatriene-3,20-dione.

Similarly, in accordance with the above procedure but starting with 9α-fluoro-11β,17α,21-trihydroxy-6,16β-dimethyl-1,4,6-pregnatriene-3,20-dione, there is obtained, following the reaction with methane-sulfonyl chloride, 9α-fluoro - 11β,17α,21 - trihydroxy - 6,16β - dimethyl - 1,4,6-pregnatriene-3,20-dione 21-methane sulfonate which, upon reaction with sodium iodide in acetone is converted to 9α - fluoro - 21 - iodo - 11β,17α - dihydroxy - 6,16β - dimethyl-1,4,6-pregnatriene-3,20-dione which, upon reaction with sodium bisulfite is converted to 9α-fluoro-11β, 17α - dihydroxy - 6,16β - dimethyl - 1,4,6 - pregnatriene-3,20-dione.

Similarly, in accordance with the above procedure but starting with 9α-chloro-11β,17α,21-trihydroxy-6,16β-dimethyl-1,4,6-pregnatriene-3,20-dione, there is obtained, following the reaction with methane-sulfonyl chloride, 9α - chloro - 11β,17α,21 - trihydroxy - 6,16β - dimethyl-1,4,6-pregnatriene-3,20-dione 21-methane sulfonate which, upon reaction with sodium iodide in acetone is converted to 9α-chloro-21-iodo-11β,17α-dihydroxy-6,16β-dimethyl-1,4,6-pregnatriene-3,20-dione which, upon reaction with sodium bisulfite is converted to 9α-chloro-11β,17α-dihydroxy-6,16β-dimethyl-1,4,6-pregnatriene-3,20-dione.

Similarly, in accordance with the above procedure but starting with 9α-bromo-11β,17α,21-trihydroxy-6,16β-dimethyl-1,4,6-pregnatriene-3,20-dione, there is obtained, following the reaction with methane-sulfonyl chloride, 9α - bromo - 11β,17α,21 - trihydroxy - 6,16β - dimethyl-1,4,6-pregnatriene-3,20-dione 21-methane sulfonate which, upon reaction with sodium iodide in acetone is converted to 9α-bromo-21-iodo-11β,17α-dihydroxy-6,16β-dimethyl-1,4,6-pregnatriene-3,20-dione which, upon reaction with sodium bisulfite is converted to 9α-bromo-11β,17α-dihydroxy-6,16β-dimethyl-1,4,6-pregnatriene-3,20-dione.

*Example 79*

To a solution of 85 mg. of 9α-fluoro-17α,21-dihydroxy-6,16α-dimethyl-4,6-pregnadiene-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α - fluoro 17α,21 - dihydroxy - 6,16α - dimethyl - 4,6-pregnadiene-3,11,20-trione 21-methane sulfonate.

To 180 mg. of 9α-fluoro-17α,21-dihydroxy-6,16α-dimethyl-4,6-pregnadiene-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α - fluoro-21-iodo-17α-hydroxy-6,16α-dimethyl-4,6-pregnadiene-3,11,20-trione.

This 9α - fluoro-21-iodo-17α-hydroxy-6,16α-dimethyl-4,6-pregnadiene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-17α-hydroxy-6,16α-dimethyl-4,6-pregnadiene-3,11,20-trione.

In accordance with the above procedure but starting with 9α - chloro - 17α,21 - dihydroxy - 6,16α-dimethyl-4,6-pregnadiene-3,11,20-trione, there is obtained, following the reaction with methane-sulfonyl chloride, 9α-chloro-17α,21 - dihydroxy - 6,16α - dimethyl - 4,6 - pregnadiene-3,11,20-trione 21-methane sulfonate, which, upon reaction with sodium iodide in acetone, is converted to 9α-chloro-21 - iodo - 17α - hydroxy - 6,16α - dimethyl - 4,6 - pregnadiene-3,11,20-trione, which, upon reaction with sodium bisulfite is converted to 9α-chloro-17α-hydroxy-6,16α-dimethyl-4,6-pregnadiene-3,11,20-trione.

In accordance with the above procedure but starting with 9α-bromo-17α,21-dihydroxy-6,16α-dimethyl-4,6-pregnadiene-3,11,20-trione, there is obtained, following the reaction with methane-sulfonyl chloride, 9α-chloro-17α, 21 - dihydroxy - 6,16α - dimethyl - 4,6 - pregnadiene-3,11, 20-trione 21-methane sulfonate, which, upon reaction with sodium iodide in acetone, is converted to 9α-bromo-21-iodo - 17α - hydroxy - 6,16α - dimethyl - 4,6 - pregnadiene-3,11,20-trione which, upon reaction with sodium bisulfite is converted to 9α-bromo-17α-hydroxy-6,16α-dimethyl-4, 6-pregnadiene-3,11,20-trione.

Similarly, in accordance with the above procedure but starting with 9α-fluoro-17α,21-dihydroxy-6,16β-dimethyl-4,6-pregnadiene-3,11,20-trione, there is obtained following the reaction with methane-sulfonyl chloride, 9α-fluoro-17α,21 - dihydroxy - 6,16β - dimethyl - 4,6 - pregnadiene-3,11,20-trione 21-methane sulfonate which, upon reaction with sodium iodide in acetone is converted to 9α-fluoro-21 - iodo - 17α - hydroxy - 6,16β - dimethyl - 4,6 - pregnadiene-3,11,20-trione which, upon reaction with sodium bisulfite is converted to 9α-fluoro-17α-hydroxy-6,16β-dimethyl-4,6-pregnadiene-3,11,20-trione.

Similarly, in accordance with the above procedure but starting with 9α-chloro-17α-21-dihydroxy-6,16β-dimethyl-4,6-pregnadiene-3,11,20-trione, there is obtained, following the reaction with methane-sulfonyl chloride, 9α-chloro - 17α,21 - dihydroxy - 6,16β - dimethyl - 4,6 - pregnadiene-3,11,20-trione 21-methane sulfonate which, upon reaction with sodium iodide in acetone, is converted to 9α - chloro - 21 - iodo - 17α - hydroxy - 6,16β - dimethyl-4,6-pregnadiene-3,11,20-trione, which upon reaction with sodium bisulfite is converted to 9α-chloro-17α-hydroxy-6, 16β-dimethyl-4,6-pregnadiene-3,11,20-trione.

Similarly, in accordance with the above procedure but starting with 9α-bromo-17α,21-dihydroxy - 6,16β-dimethyl-4,6-pregnadiene - 3,11,20-trione, there is obtained, following the reaction with methane-sulfonyl chloride, 9α-bromo-17α,21-dihydroxy - 6,16β-dimethyl - 4,6-pregnadiene-3,11,20-trione 21-methane sulfonate, which, upon reaction with sodium iodide in acetone, is converted to 9α-bromo-21-iodo - 17α-hydroxy - 6,16β-dimethyl - 4,6-pregnadiene - 3,11,20-trione which, upon reaction with sodium bisulfite is converted to 9α-bromo - 17α-hydroxy-6,16β-dimethyl - 4,6-pregnadiene - 3,11,20-trione.

*Example 80*

To a solution of 85 mg. of 9α-fluoro-17α,21-dihydroxy-6,16α-dimethyl - 1,4,6-pregnatriene - 3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro - 17α,21-dihydroxy - 6,16α-dimethyl-1,4,6-pregnatriene - 3,11,20-trione 21-methane sulfonate.

To 180 mg. of 9α-fluoro - 17α,21-dihydroxy - 6,16α-dimethyl - 1,4,6-pregnatriene - 3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro - 21-iodo - 17α-hydroxy - 6,16α-dimethyl-1,4,6-pregnatriene - 3,11,20-trione.

This 9α-fluoro - 21-iodo - 17α-hydroxy - 6,16α-dimethyl-1,4,6-pregnatriene - 3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-17α-hydroxy - 6,16α-dimethyl - 1,4,6-pregnatriene - 3,11,20-trione.

In accordance with the above procedure but starting with 9α-chloro - 17α,21-dihydroxy - 6,16α-dimethyl-1,4,6-pregnatriene - 3,11,20-trione, there is obtained, following the reaction with methane-sulfonyl chloride, 9α-chloro-17α,21-dihydroxy - 6,16α-dimethyl - 1,4,6-pregnatriene-3,11,20-trione 21-methane sulfonate, which, upon reaction with sodium iodide in acetone, is converted to 9α-chloro-21-iodo - 17α-hydroxy - 6,16α-dimethyl - 1,4,6-pregnatriene-3,11,20-trione which, upon reaction with sodium bisulfite is converted to 9α-chloro - 17α-hydroxy - 6,16α-dimethyl - 1,4,6-pregnatriene - 3,11,20-trione.

In accordance with the above procedure but starting with 9α-bromo - 17α,21-dihydroxy - 6,16α-dimethyl-1,4,6-pregnatriene - 3,11,20-trione, there is obtained, following the reaction with methane-sulfonyl chloride, 9α-bromo - 17α,21-dihydroxy - 6,16α-dimethyl - 1,4,6-pregnatriene - 3,11,20-trione 21-methane sulfonate which, upon reaction with sodium iodide in acetone is converted to 9α-bromo - 21-iodo - 17α-hydroxy - 6,16α-dimethyl-1,4,6-pregnatriene - 3,11,20-trione which, upon reaction with sodium bisulfite is converted to 9α-bromo - 17α-hydroxy - 6,16α-dimethyl - 1,4,6-pregnatriene - 3,11,20-trione.

Similarly, in accordance with the above procedure but starting with 9α-fluoro - 17α,21-dihydroxy - 6,16β-dimethyl-1,4,6-pregnatriene - 3,11,20-trione, there is obtained, following the reaction with methane-sulfonyl chloride, 9α-fluoro - 17α,21-dihydroxy - 6,16β-dimethyl - 1,4,6-pregnatriene - 3,11,20-trione 21-methane sulfonate, which, upon reaction with sodium iodide in acetone, is converted to 9α-fluoro - 21-iodo - 17α-hydroxy - 6,16β-dimethyl-1,4,6-pregnatriene - 3,11,20-trione which, upon reaction with sodium bisulfite is converted to 9α-fluoro - 17α-hydroxy 6,16β-dimethyl - 1,4,6-pregnatriene - 3,11,20-trione.

Similarly, in accordance with the above procedure but starting with 9α-chloro-17α,21-dihydroxy - 6,16β-dimethyl-1,4,6-pregnatriene - 3,11,20-trione, there is obtained, following the reaction with methane-sulfonyl chloride, 9α-chloro - 17α,21-dihydroxy - 6,16β-dimethyl - 1,4,6-pregnatriene - 3,11,20-trione 21-methane sulfonate which, upon reaction with sodium iodide in acetone is converted to 9α-chloro - 21-iodo - 17α-hydroxy - 6,16β-dimethyl-1,4,6-pregnatriene - 3,11,20-trione which, upon reaction with sodium bisulfite is converted to 9α-chloro-17α-hydroxy - 6,16β-dimethyl - 1,4,6-pregnatriene - 3,11,20-trione.

Similarly, in accordance with the above procedure but starting with 9α-bromo - 17α,21-dihydroxy - 6,16β-dimethyl - 1,4,6-pregnatriene - 3,11,20-trione, there is obtained, following the reaction with methane-sulfonyl chloride, 9α-bromo - 17α,21 dihydroxy - 6,16β-dimethyl-1,4,6-pregnatriene - 3,11,20-trione 21-methane sulfonate which, upon reaction with sodium iodide in acetone is converted to 9α-bromo - 21-iodo - 17α-hydroxy - 6,16β-dimethyl - 1,4,6-pregnatriene 3,11,20-trione which, upon reaction with sodium bisulfite is converted to 9α-bromo-17α-hydroxy - 6,16β-dimethyl-1,4,6-pregnatriene-3,11,20-trione.

*Example 81*

A suspension containing 300 mg. of 11β,17α,21-trihydroxy - 6α,16α-dimethyl - 4-pregnene - 3,20-dione 21-tertiary butyl acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 11β,17α,21-trihydroxy - 6,16α-dimethyl - 4,6-pregnadiene-3,20-dione 21-tertiary butyl acetate. This product is then hydrolyzed by treatment with a solution of potassium bicarbonate in aqueous methanol to form 11β,17α,21-trihydroxy - 6,16α-dimethyl - 4,6-pregnadiene-3,20-dione.

In accordance with the above procedure but starting with 11β,17α,21-trihydroxy - 6α,16α-dimethyl - 4-pregnene - 3,20-dione 21-tertiary butyl acetate there are obtained 11β,17α,21-trihydroxy - 6,16β-dimethyl - 4,6-pregnadiene-3,20-dione and its 21-tertiary butyl acetate.

*Example 82*

To a solution of 85 mg. of 11β,17α,21-trihydroxy-6,16α-dimethyl-4,6-pregnadiene-3,20-dione in 0.5 ml. of pyridine, cooled to 0° C., is added 0.03 ml. of methanesulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 11β,17α,21 - trihydroxy - 6,16α,dimethyl-4,6-pregnadiene-3,20-dione 21-methane sulfonate.

To 180 mg. of 11β,17α, 21-trihydroxy-6,16α-dimethy-4,6-pregnadiene-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-11β,17α,21 - trihydroxy - 6,16α-dimethyl-4,6-pregnadiene-3,20-dione.

320 mg. of trisilver phosphate are thoroughly mixed with 0.1 ml. of 100% phosphoric acid, and the silver dihydrogen phosphate thus obtained is washed by decantation with two portions of diethyl ether to remove unreacted phosphoric acid. Approximately 2.0 ml. acetonitrile are added, and the mixture is heated to reflux temperature. To the resulting mixture are then added 21-iodo-11β,17α - dihydroxy - 6,16α - dimethyl - 4,6-pregnadiene-3,20-dione, and the mixture is heated under reflux in a nitrogen atmosphere with stirring for a period of approximately 75 minutes. The reaction mixture is cooled to room temperature, about 2.0 g. of ice water are added, and the acetonitrile is evaporated in vacuo at a temperature below about 25° C. The pH of the resulting aqueous suspension is adjusted to 6.4 by the addition of 0.23 ml. of saturated aqueous sodium carbonate solution. The precipitate, which forms, is removed by filtration and washed thoroughly with water. The filtered aqueous solution and washes are combined, and dried from the frozen state, and the residual material is triturated with seven 1.0 ml. portions of methanol. The methanol-insoluble material is separated by filtration, the filtered methanolic solution is evaporated in vacuo to a volume of approximately 0.2 ml., and 2.0 ml. of ether are added to the concentrated methanolic solution. The material which precipitates is recovered, washed with ether, and dried to give 11β,17α,-21 - trihydroxy - 6,16α - dimethyl - 4,6-pregnadiene-3,20-dione 21-dihydrogen phosphate.

In accordance with the above procedures but starting with 11β,17α,21 - trihydroxy - 6,16β - dimethyl-4,6-pregnadiene-3,20-dione there is obtained, following the reaction with methane-sulfonyl chloride, 11β,17α,21-trihydroxy - 6,16β - dimethyl - 4,6-pregnadiene-3,20-dione 21-methane sulfonate, which upon reaction with sodium iodide in acetone is converted to 21-iodo-11β,17α-dihydroxy - 6,16β-dimethyl-4,6-pregnadiene-3,20-dione, which, upon reaction with a mixture of silver phosphate and phosphoric acid, is converted to 11β,17α-dihydroxy-6,16β - dimethyl - 4,6-pregnadiene-3,20-dione 21-hydrogen phosphate.

*Example 83*

To 500 mg. of 17α,21-dihydroxy-16α-methyl-4-pregnene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes, the BT test is very weak; after 30 minutes the solution is decanted from copper oxide, 100 mg. of the sodium salt of ethylene diamine-tetraacetic acid added, and concentrated under reduced pressure to a small volume. Addition of water gives crude crystalline 17α,21,21 - trihydroxy - 16α - methyl-4-pregnene-3,11,20-trione. Recrystallization from aqueous methanol yields a pure product.

The BT test referred to above relates to the conversion of the 17α,21-dihydroxy-20-keto moiety of the steroid to a 17α,21,21-trihydroxy-20-keto which is readily followed by use of the dianisole bisphenyltetrazolium chloride reagent commonly known as the BT reagent or the BT test. This reagent reacts specifically with the dihydroxy acetone grouping to give a deep blue solution. It does not form a deep blue color with the trihydroxy steroids. By means of this BT test, therefore, the degree of reaction can be followed quantitatively or if desired, only semi-quantitatively, since the intensity of the blue color is the function of the amount of 17α,21-dihydroxy-20-keto steroid present in the solution tested. This intensity of color can be conveniently measured against a known standard solution and the extract of reaction easily calculated. Use of the blue tetrazolium (BT) reagent in assaying for the presence of a dihydroxy acetone moiety is described more fully in a publication by Mader et al. Anal. Chem. 24, 666 (1952).

*Example 84*

To 500 mg. of 9α-fluoro-17α,21-dihydroxy-16α-methyl-4-pregnene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by a periodic testing with BT reagent. In 20 minutes, the BT test is very weak; after 30 minutes the solution is decanted from copper oxide, 100 mg. of the sodium salt of ethylene diamine-tetraacetic acid is added and concentrated under reduced pressure to a small volume. Addition of water gives crude crystalline 9α - fluoro - 17α,21,21-trihydroxy-16α-methyl-4-pregnene-3,11,20-trione. Recrystallization from aqueous methanol yields a pure product.

*Example 85*

To 500 mg. of 11β,17α,21-trihydroxy-16α-methyl-4-pregnene-3,20-dione, in 10 ml. of 80% methanol containing two drops of acetic acid. This mixture is placed in an oil-bath maintained at 60° C. and the progress of reaction followed by periodic testing with BT reagent. In 20 minutes the BT test is very weak; after 30 minutes the solution is decanted from copper oxide, 100 mg. of the sodium salt of ethylene diamine-tetraacetic acid is added, and concentrated under reduced pressure to a small volume. Addition of water gives crude crystalline 11β,17α,-21,21 - tetrahydroxy - 16α-methyl-4-pregnene-3,20-dione. Recrystallization from aqueous methanol yields a pure product.

*Example 86*

To 500 mg. of 9α-fluoro-11β,17α,21-trihydroxy-16α-methyl-4-pregnene-3,20-dione, in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes the BT test is very weak;

after 30 minutes the solution is decanted from copper oxide, 100 mg. of the sodium salt of ethylene diaminetetraacetic acid is added, and concentrated under reduced pressure to a small volume. Addition of water gives crude crystalline 9α-fluoro-11β,17α,21,21-tetrahydroxy-16α-methyl-4-pregnene-3,20-dione. Recrystallization from aqueous methanol yields a pure product.

*Example 87*

To 250 mg. of 17α,21-dihydroxy-16α-methyl-1,4-pregnadiene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes, the BT test was very weak; after 30 minutes, the solution is decanted from copper oxide, 100 mg. of the sodium salt of ethylene diaminetetraacetic acid is added, and concentrated under reduced pressure to a small volume. Addition of water gives crude crystalline 17α,21,21-trihydroxy-16α-methyl-1,4-pregnadiene-3,11,20-trione. Recrystallization from aqueous methanol yields a pure product.

*Example 88*

To 250 mg. of 9α-fluoro-17α,21-dihydroxy-16α-methyl-1,4-pregnadiene-3,11,20-trione in 5 ml. of methanol is added a solution of 750 mg. of copper acetate in 10 ml. of 80% methanol containing two drops of acetic acid. This mixture is placed in an oil-bath maintained at 60° C. and the progress of the reaction followed by periodic testing with BT reagent. In 20 minutes the BT test is very weak; after 30 minutes the solution is decanted from copper oxide, 100 mg. of the sodium salt of ethylene diamine-tetraacetic acid added, and concentrated under reduced pressure to a small volume. Addition of water gives crude crystalline 9α-fluoro-17α,21,21-trihydroxy-16α-methyl-1,4-pregnadiene-3,11,20-trione. Recrystallization from aqueous methanol yields a pure product.

*Example 89*

To 100 mg. of 11β,17α,21-trihydroxy-16α-methyl-1,4-pregnadiene-3,20-dione in 10 ml. of methanol is added a solution of 600 mg. of copper acetate in 1 ml. of 80% methanol containing two drops of acetic acid. This mixture is placed in an oil-bath maintained at 60° C. and the progress of the reaction followed by periodic testing with BT reagent. In 20 minutes, the BT test is very weak; after 30 minutes, the solution is decanted from copper oxide, 100 mg. of the sodium salt of ethylene diaminetetraacetic acid is added and concentrated under reduced pressure to a small volume. Addition of water gives crude crystalline 11β,17α,21,21-tetrahydroxy-16α-methyl-1,4-pregnadiene-3,20-dione. Recrystallization from aqueous methanol yields a pure product.

*Example 90*

To 100 mg. of 9α-fluoro-11β,17α,21-trihydroxy-16α-methyl-1,4-pregnadiene-3,20-dione in 10 ml. of methanol is added a solution of 750 mg. of copper acetate in 10 ml. of 80% methanol containing two drops of acetic acid. This mixture is placed in an oil-bath maintained at 60° C. and the progress of the reaction followed by periodic testing with BT reagent. In 20 minutes, the BT test is very weak; after 30 minutes the solution is decanted from copper oxide, 100 mg. of the sodium salt of ethylene diamine-tetraacetic acid is added, and concentrated under reduced pressure to a small volume. Addition of water gives crude crystalline 9α-fluoro-11β,17α,21,21-tetrahydroxy-16α-methyl-1,4-pregnadiene-3,20-dione. Recrystallization from aqueous methanol yields a pure product.

*Example 91*

A mixture of 100 mg. of 16α-methyl-4-pregnene-17α,21-diol-3,11,20-trione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16α-methyl-4-pregnene-17α,21,diol-3,11,20-trione 21-methyl ether.

In similar fashion, starting with 16α-ethyl-4-pregnene-17α,21-diol-3,11,20-trione there is obtained, following reaction with methyl iodide, 16α-ethyl-4-pregnene-17α,21-diol-3,11,20-trione 21-methyl ether.

Similarly, 16α-propyl-4-pregnene-17α,21-diol-3,11,20-trione is converted to 16α-propyl-4-pregnene-17α,21-diol-3,11,20-trione 21-methyl ether.

*Example 92*

240 mg. of 16β-methyl-4-pregnene-17α,21-diol-3,11,20-trione in 10 ml. of dimethyl-formamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 16β-methyl-4-pregnene-17α,21-diol-3,11,20-trione 21-methyl ether.

In similar fashion, starting with 16β-ethyl-4-pregnene-17α,21-diol-3,11,20-trione and using ethyl iodide in place of the methyl iodide reaction there is obtained 16β-ethyl-4-pregnene-17α,21-diol-3,11,20-trione 21-ethyl ether.

Similarly, 16β-propyl-4-pregnene-17α,21-diol-3,11,20-trione is converted to 16β-propyl-4-pregnene-17α,21-diol-3,11,20-trione 21-methyl ether and 16β-propyl-4-pregnene-17α,21-diol-3,11,20-trione 21-ethyl ether.

*Example 93*

A mixture of 100 g. of 16α-methyl-4-pregnene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16α-methyl-4-pregnene-11β,17α,21-triol-3,20-dione 21-methyl ether.

In similar fashion, starting with 16α-ethyl-4-pregnene-11β,17α,21-triol-3,20-dione and using allyl iodide in place of the methyl iodide reactant there is obtained, 16α-ethyl-4-pregnene-11β,17α,21-triol-3,20-dione 21-allyl ether.

Similarly, 16α-propyl-4-pregnene-11β,17α-21-triol-3,20-dione is converted to 16α-propyl-4-pregnene-11β,17α,21-triol-3,20-dione 21-methyl ether, 16α-propyl-4-pregnene-11β,17α,21-triol-3,20-dione 21-ethyl ether and 16α-propyl-4-pregnene-11β,17α,21-triol-3,20-dione 21-allyl ether.

Example 94

A mixture of 100 mg. of 16β-methyl-4-pregnene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16β-methyl-4-pregnene-11β,17α-21-triol-3,20-dione 21-methyl ether.

In similar fashion, starting with 16β-ethyl-4-pregnene-11β,17α,21-triol-3,20-dione there is obtained, following reaction with methyl iodide, 16β-ethyl-4-pregnene-11β,17α,21-triol-3,20-dione 21-methyl ether.

Similarly, 16β-propyl-4-pregnene-11β,17α,21-triol,3,20-dione is converted to 16β-propyl-4-pregnene-11β,17α,21-triol-3,20-dione 21-methyl ether, 16β-propyl-4-pregnene-11β,17α,21-triol-3,20-dione 21-ethyl ether and 16β-propyl-4-pregnene-11β,17α,21-triol-3,20-dione 21-allyl ether.

Example 95

240 mg. of 9α-fluoro-16α-methyl-4-pregnene-17α,21-diol-3,11-20-trione in 10 ml. of dimethylformamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 9α-fluoro-16α-methyl-4-pregnene-17α,21-diol-3,11,20-trione 21-methyl ether.

In similar fashion, starting with 9α-fluoro-16α-methyl-4-pregnene-17α,21-diol-3,11,20-trione and using trimethylpropyl iodide in place of the methyl iodide reactant there is obtained, 9α-fluoro-16α-methyl-4-pregnene-17α,21-diol-3,11,20-trione 21-trimethylpropyl ether.

Similarly, 9α-fluoro-16α-propyl-4-pregnene-17α,21-diol-3,11,20-trione is converted to 9α-fluoro-16α-propyl-4-pregnene-17α,21-diol-3,11,20-trione 21-methyl ether, 9α-fluoro-16α-propyl-4-pregnene-17α,21-diol-3,11,20-trione 21-allyl ether and 9α-fluoro-16α-propyl-4-pregnene-17α,21-diol-3,11,20-trione 21-trimethylpropyl ether.

Example 96

240 mg. of 9α-fluoro-16β-methyl-4-pregnene-17α,21-diol-3,11,20-trione in 10 ml. of dimethylformamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 9α-fluoro-16β-methyl-4-pregnene-17α,21-diol-3,11,20-trione 21-methyl ether.

In similar fashion, starting with 9α-fluoro-16β-ethyl-pregnene-17α,21-diol-3,11,20-trione there is obtained, following reaction with methyl iodide, 9α-fluoro-16β-ethyl-4-pregnene-17α,21-diol-3,11,20-trione 21-methyl ether.

Similarly, 9α-fluoro-16β-propyl-4-pregnene-17α,21-diol-3,11,20-trione is converted to 9α-fluoro-16β-propyl-4-pregnene-17α,21-diol-3,11,20-trione 21-methyl ether, 9α-fluoro-16β-propyl-4-pregnene-17α,21-diol-3,11,20-trione 21-allyl ether, and 9α-fluoro-16β-propyl-4-pregnene-17α,21-diol-3,11,20-trione 21-butyl ether.

Example 97

A mixture of 100 mg. of 9α-fluoro-16α-methyl-4-pregnene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 9α-fluoro-16α-methyl-4-pregnene-11β,17α,21-triol-3,20-dione 21-methyl ether.

In similar fashion, starting with 9α-fluoro-16α-methyl-4-pregnene-11β,17α,21-triol-3,20-dione and using trimethylpropyl iodide in place of the methyl iodide reactant, there is obtained 9α-fluoro-16α-methyl-4-pregnene-11β,17α,21-triol-3,20-dione 21-trimethylpropyl ether.

Similarly, 9α-fluoro-16α-methyl-4-pregnene-11β,17α,21-triol-3,20-dione is converted to 9α-fluoro-16α-propyl-4-pregnene-11β,17α,21-triol-3,20-dione 21-allyl ether, 9α-fluoro-16α-methyl-4-pregnene-11β,17α,21-triol-3,20-dione 21-cyclohexyl ether and 9α-fluoro-16α-methyl-4-pregnene-11β,17α,21-triol-3,20-dione 21-benzyl ether.

Example 98

A mixture of 100 mg. of 9α-fluoro-16β-methyl-4-pregnene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 9α-fluoro-16β-methyl-4-pregnene-11β,17α,21-triol-3,20-dione 21-methyl ether.

In similar fashion, starting with 9α-fluoro-16β-ethyl-4-pregnene-11β,17α,21-triol-3,20-dione there is obtained, following reaction with methyl iodide, 9α-fluoro-16β-ethyl-4-pregnene-11β,17α,21-triol-3,20-dione 21-methyl ether.

Similarly, 9α-fluoro-16β-propyl-4-pregnene-11β,17α,21-triol-3,20-dione is converted to 9α-fluoro-16β-propyl-4-pregnene-11β,17α,21-triol-3,20-dione 21-methyl ether, 9α-fluoro-16β-propyl-4-pregnene-11β,17α,21-triol-3,20-dione 21-ethyl ether and 9α-fluoro-16β-propyl-4-pregnene-11β,17α,21-triol-3,20-dione 21-allyl ether.

Example 99

A mixture of 100 mg. of 16α-methyl-1,4-pregnadiene-17α,21-diol-3,11,20-trione, 5.0 ml. of methyl iodide and 300 mg. of silver oxide prepared, for example, by precipiation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16α-methyl-1,4-pregnadiene17α,21-diol-3,11,20-trione 21-methyl ether.

In similar fashion, starting with 16α-ethyl-1,4-pregnadiene-17α,21-diol-3,11,20-trione there is obtained, following reaction with methyl iodide, 16α-ethyl-1,4-pregnadiene-17α,21-diol-3,11,20-trione 21-methyl ether.

Similarly, 16α-propyl-1,4-pregnadiene-17α,21-diol-3,11,20-trione is converted to 16α-propyl-1,4-pregnadiene-17α,21-diol-3,11,20-trione 21-methyl ether.

*Example 100*

240 mg. of 16β-methyl-1,4-pregnadiene-17α,21-diol-3,11,20-trione in 10 ml. of dimethyl-formamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 16β-methyl-1,4-pregnadiene-17α,21-diol-3,11,20-trione 21-methyl ether.

In similar fashion, starting with 16β-ethyl-1,4-pregnadiene-17α,21-diol-3,11,20-trione and using ethyl iodide in place of the methyl iodide reactant there is obtained, 16β-ethyl-1,4-pregnadiene-17α,21-diol-3,11,20-trione 21 - ethyl ether.

Similarly, 16β-propyl-1,4-pregnadiene-17α,21-diol-3,11,20-trione is converted to 16β-propyl-1,4-pregnadiene-17α,21-diol-3,11,20-trione 21-methyl ether and 16β-propyl-1,4-pregnadiene-17α,21-diol-3,11,20-trione 21-ethyl ether.

*Example 101*

A mixture of 100 mg. of 16α-methyl-1,4-pregnadiene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16α-methyl-1,4-pregnadiene-11β,17α,21-triol-3,20-dione 21-methyl ether.

In similar fashion, starting with 16α-ethyl-1,4-pregnadiene-11β,17α,21-triol-3,20-dione and using allyl iodide in place of the methyl iodide reactant, there is obtained, 16α-ethyl-1,4-pregnadiene-11β,17α,21-triol-3,20-dione 21-allyl ether.

Similarly, 16α-propyl-1,4-pregnadiene-11β,17α,21-triol-3,20-dione is converted to 16α-propyl-1,4-pregnadiene-11β,17α,21-triol-3,20-dione 21-methyl ether, 16α-propyl-1,4-pregnadiene-11β,17α,21-triol-3,20-dione 21-ethyl ether and 16α - propyl - 1,4-pregnadiene-11β,17α,21-triol-3,20-dione 21-allyl ether.

*Example 102*

A mixture of 100 mg. of 16β - methyl - 1,4-pregnadiene - 11β,17α,21 - triol - 3,20 - dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 16β - methyl - 1,4 - pregnadiene - 11β,17α,21 - triol - 3,20 - dione 21 - methyl ether.

In similar fashion, starting with 16β - ethyl - 1,4 - pregnadiene - 11β,17α,21 - triol - 3,20 - dione, there is obtained, following reaction with methyl iodide, 16β - ethyl-1,4 - pregnadiene - 11β,17α,21 - triol - 3,20 - dione 21 - methyl ether.

Similarly, 16β - propyl - 1,4 - pregnadiene-11β,17α,21-triol - 3,20 - dione is converted to 16β - propyl - 1,4-pregnadiene - 11β,17α,21 - triol - 3,20 - dione 21 - methyl ether, 16β - propyl - 1,4 - pregnadiene - 11β,17α,21-triol-3,20 - dione 21 - ethyl ether and 16β - propyl - 1,4 - pregnadiene - 11β,17α,21 - triol - 3,20 - dione 21 - allyl ether.

*Example 103*

240 mg. of 9α - fluoro - 16α - methyl - 1,4 - pregnadiene - 17α,21 - diol - 3,11,20 - trione in 10 ml. of dimethylformamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 9α-fluoro - 16α - methyl - 1,4 - pregnadiene - 17α,21 - diol - 3,11,20 - trione 21 - methyl ether.

In similar fashion, starting with 9α - fluoro - 16α - methyl - 1,4 - pregnadiene - 17α,21 - diol - 3,11,20 - trione and using trimethylpropyl iodide in place of the methyl iodide reactant, there is obtained, 9α - fluoro-16α-methyl - 1,4 - pregnadiene - 17α,21 - diol - 3,11,20 - trione 21 - trimethylpropyl ether.

Similarly, 9α - fluoro - 16α - propyl - 1,4 - pregnadiene-17α,21 - diol - 3,11,20 - trione is converted to 9α - fluoro-16α - propyl - 1,4 - pregnadiene - 17α,21 - diol - 3,11,20-trione 21 - methyl ether, 9α - fluoro - 16α - propyl - 1,4 - pregnadiene - 17α,21 - diol - 3,11,20 - trione 21 - allyl ether and 9α - fluoro - 16α - propyl - 1,4 - pregenadiene - 17α,21 - diol - 3,11,20 - trione 21 - trimethylpropyl ether.

*Example 104*

240 mg. of 9α - fluoro - 16β - methyl - 1,4 - pregnadiene - 17α,21 - diol - 3,11,20 - trione in 10 ml. of dimethylformamide is added to 500 mg. of silver oxide and 0.8 ml. of methyl iodide. The mixture is allowed to reflux with stirring for approximately one hour, during which the black silver oxide disappears and is replaced by white solid silver iodide. The mixture is cooled, 10 ml. of chloroform is added precipitating more solid, the resulting mixture is filtered, and the filtered solution is evaporated to dryness. The residual material is dissolved in chloroform, the chloroform solution is filtered, and the filtered solution is evaporated to dryness. The residual material is chromatographed on acid-washed alumina to give 9α - fluoro - 16β - methyl - 1,4 - pregnadiene - 17α,21 - diol - 3,11,20 - trione 21 - methyl ether.

In similar fashion, starting with 9α - fluoro - 16β-ethyl-1,4 - pregnadiene - 17α,21 - diol - 3,11,20 - trione, there is obtained, following reaction with methyl iodide, 9α-fluoro-16β - ethyl - 1,4 - pregnadiene - 17α,21 - diol - 3,11,20 - trione 21 - methyl ether.

Similarly, 9α - fluoro - 16β - propyl - 1,4 - pregnadiene-17α,21 - diol - 3,11,20 - trione is converted to 9α - fluoro - 16β - propyl - 1,4 - pregnadiene - 17α,21 - diol - 3,11,20 - trione 21 - methyl ether, 9α - fluoro - 16β - propyl - 1,4 - pregnadiene - 17α,21 - diol - 3,11,20 - trione 21 - allyl ether, and 9α - fluoro - 16β - propyl - 1,4 -pregnadiene-17α,21 - diol - 3,11,20 - trione 21 - butyl ether.

Example 105

A mixture of 100 mg. of 9α - fluoro - 16α - methyl - 1,4-pregnadiene - 11β,17α,21 - triol - 3,20 - dione, 5.0 ml. of methyl iodide, and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 9α - fluoro - 16α - methyl - 1,4 - pregnadiene - 11β,17α,21 - triol - 3,20 - dione 21 - methyl ether.

In similar fashion, starting with 9α - fluoro - 16α-methyl - 1,4 - pregnadiene - 11β,17α,21 - triol - 3,20-dione and using trimethylpropyl iodide in place of the methyl iodide reactant, there is obtained, 9α - fluoro - 16α-methyl-1,4 - pregnadiene - 11β,17α,21 - triol - 3,20 - dione 21 - trimethylpropyl ether.

Similarly, 9α - fluoro - 16α - methyl - 1,4 - pregnadiene-11β,17α,21 - triol - 3,20 - dione is converted to 9α - fluoro-16α - propyl - 1,4 - pregnadiene - 11β,17α,21 - triol - 3,20-dione 21 - allyl ether, 9α - fluoro - 16α - methyl - 1,4-pregnadiene - 11β,17α,21 - triol - 3,20 - dione 21 - cyclohexyl ether, and 9α - fluoro - 16α - methyl - 1,4 - pregnadiene - 11β,17α,21 - triol - 3,20 - dione 21 - benzyl ether.

Example 106

A mixture of 100 mg. of 9α-fluoro-16β-methyl-1,4-pregnadiene-11β,17α,21-triol-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina, using mixtures of ether and petroleum ether as the eluting solvent, to give 9α-fluoro-16β-methyl-1,4-pregnadiene-11β,17α,21-triol-3,20-dione 21-methyl ether.

In similar fashion, starting with 9α-fluoro-16β-ethyl-1,4-pregnadiene-11β,17α,21-triol-3,20-dione, there is obtained, following reaction with methyl iodide, 9α-fluoro-16β-ethyl - 1,4 - pregnadiene - 11β,17α,21 - triol - 3,20 - dione 21-methyl ether.

Similarly, 9α-fluoro-16β-propyl - 1,4 - pregnadiene-11β,17α,21-triol-3,20-dione is converted to 9α-fluoro-16β-propyl - 1,4 - pregnadiene - 11β,17α,21 - triol - 3,20 - dione 21-methyl ether, 9α-fluoro-16β-propyl-1,4-pregnadiene-11β,17α,21-triol-3,20-dione 21-ethyl ether, and 9α-fluoro-16β - propyl - 1,4 - pregnadiene - 11β,17α,21 - triol - 3,20-dione 21-allyl ether.

Example 107

To a solution of 85 mg. of 16α-methyl-4-pregnene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-4-pregnene-17α, 21-diol-3,11,20-trione 21-methane sulfonate.

To a solution of 62 mg. of 16α-methyl-4-pregnene-17α, 21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16α-methyl-17α,21-oxido-4-pregnene-3,11,20-trione. The column is then eluted with chloroform, and the chloroform eluate is evaporated and the residual material is recrystallized from methanol to give 21 - fluoro - 16α - methyl - 4 - pregnene - 17α - ol-3,11,20-trione.

In similar fashion, starting with 16α-ethyl-4-pregnene-17α,21-diol-3,11,20-trione there is obtained, following reaction with methane-sulfonyl chloride, 16α-ethyl-4-pregnene-17α,21-diol-3,11,20 - trione 21 - methane sulfonate, which upon reaction with potassium fluoride in dimethylformamide is converted to 21-fluoro-16α-ethyl-4-pregnene-17α-ol-3,11,20-trione.

Similarly, 16α - propyl - 4 - pregnene - 17α,21 - diol-3,11,20-trione is converted to 16α-propyl-4-pregnene-17α, 21-diol-3,11,20-trione 21-methane sulfonate, and the latter is reacted with potassium fluoride to produce 21-fluoro-16α-propyl-4-pregnene-17α-ol-3,11,20-trione.

Example 108

To a solution of 85 mg. of 16β-methyl-4-pregnene-17α, 21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-4-pregnene-17α,21-diol-3,11,20-trione 21-methane sulfonate.

To a solution of 62 mg. of 16β-methyl-4-pregnene-17α, 21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16β-methyl-17α,21-oxido-4-pregnene-3,11,20-trione. The column is then eluted with chloroform, and the chloroform eluate is evaporated, and the residual material is recrystallized from methanol to give 21-fluoro-16β-methyl-4-pregnene-17α-ol-3,11,20-trione.

In similar fashion, starting with 16β-ethyl-4-pregnene-17α,21-diol-3,11,20-trione there is obtained, following reaction with methane-sulfonyl chloride, 16β-ethyl-4-pregnene-17α,21-diol-3,11,20-trione 21-methane sulfonate, which upon reaction with potassium fluoride in dimethylformamide is converted to 21-fluoro-16β-ethyl-4-pregnene-17α-ol-3,11,20-trione.

Similarly, 16β-propyl-4-pregnene-17α,21-diol-3,11,20-trione is converted to 16β-propyl-4-pregnene-17α,21-diol-3,11,20-trione 21-methane sulfonate, and the latter is reacted with potassium fluoride to produce 21-fluoro-16β-propyl-4-pregnene-17α-ol-3,11,20-trione.

Example 109

To a solution of 85 mg. of 16α-methyl-4-pregnene-11β,17α,21-triol-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-4-pregnene-11β,17α,21-triol-3,20-dione 21-methane sulfonate.

To a solution of 62 mg. of 16α-methyl-4-pregnene-11β,17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16α-methyl-17α,21-oxido-4-pregnene-11β-ol-3,20-dione. The column is then eluted with chloroform, and the chloroform eluate is evaporated, and the residual material is recrystallized from methanol to give 21-fluoro-16α-methyl-4-pregnene-11β,17α-diol-3,20-dione.

In similar fashion, starting with 16α-ethyl-4-pregnene-11β,17α,21-triol-3,20-dione there is obtained, following reaction with methane-sulfonyl chloride, 16α-ethyl-4-pregnene-11β,17α-21-triol-3,20-dione 21-methane sulfonate, which upon reaction with potassium fluoride in dimethylformamide is converted to 21-fluoro-16α-ethyl-4-pregnene-11β,17α-diol-3,20-dione.

Similarly, 16α-butyl-4-pregnene-11β,17α,21-triol-3,20-dione is converted to 16α-butyl-4-pregnene-11β,17α,21-triol-3,20-dione 21-methane sulfonate, and the latter is reacted with potassium fluoride to produce 21-fluoro-16α-butyl-4-pregnene-11β,17α-diol-3,20-dione.

Example 110

To a solution of 85 mg. of 16β-methyl-4-pregnene-11β,17α,21-triol-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-4-pregnene-11β,17α,21-triol-3,20-dione 21-methane sulfonate.

To a solution of 62 mg. of 16β-methyl-4-pregnene-11β,17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16β-methyl-17α,21-oxido-4-pregnene-11β-ol-3,20-dione. The column is then eluted with chloroform, and the chloroform eluate is evaporated, and the residual material is recrystallized from methanol to give 21-fluoro-16β-methyl-4-pregnene-11β,17α-diol-3,20-dione.

In similar fashion, starting with 16β-ethyl-4-pregnene-11β,17α,21-triol-3,20-dione there is obtained, following reaction with methane-sulfonyl chloride, 16β-ethyl-4-pregnene-11β,17α,21-triol-3,20-dione 21-methane sulfonate, which upon reaction with potassium fluoride in dimethylformamide is converted to 21-fluoro-16β-ethyl-4-pregnene-11β,17α-diol-3,20-dione.

Similarly, 16β-butyl-4-pregnene-11β,17α,21-triol-3,20-dione is converted to 16β-butyl-4-pregnene-11β,17α,21-triol-3,20-dione 21-methane sulfonate, and the latter is reacted with potassium fluoride to produce 21-fluoro-16β-butyl-4-pregnene-11β,17α-diol-3,20-dione.

Example 111

To a solution of 85 mg. of 9α-fluoro-16α-methyl-4-pregnene-17α,21-diol-3,11,20-trione in 0.5 ml. of pyridine, cooled to 0° C., is added 0.03 ml. of methane-sulfonyl chloride. The resulting mixture is allowed to stand at a temperature approximately 0° C. for a period of approximately 1 hour. Water is then added to the reaction mixture and the crystalline precipitate which forms is recovered, washed with water, and dried to give 9α-fluoro-16α-methyl-4-pregnene-17α,21-diol-3,11,20-trione 21-methane sulfonate.

To a solution of 62 mg. of 9α-fluoro-16α-methyl-4-pregnene-17α,21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α-fluoro-16α-methyl-17α,21-oxido-4-pregnene-3,11,20-trione. The column is then eluted with chloroform, and the chloroform eluate is evaporated, and the residual material is recrystallized from methanol to give 9α,21-difluoro-16α-methyl-4-pregnene-17α-ol-3,11,20-trione.

In similar fashion, starting with 9α-fluoro-16α-ethyl-4-pregnene-17α,21-diol-3,11,20-trione there is obtained, following reaction with methane-sulfonyl chloride, 9α-fluoro-16α-ethyl-4-pregnene-17α,21-diol-3,11,20-trione 21-methane sulfonate, which upon reaction with potassium fluoride in dimethylformamide is converted to 9α,21-difluoro-16α-ethyl-4-pregnene-17α-ol-3,11,20-trione.

Similarly, 9α-fluoro-16α-propyl-4-pregnene-17α,21-diol-3,11,20-trione is converted to 9α-fluoro-16α-propyl-4-pregnene-17α,21-diol-3,11,20-trione 21-methane sulfonate, and the latter is reacted with potassium fluoride to produce 9α,21-difluoro-16α-propyl-4-pregnene-17α-ol-3,11,20-trione.

Example 112

To a solution of 85 mg. of 9α-fluoro-16β-methyl-4-pregnene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro- 16β-methyl-4-pregnene-17α,21 - diol - 3,11,20 - trione 21-methane sulfonate.

To a solution of 62 mg. of 9α - fluoro - 16β - methyl-4 - pregnene - 17α,21 - diol - 3,11,20 - trione 21 - methane sulfonate in 1 ml. of anhydrous dimethylformamide (freshly distilled) is added sufficient anhydrous potassium fluoride to give a saturated solution. The mixture is heated at a temperature at 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α - fluoro - 16β - methyl - 17α,21-oxido - 4 - pregnene - 3,11,20 - trione. The column is then eluted with chloroform, and the chloroform eluate is evaporated, and the residual material is recrystallized from methanol to give 9α,21 - difluoro - 16β - methyl - 4 - pregnene - 17α - ol - 3,11,20 - trione.

In similar fashion, starting with 9α - fluoro - 16β-ethyl - 4 - pregnene - 17α,21 - diol - 3,11,20 - trione there is obtained, following reaction with methane - sulfonyl chloride, 9α - fluoro - 16β - ethyl - 4 - pregnene - 17α,21 - diol - 3,11,20 - trione 21 - methane sulfonate, which upon reaction with potassium fluoride in dimethylformamide is converted to 9α,21 - difluoro - 16β - ethyl - 4- pregnene - 17α - ol - 3,11,20 - trione.

Similarly, 9α - fluoro - 16β - propyl - 4 - pregnene-17α,21 - diol - 3,11,20 - trione is converted to 9α - fluoro-16β - propyl - 4 - pregnene - 17α,21 - diol - 3,11,20-trione 21 - methane sulfonate, and the latter is reacted with potassium fluoride to produce 9α,21 - difluoro - 16β-propyl - 4 - pregnene - 17α - ol - 3,11,20 - trione.

*Example 113*

To a solution of 85 mg. of 9α - fluoro - 16α - methyl-4 - pregnene - 11β,17α,21 - triol - 3,20 - dione in 0.5 ml. of pyridine, cooled to 0° C., is added 0.03 ml. of methane - sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α - fluoro - 16α - methyl - 4 - pregnene-11β,17α,21 - triol - 3,20 - dione 21 - methane sulfonate.

To a solution of 62 mg. of 9α - fluoro - 16α - methyl-4 - pregnene - 11β,17α,21 - triol - 3,20 - dione 21 - methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α - fluoro - 16α - methyl - 17α,21-oxido - 4 - pregnene - 11β - ol - 3,20 - dione. The column is then eluted with chloroform, and the chloroform eluate is evaporated, and the residual material is recrystallized from methanol to give 9α,21 - difluoro - 16α - methyl-4 - pregnene - 11β,17α - diol - 3,20 - dione.

In similar fashion, starting with 9α - fluoro - 16α-ethyl - 4 - pregnene - 11β,17α,21 - triol - 3,20 - dione there is obtained, following reaction with methane - sulfonyl chloride, 9α - fluoro - 16α - ethyl - 4 - pregnene-11β,17α,21 - triol - 3,20 - dione 21 - methane sulfonate, which upon reaction with potassium fluoride in dimethylformamide is converted to 9α,21 - difluoro - 16α - ethyl-4 - pregnene - 11β,17α - diol - 3,20 - dione.

Similarly, 9α - fluoro - 16α - butyl - 4 - pregnene-11β,17α,21 - triol - 3,20 - dione is converted to 9α - fluoro-16α - butyl - 4 - pregnene - 11β,17α,21 - triol - 3,20-dione 21 - methane sulfonate, and the latter is reacted with potassium fluoride to produce 9α,21 - difluoro - 16α-butyl - 4 - pregnene - 11β,17α - diol - 3,20 - dione.

*Example 114*

To a solution of 85 mg. of 9α - fluoro - 16β - methyl-4 - pregnene - 11β,17α,21 - triol - 3,20 - dione in 0.5 ml. of pyridine, cooled to 0° C., is added 0.03 ml. of methane - sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α - fluoro - 16β - methyl - 4 - pregnene - 11β,17α,21-triol - 3,20 - dione 21 - methane sulfonate.

To a solution of 62 mg. of 9α - fluoro - 16β - methyl-4 - pregnene - 11β,17α,21 - triol - 3,20 - dione 21 - methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α - fluoro - 16β - methyl - 17α,21-oxido - 4 - pregnene - 11β - ol - 3,20 - dione. The column is then eluted with chloroform, and the chloroform eluate is evaporated, and the residual material is recrystallized from methanol to give 9α,21 - difluoro - 16β - methyl-4 - pregnene - 11β,17α - diol - 3,20 - dione.

In similar fashion, starting with 9α - fluoro - 16β-ethyl - 4 - pregnene - 11β,17α,21 - triol - 3,20 - dione there is obtained, following reaction with methane - sulfonyl chloride, 9α - fluoro - 16β - ethyl - 4 - pregnene-11β,17α,21 - triol - 3,20 - dione 21 - methane sulfonate, which upon reaction with potassium fluoride in dimethylformamide is converted to 9α,21 - difluoro - 16β - ethyl-4 - pregnene - 11β,17α - diol - 3,20 - dione.

Similarly, 9α - fluoro - 16β - butyl - 4 - pregnene-11β,17α,21 - triol - 3,20 - dione is converted to 9α-fluoro - 16β - butyl - 4 - pregnene - 11β,17α,21 - triol-3,20 - dione 21 - methane sulfonate, and the latter is reacted with potassium fluoride to produce 9α,21 - difluoro - 16β - butyl - 4 - pregnene - 11β,17α - diol - 3,20-dione.

*Example 115*

To a solution of 85 mg. of 16α - methyl - 1,4 - pregnadiene - 17α,21 - diol - 3,11,20 - trione in 0.5 ml. of pyridine, cooled to 0° C., is added 0.03 ml. of methanesulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α - methyl - 1,4 - pregnadiene - 17α,21 - diol-3,11,20 - trione 21 - methane sulfonate.

To a solution of 62 mg. of 16α - methyl - 1,4 - pregnadiene - 17α,21 - diol - 3,11,20 - trione 21 - methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16α - methyl - 17α,21 - oxido - 1,4 - pregnadiene- 3,11,20 - trione. The column is then eluted with chloroform, and the chloroform eluate is evaporated, and the residual material is recrystallized from methanol to give 21 - fluoro - 16α - methyl - 1,4 - pregnadiene - 17α - ol-3,11,20 - trione.

In similar fashion, starting with 16α-ethyl-1,4-pregnadiene-17α,21-diol-3,11,20-trione there is obtained, following reaction with methane-sulfonyl chloride, 16α-ethyl-1,4 - pregnadiene - 17α,21-diol-3,11,20-trione 21-methane sulfonate, which upon reaction with potassium fluoride in dimethylformamide is converted to 21-fluoro-16α-ethyl-1,4-pregnadiene-17α-ol-3,11,20-trione.

Similarly, 16α - propyl - 1,4-pregnadiene-17α,21-diol-3,11,20-trione is converted to 16α-propyl-1,4-pregnadiene-17α,21-diol-3,11,20-trione 21-methane sulfonate, and the latter is reacted with potassium fluoride to produce 21-fluoro-16α-propyl-1,4-pregnadiene-17α-ol-3,11,20-trione.

*Example 116*

To a solution of 85 mg. of 16β-methyl-1,4-pregnadiene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-1,4-pregnadiene-17α,21-diol-3,11,20-trione 21-methane sulfonate.

To a solution of 62 mg. of 16β-methyl-1,4-pregnadiene-17α,21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16β-methyl-17α,21-oxido-1,4-pregnadiene-3,11,20-trione. The column is then eluted with chloroform, and the chloroform eluate is evaporated, and the residual material is recrystallized from methanol to give 21-fluoro-16β-methyl-1,4-pregnadiene-17α-ol-3,11,20-trione.

In similar fashion, starting with 16β-ethyl-1,4-pregnadiene-17α,21-diol-3,11,20-trione there is obtained, following reaction with methane-sulfonyl chloride, 16β-ethyl-1,4 - pregnadiene - 17α,21-diol-3,11,20-trione 21-methane sulfonate, which upon reaction with potassium fluoride in dimethylformamide is converted to 21-fluoro-16β-ethyl-1,4-pregnadiene-17α-ol-3,11,20-trione.

Similarly, 16β - propyl-1,4-pregnadiene-17α,21-diol-3,11,20-trione is converted to 16β-propyl-1,4-pregnadiene-17α,21-diol-3,11,20-trione 21-methane sulfonate, and the latter is reacted with potassium fluoride to produce 21-fluoro-16β-propyl-1,4-pregnadiene-17α-ol-3,11,20-trione.

*Example 117*

To a solution of 85 mg. of 16α-methyl-1,4-pregnadiene-11β,17α-21-triol-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-1,4-pregnadiene-11β,17α,21-triol-3,20-dione 21-methane sulfonate.

To a solution of 62 mg. of 16α-methyl-1,4-pregnadiene-11β,17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16α-methyl-17α,21-oxido-1,4-pregnadiene-11β-ol-3,20-dione. The column is then eluted with chloroform, and the chloroform eluate is evaporated, and the residual material is recrystallized from methanol to give 21-fluoro-16α-methyl-1,4-pregnadiene-11β,17α-diol-3,20-dione.

In similar fashion, starting with 16α-ethyl-1,4-pregnadiene-11β,17α,21-triol-3,20-dione there is obtained, following reaction with methane-sulfonyl chloride, 16α-ethyl-1,4 - pregnadiene-11β,17α,21-triol-3,20-dione 21-methane sulfonate, which upon reaction with potassium fluoride in dimethylformamide is converted to 21-fluoro-16α-ethyl-1,4-pregnadiene-11β,17α-diol-3,20-dione.

Similarly, 16α - butyl-1,4-pregnadiene-11β,17α,21-triol-3,20-dione is converted to 16α-butyl-1,4-pregnadiene-11β,17α,21-triol-3,20-dione 21-methane sulfonate, and the latter is reacted with potassium fluoride to produce 21-fluoro-16α-butyl-1,4-pregnadiene-11β,17α-diol-3,20-dione.

*Example 118*

To a solution of 85 mg. of 16β-methyl-1,4-pregnadiene-11β,17α,21-triol-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-1,4-pregnadiene-11β,17α,21-triol-3,20-dione 21-methane sulfonate.

To a solution of 62 mg. of 16β-methyl-1,4-pregnadiene-11β,17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 16β-methyl-17α-21-oxido-1,4-pregnadiene-11β-ol-3,20-dione. The column is then eluted with chloroform, and the chloroform eluate is evaporated, and the residual material is recrystallized from methanol to give 21-fluoro-16β-methyl-1,4-pregnadiene-11β,17α-diol-3,20-dione.

In similar fashion, starting with 16β-ethyl-1,4-pregnadiene-11β,17α,21-triol-3,20-dione there is obtained, following reaction with methane-sulfonyl chloride, 16β-ethyl - 1,4 - pregnadiene - 11β,17α,21-triol-3,20-dione 21-methane sulfonate, which upon reaction with potassium fluoride in dimethylformamide is converted to 21-fluoro-16β-ethyl-1,4-pregnadiene-11β,17α-diol-3,20-dione.

Similarly, 16β - butyl-1,4-pregnadiene-11β,17α,21-triol-3,20-dione is converted to 16β-butyl-1,4-pregnadiene-11β,17α,21-triol-3,20-dione 21-methane sulfonate, and the latter is reacted with potassium fluoride to produce 21-fluoro-16β-butyl-1,4-pregnadiene-11β,17α-diol-3,20-dione.

*Example 119*

To a solution of 85 mg. of 9α-fluoro-16α-methyl-1,4-pregnadiene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16α - methyl - 1,4-pregnadiene-17α,21-diol-3,11,20-trione 21-methane sulfonate.

To a solution of 62 mg. of 9α-fluoro-16α-methyl-1,4-pregnadiene-17α,21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α-fluoro - 16α-methyl-17α,21-oxido-1,4-pregnadiene-3,11,20-trione. The column is then eluted with chloroform, and the chloroform eluate is evaporated, and the residual material is recrystallized from methanol to give 9α,21-difluoro-16α-methyl-1,4-pregnadiene-17α,ol-3,11,20-trione.

In similar fashion, starting with 9α-fluoro-16α-ethyl-1,4 - pregnadiene-17α,21-diol-3,11,20-trione there is obtained, following reaction with methane-sulfonyl chloride, 9α - fluoro-16α-ethyl-1,4-pregnadiene-17α,21-diol-3,11,20-trione 21-methane sulfonate, which upon reaction with potassium fluoride in dimethylformamide is converted to 9α,21 - difluoro-16α-ethyl-1,4-pregnadiene-17α-ol-3,11,20-trione.

Similarly, 9α-fluoro-16α-propyl-1,4-pregnadiene-17α,21-diol-3,11,20-trione is converted to 9α-fluoro-16α-propyl-1,4 - pregnadiene - 17α-21-diol-3,11,20-trione 21-methane sulfonate, and the latter is reacted with potassium fluoride to produce 9α,21 - difluoro - 16α-propyl-1,4-pregnadiene-17α-ol-3,11,20-trione.

*Example 120*

To a solution of 85 mg. of 9α-fluoro-16β-methyl-1,4-pregnadiene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β-methyl-1,4-pregnadiene-17α,21-diol-3,11,20-trione 21-methane sulfonate.

To a solution of 62 mg. of 9α-fluoro-16β-methyl-1,4-pregnadiene-17α,21-diol-3,11,20-trione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α-fluoro - 16β-methyl-17α,21-oxido-1,4-pregnadiene-3,11,20-trione. The column is then eluted with chloroform, and the chloroform eluate is evaporated, and the residual material is recrystallized from methanol to give 9α,21-difluoro-16β-methyl-1,4-pregnadiene-17α-ol-3,11,20-trione.

In similar fashion, starting with 9α-fluoro-16β-ethyl-1,4-pregnadiene-17α,21-diol-3,11,20-trione there is obtained, following reaction with methane-sulfonyl chloride, 9α-fluoro - 16β-ethyl-1,4-pregnadiene-17α,21-diol-3,11,20-trione 21-methane sulfonate, which upon reaction with potassium fluoride in dimethylformamide is converted to 9α,21 - difluoro-16β-ethyl-1,4-pregnadiene-17α-ol-3,11,20-trione.

Similarly, 9α - fluoro-16β-propyl-1,4-pregnadiene-17α,21-diol-3,11,20-trione is converted to 9α-fluoro-16β-propyl-1,4-pregnadiene-17α,21-diol-3,11,20-trione 21-methane sulfonate, and the latter is reacted with potassium fluoride to produce 9α,21 - difluoro-16β-propyl-1,4-pregnadiene-17α-ol-3,11,20-trione.

*Example 121*

To a solution of 85 mg. of 9α-fluoro-16α-methyl-1,4-pregnadiene-11β,17α,21-triol-3,20-dione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro - 16α-methyl-1,4-pregnadiene-11β,17α,21-triol-3,20-dione 21-methane sulfonate.

To a solution of 62 mg. of 9α-fluoro-16α-methyl-1,4-pregnadiene-11β-17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the chloroform-ether eluate is evaporated to give 9α-fluoro-16α-methyl-17α,21-oxido-1,4-pregnadiene-11β-ol-3,20-dione. The column is then eluted with chloroform, and the chloroform eluate is evaporated, and the residual material is recrystallized from methanol to give 9α,21-difluoro-16α-methyl-1,4-pregnadiene-11β,17α-diol-3,20-dione.

In similar fashion, starting with 9α-fluoro-16α-ethyl-1,4-pregnadiene-11β,17α,21-triol-3,20-dione there is obtained following reaction with methane-sulfonyl chloride, 9α-fluoro - 16α - ethyl-1,4-pregnadiene-11β,17α,21-triol-3,20-dione 21-methane sulfonate, which upon reaction with potassium fluoride in dimethylformamide is converted to 9α,21 - difluoro - 16α-ethyl-1,4-pregnadiene-11β,17α-diol-3,20-dione.

Similarly, 9α-fluoro-16α-butyl-1,4-pregnadiene-11β,17α,21-triol-3,20-dione is converted to 9α-fluoro-16α-butyl-1,4 - pregnadiene-11β,17α,21-triol-3,20-dione 21-methane sulfonate, and the latter is reacted with potassium fluoride to produce 9α,21-difluoro-16α-butyl-1,4-pregnadiene-11β,17α-diol-3,20-dione.

*Example 122*

To a solution of 85 mg. of 9α-fluoro-16β-methyl-1,4-pregnadiene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β-methyl-1,4-pregnadiene-11β,17α,21-triol-3,20-dione 21-methane sulfonate.

To a solution of 62 mg. of 9α-fluoro-16β-methyl-1,4-pregnadiene - 11β,17α,21-triol-3,20-dione 21-methane sulfonate in 1 ml. of anhydrous dimethylformamide (freshly distilled) is added sufficient anhydrous potassium fluoride to give a saturated solution. The mixture is heated at a temperature of 110° C. for a period of approximately 20 hours, the reaction mixture is cooled, and water is added thereto. The aqueous mixture is extracted with chloroform and the chloroform extract is dried over anhydrous sodium sulfate and evaporated to dryness. The residual material is chromatographed on acid washed alumina. The alumina column is eluted with a 1:1 mixture of ether:chloroform, and the eluate is evaporated to give 9α-fluoro-16β-methyl-17α,21-oxido-1,4-pregnadiene-11β-ol-3,20-dione. The column is then eluated with chloroform, and the chloroform eluate is evaporated, and the residual material is recrystallized from methanol to give 9α,21-difluoro-16β-methyl-1,4-pregnadiene-11β,17α-diol-3,20-dione.

In similar fashion, starting with 9α-fluoro-16β-ethyl-1,4-pregnadiene-11β,17α,21-triol-3,20-dione there is obtained, following reaction with methane-sulfonyl chloride, 9α-fluoro-16β-ethyl-1,4-pregnadiene-11β,17α,21-triol-3,20-dione 21-methane sulfonate, which upon reaction with potassium fluoride in dimethylformamide is converted to 9α,21-difluoro-16β-ethyl-1,4-pregnadiene-11β,17α-diol-3,200-dione.

Similarly, 9α-fluoro-16β-butyl-1,4-pregnadiene-11β,17α,21-triol-3,20-dione is converted to 9α-fluoro-16β-butyl-1,4-pregnadiene-11β,17α,21-triol-3,20-dione 21-methane sulfonate, and the latter is reacted with potassium fluoride to produce 9α,21-difluoro-16β-butyl-1,4-pregnadiene-11β,17α-diol-3,20-dione.

*Example 123*

To a solution of 85 mg. of 16α-methyl-4-pregnene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-4-pregnene-17α,21-diol-3,11,20-trione 21-methane sulfonate.

To 180 mg. of 16α-methyl-4-pregnene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16α-methyl-21-iodo-4-pregnene-17α-ol-3,11,20-trione.

This 16α-methyl-21-iodo-4-pregnene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16α-methyl-4-pregnene-17α-ol-3,11,20-trione.

In similar fashion, starting with 16α-ethyl-4-pregnene-17α,21-diol-3,11,20-trione there is obtained, following reaction with methane-sulfonyl chloride, 16α-ethyl-4-pregnene-17α,21-diol-3,11,20-trione 21-methane sulfonate, which upon reaction with sodium iodide in acetone is converted to 16α-ethyl-21-iodo-4-pregnene-17α-ol-3,11,20-trione; the latter compound, upon reaction with sodium bisulfite in accordance with the procedure set forth hereinabove, is converted to 16α-ethyl-4-pregnene-17α-ol-3,11,20-trione.

Similarly, 16α-propyl-4-pregnene-17α,21-diol-3,11,20-trione is converted to 16α-propyl-4-pregnene-17α,21-diol-3,11,20-trione 21-methane sulfonate, the latter is reacted with sodium iodide to produce 16α-propyl-21-iodo-4-pregnene-17α-ol-3,11,20-trione, which is reacted with sodium bisulfite to form 16α-propyl-4-pregnene-17α-ol-3,11,20-trione.

*Example 124*

To a solution of 85 mg. of 16β-methyl-4-pregnene-17α,21-diol-3,11,20-trione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-4-pregnene-17α,21-diol-3,11,20-trione 21-methane sulfonate.

To 180 mg. of 16β-methyl-4-pregnene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16β-methyl-21-iodo-4-pregnene-17α-ol-3,11,20-trione.

This 16β-methyl-21-iodo-4-pregnene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16β-methyl-4-pregnene-17α-ol-3,11,20-trione.

In similar fashion, starting with 16β-ethyl-4-pregnene-17α,21-diol-3,11,20-trione there is obtained, following reaction with methane-sulfonyl chloride, 16β-ethyl-4-pregnene-17α,21-diol 3,11,20-trione 21-methane sulfonate, which upon reaction with sodium iodide in acetone is converted to 16β-ethyl-21-iodo-4-pregnene-17α-ol-3,11,20-trione; the latter compound, upon reaction with sodium bisulfite in accordance with the procedure set forth hereinabove, is converted to 16β-ethyl-4-pregnene-17α-ol-3,11,20-trione.

Similarly, 16β-propyl-4-pregnene-17α,21-diol-3,11,20-trione is converted to 16β-propyl-4-pregnene-17α,21-diol-3,11,20-trione 21-methane sulfonate, the latter is reacted with sodium iodide to produce 16β-propyl-21-iodo-4-pregnene-17α-ol-3,11,20-trione, which is reacted with sodium bisulfite to form 16β-propyl-4-pregnene-17α-ol-3,11,20-trione.

*Example 125*

To a solution of 85 mg. of 16α-methyl-4-pregnene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-4-pregnene-11β,17α21-triol-3,20-dione 21-methane sulfonate.

To 180 mg. of 16α-methyl-4-pregnene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16α-methyl-21-iodo-4-pregnene-11β,17α-diol-3,20-dione.

This 16α-methyl-21-iodo-4-pregnene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried, and recrystallized from ethyl acetate to give 16α-methyl-4-pregnene-11β,17α-diol-3,20-dione.

In similar fashion, starting with 16α-ethyl-4-pregnene-11β,17α,21-triol-3,20-dione there is obtained, following reaction with methane-sulfonyl chloride, 16α-ethyl-4-pregnene-11β,17α,21-triol-3,20-dione 21-methane sulfonate, which upon reaction with sodium iodide in acetone is converted to 16α-ethyl-21-iodo-4-pregnene-11β,17α-diol-3,20-dione; the latter compound, upon reaction with sodium bisulfite in accordance with the procedure set forth hereinabove, is converted to 16α-ethyl-4-pregnene-11β,17α-diol-3,20-dione.

Similarly, 16α - propyl - 4 - pregnene-11β,17α,21-triol-3,20-dione is converted to 16α-propyl-4-pregnene-11β,17α,21-triol-3,20-dione 21-methane sulfonate, the latter is reacted with sodium iodide to produce 16α-propyl-21-iodo-4-pregnene-11β,17α-diol-3,20-dione, which is reacted with sodium bisulfite to form 16α-propyl-4-pregnene-11β,17α-diol-3,20-dione.

*Example 126*

To a solution of 85 mg. of 16β-methyl-4-pregnene-11β,17a,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-4-pregnene-11β,17α,21-triol-3,20-dione 21-methane sulfonate.

To 180 mg. of 16β-methyl-4-pregnene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16β-methyl-21-iodo-4-pregnene-11β,17α-diol-3,20-dione.

This 16b-methyl-21-iodo-4-pregnene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried, and recrystallized from ethyl acetate to give 16β-methyl-4-pregnene-11β,17α-diol-3,20-dione.

In similar fashion, starting with 16β-ethyl-4-pregnene-11β,17α,21-triol-3,20-dione there is obtained, following reaction with methane-sulfonyl chloride, 16β-ethyl-4-pregnene - 11β,17α,21-triol-3,20-dione 21-methane sulfonate, which upon reaction with sodium iodide in acetone is converted to 16β-ethyl-21-iodo-4-pregnene-11β,17α-diol-3,20-dione; the latter compound, upon reaction with sodium bisulfite in accordance with the procedure set forth hereinabove, is converted to 16β-ethyl-4-pregnene-11β,17α-diol-3,20-dione.

Similarly, 16β-propyl-4-pregnene-11β,17α,21-triol-3,20-dione is converted to 16β-propyl-4-pregnene-11β,17α,21-triol-3,20-dione 21-methane sulfonate, the latter is reacted with sodium iodide to produce 16β-propyl-21-iodo-4-pregnene-11β,17α-diol-3,20-dione, which is reacted with sodium bisulfite to form 16β-propyl-4-pregnene-11β,17α-diol-3,20-dione.

*Example 127*

To a solution of 85 mg. of 9α-fluoro-16α-methyl-4-pregnene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16α-methyl - 4 - pregnene-17α,21-diol-3,11,20-trione 21-methane sulfonate.

To 180 mg. of 9α-fluoro-16α-methyl-4-pregnene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-16α-methyl-21-iodo-4-pregnene-17α-ol-3,11,20-trione.

This 9α - fluoro-16α-methyl-21-iodo-4-pregnene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-16α-methyl-4-pregnene-17α-ol-3,11,20-trione.

In similar fashion, starting with 9α-fluoro-16α-ethyl-4-pregnene-17α,21-diol-3,11,20-trione there is obtained, following reaction with methane-sulfonyl chloride, 9α-fluoro-16α-ethyl-4-pregnene-17α,21-diol-3,11,20 - trione 21-methane sulfonate, which upon reaction with sodium iodide in acetone is converted to 9α-fluoro-16α-ethyl-21-iodo-4-pregnene-17α-ol-3,11,20-trione; the latter compound, upon reaction with sodium bisulfite in accordance with the procedure set forth hereinabove, is converted to 9α-fluoro-16α-ethyl-4-pregnene-17α-ol-3,11,20-trione.

Similarly, 9α-fluoro-16α-propyl-4-pregnene-17α,21-diol-3,11,20-trione is converted to 9α-fluoro-16α-propyl-4-pregnene-17α,21-diol-3,11,20-trione 21-methane sulfonate, the latter is reacted with sodium iodide to produce 9α-fluoro-16α - propyl - 21 - iodo-4-pregnene-17α-ol-3,11,20-trione, which is reacted with sodium bisulfite to form 9α-fluoro-16α-propyl-4-pregnene-17α-ol-3,11,20-trione.

*Example 128*

To a solution of 85 mg. of 9α-fluoro-16β-methyl-4-pregnene-17α,21-diol-3,11,20-trione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β-methyl-4-pregnene - 17α,21 - diol-3,11,20-trione 21-methane sulfonate.

To 180 mg. of 9α-fluoro-16β-methyl-4-pregnene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-16β-methyl-21-iodo-4-pregnene-17α-ol-3,11,20-trione.

This 9α-fluoro-16β-methyl-21-iodo-4-pregnene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-16β-methyl-4-pregnene-17α-ol-3,11,20-trione.

In similar fashion, starting with 9α-fluoro-16β-ethyl-4-pregnene-17α,21-diol-3,11,20-trione there is obtained, following reaction with methane-sulfonyl chloride, 9α-fluoro-16β-ethyl-4-pregnene - 17α,21 - diol-3,11,20-trione 21-methane sulfonate, which upon reaction with sodium iodide in acetone is converted to 9α-fluoro-16β-ethyl-21-iodo-4-pregnene - 17α-ol-3,11,20 - trione; the latter compound, upon reaction with sodium bisulfite in accordance with the procedure set forth herein above, is converted to 9α-fluoro-16β-ethyl-4-pregnene-17α-ol-3,11,20-trione.

Similarly, 9α-fluoro-16β-propyl - 4 - pregnene-17α,21-diol-3,11,20-trione is converted to 9α-fluoro-16β-propyl-4-pregnene-17α,21 - diol-3,11,20-trione 21-methane sulfonate, the latter is reacted with sodium iodide to produce 9α-fluoro-16β-propyl - 21 - iodo-4-pregnene-17α-ol-3,11,20-trione, which is reacted with sodium bisulfite to form 9α-fluoro-16β-propyl - 4 - pregnene-17α-ol-3,11,20-trione.

Example 129

To a solution of 85 mg. of 9α-fluoro-16α-methyl-4-pregnene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16α-methyl-4-pregnene - 11β,17α,21 - triol-3,20-dione 21-methane sulfonate.

To 180 mg. of 9α-fluoro-16α-methyl-4-pregnene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give-9α-fluoro-16α-methyl-21-iodo-4-pregnene-11β,17α-diol-3,20-dione.

This 9α-fluoro-16α-methyl-21-iodo - 4 - pregnene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-16α-methyl-4-pregnene - 11β,17α - diol-3,20-dione.

In similar fashion, starting with 9α-fluoro-16α-ethyl-4-pregnene-11β,17α,21-triol-3,20-dione there is obtained, following reaction with methane-sulfonyl chloride, 9α-fluoro-16α-methyl - 4 - pregnene-11β,17α,21-triol-3,20-dione 21-methane sulfonate, which upon reaction with sodium iodide in acetone is converted to 9α-fluoro-16α-ethyl-21-iodo-4-pregnene - 11β,17α - diol-3,20-dione; the latter compound, upon reaction with sodium bisulfite in accordance with the procedure set forth hereinabove, is converted to 9α-fluoro-16α-ethyl - 4 - pregnene-11β,17α-diol-3,20-dione.

Similarly, 9α-fluoro-16α-propyl - 4 - pregnene-11β,17α,21-triol-3,20-dione is converted to 9α-fluoro-16α-propyl-4-pregnene-11β,17α,21 - triol-3,20-dione 21-methane sulfonate, the latter is reacted with sodium iodide to produce 9α-fluoro-16α-propyl - 21 - iodo-4-pregnene-11β,17α-diol-3,20-dione, which is reacted with sodium bisulfite to form 9α-fluoro-16α-propyl-4-pregnene-11β,17α-diol-3,20-dione.

Example 130

To a solution of 85 mg. of 9α-fluoro-16β-methyl-4-pregnene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β-methyl-4-pregnene - 11β,17α,21 - triol-3,20-dione 21-methane sulfonate.

To 180 mg. of 9α-fluoro-16β-methyl-4-pregnene-11β,17α,21-triol-3,20-dione 21-methane sulfonate dissolved in 10 ml. of acetone is added 300 mg. of sodium iodide. The resulting mixture is heded at reflux temperature for a period of approximately 1 hour, and the reaction solution is cooled to room temperature and diluted with water. The crystalline material which precipitates is recovered, washed with water, and dried to give 9α-fluoro-16β-methyl-21-iodo-4-pregnene-11β,17α-diol-3,20-dione.

This 9α-fluoro-16β-methyl - 21 - iodo-4-pregnene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α-fluoro-16β-methyl-4-pregnene - 11β,17α-diol-3,20-dione.

In similar fashion, starting with 9α-fluoro-16β-ethyl-4-pregnene-11β,17α,21-triol-3,20-dione there is obtained, following reaction with methane-sulfonyl chloride, 9α-fluoro-16β-methyl-4-pregnene - 11β,17α,21 - triol-3,20-dione 21-methane sulfonate, which upon reaction with sodium iodide in acetone is converted to 9α-fluoro-16β-ethyl-21-iodo-4-pregnene - 11β,17α-diol-3,20-dione; the latter compound, upon reaction with sodium bisulfite in accordance with the procedure set forth hereinabove, is converted to 9α-fluoro-16β-ethyl - 4 - pregnene-11β,17α-diol-3,20-dione.

Similarly, 9α-fluoro-16β-propyl - 4 - pregnene-11β,17α,21-triol-3,20-dione is converted to 9α-fluoro-16β-propyl-4-pregnene - 11β,17α,21-triol-3,20-dione 21-methane sulfonate, the latter is reacted with sodium iodide to produce 9α-fluoro - 16β - propyl-21-iodo-4-pregnene-11β,17α-diol-3,20-dione, which is reacted with sodium bisulfite to form 9α-fluoro-16β-propyl-4-pregnene-11β,17α-diol-3,20-dione.

Example 131

To a solution of 85 mg. of 16α-methyl-1,4-pregnadiene-17α,21-diol-3,11,20-trione in 0.5 ml. pf. pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-1,4-pregnadiene-17α,21 - diol - 3,11,20-trione 21-methane sulfonate.

To 180 mg. of 16α-methyl-1,4-pregnadiene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16α-methyl-21-iodo-1,4-pregnadiene-17α-ol-3,11,20-trione.

This 16α-methyl-21-iodo-1,4-pregnadiene-17α-ol - 3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16α-methyl-1,4-pregnadiene-17α-ol-3,11,20-trione.

In similar fashion, starting with 16α-ethyl-1,4-pregnadiene-17α,21-diol-3,11,20-trione there is obtained, following reaction with methane-sulfonyl chloride, 16α-ethyl-1,4-pregnadiene-17α,21-diol-3,11,20-trione 21 - methane sulfonate, which upon reaction with sodium iodide in acetone is converted to 16α-ethyl-21-iodo-1,4-pregnadiene-17α-ol-3,11,20-trione; the latter compound, upon reaction with sodium bisulfite in accordance with the procedure set forth hereinabove, is converted to 16α-ethyl-1,4-pregnadiene-17α-ol-3,11,20-trione.

Similarly, 16α-propyl-1,4-pregnadiene-17α,21-diol-3,11,20-trione is converted to 16α-propyl-1,4-pregnadiene-17α,21-diol-3,11,20-trione 21-methane sulfonate, the latter is reacted with sodium iodide to produce 16α-propyl-21-iodo-1,4-pregnadiene-17α-ol-3,11,20-trione, which is reacted with sodium bisulfite to form 16α-propyl-1,4-pregnadiene-17α-ol-3,11,20-trione.

Example 132

To a solution of 85 mg. of 16β-methyl-1,4-pregnadiene-17α,21-diol-3,11,20-trione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-1,4-pregnadiene-17α,21-diol-3,11,20-trione 21-methane sulfonate.

To 180 mg. of 16β-methyl-1,4-pregnadiene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16β-methyl-21-iodo-1,4-pregnadiene-17α-ol-3,11,20-trione.

This 16β-methyl-21-iodo-1,4-pregnadiene-17α-ol - 3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16β-methyl-1,4-pregnadiene-17α-ol-3,11,20-trione.

In similar fashion, starting with 16β-ethyl-1,4-pregnadiene-17α,21-diol-3,11,20-trione there is obtained, following reaction with methane-sulfonyl chloride, 16β-ethyl-1,4-pregnadiene-17α,21diol-3,11,20 - trione 21 - methane sulfonate, which upon reaction with sodium iodide in acetone is converted to 16β-ethyl-21-iodo-1,4-pregnadiene-17α-ol-3,11,20-trione; the latter compound, upon reaction with sodium bisulfite in accordance with the procedure set forth hereinabove, is converted to 16β-ethyl-1,4-pregnadiene-17α-ol-3,11,20-trione.

Similarly, 16β-propyl-1,4-pregnadiene-17α,21-diol-3,11,20-trione is converted to 16β-propyl-1,4-pregnadiene-17α,21-diol-3,11,20-trione 21-methane sulfonate, the latter is reacted with sodium iodide to produce 16β-propyl-21-iodo-1,4-pregnadiene-17α-ol-3,11,20-trione, which is reacted with sodium bisulfite to form 16β-propyl-1,4-pregnadiene-17α-ol-3,11,20-trione.

*Example 133*

To a solution of 85 mg. of 16α-methyl-1,4-pregnadiene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16α-methyl-1,4-pregnadiene-11β,17α,21-triol - 3,20-dione 21-methane sulfonate.

To 180 mg. of 16α-methyl-1,4-pregnadiene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16α-methyl-21-iodo-1,4-pregnadiene-11β,17α-diol-3,20-dione.

This 16α-methyl-21-iodo-1,4-pregnadiene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16α-methyl-1,4-pregnadiene-11β,17α-diol-3,20-dione.

In similar fashion, starting with 16α-ethyl-1,4-pregnadiene-11β,17α,21-triol-3,20-dione there is obtained, following reaction with methane-sulfonyl chloride, 16α-ethyl-1,4-pregnadiene-11β,17α,21-triol-3,20-dione 21 - methane sulfonate, which upon reaction with sodium iodide in acetone is converted to 16α-ethyl-21-iodo-1,4-pregnadiene-11β,17α-diol-3,20-dione; the latter compound, upon reaction wtih sodium bisulfite in accordance with the procedure set forth hereinabove, is converted to 16α-ethyl-1,4-pregnadiene-11β,17α-diol-3,20-dione.

Similarly, 16α-propyl-1,4-pregnadiene-11β,17α,21-triol-3,20-dione is converted to 16α-propyl-1,4-pregnadiene-11β,17α,21-triol-3,20-dione 21-methane sulfonate, the latter is reacted with sodium iodide to produce 16α-propyl-21-iodo-1,4-pregnadiene-11β,17α-diol-3,20-dione, which is reacted with sodium bisulfite to form 16α-propyl-1,4-pregnadiene-11β,17α-diol-3,20-dione.

*Example 134*

To a solution of 85 mg. of 16β-methyl-1,4-pregnadiene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 16β-methyl-1,4-pregnadiene-11β,17α,21-triol-3,20-dione 21 - methane sulfonate.

To 180 mg. of 16β-methyl-1,4-pregnadiene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 16β-methyl-21-iodo-1,4-pregnadiene-11β,17α-diol-3,20-dione.

This 16β-methyl-21-iodo-1,4-pregnadiene-11β,17α-diol-3,20-dione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 16β-methyl-1,4-pregnadiene-11β,17α-diol-3,20-dione.

In similar fashion, starting with 16β-ethyl-1,4-pregnadiene-11β,17α,21-triol-3,20-dione there is obtained, following reaction with methane-sulfonyl chloride, 16β-ethyl-1,4 - pregnadiene-11β,17α,21-triol-3,20-dione 21-methane sulfonate, which upon reaction with sodium iodide in acetone is converted to 16β - ethyl - 21-iodo-1,4-pregnadiene-11β,17α-diol-3,20-dione; the latter compound, upon reaction with sodium bisulfite in accordance with the procedure set forth hereinabove, is converted to 16β-ethyl-1,4-pregnadiene-11β,17α-diol-3,20-dione.

Similarly, 16β-propyl-1,4-pregnadiene-11β,17α,21-triol-3,20-dione is converted to 16β-propyl-1,4-pregnadiene-11β,17α,21-triol-3,20-dione 21-methane sulfonate, the latter is reacted with sodium iodide to produce 16β-propyl-21-iodo-1,4-pregnadiene-11β,17α-diol-3,20-dione, which is reacted with sodium bisulfite to form 16β-propyl-1,4-pregnadiene-11β,17α-diol-3,20-dione.

*Example 135*

To a solution of 85 mg. of 9α-fluoro-16α-methyl-1,4-pregnadiene-17α,21-diol-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro - 16α-methyl-1,4-pregnadiene-17α,21-diol-3,11,20-trione 21-methane sulfonate.

To 180 mg. of 9α-fluoro-16α-methyl-1,4-pregnadiene-17α,21-diol-3,11,20-trione 21-methane sulfonate dissolved in 10 ml. of acetone is added 300 mg. of sodium iodide.

The resulting mixture is heated at reflux temperature for a period of approximately 1 hour, and the reaction solution is cooled to room temperature and diluted with water. The crystalline material which precipitates is recovered, washed with water, and dried to give 9α-fluoro-16α - methyl - 21-iodo-1,4-pregnadiene-17α-ol-3,11,20-trione.

This 9α - fluoro - 16α-methyl-21-iodo-1,4-pregnadiene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α - fluoro - 16α-methyl-1,4-pregnadiene-17α-ol-3,11,20-trione.

In similar fashion, starting with 9α-fluoro-16α-ethyl-1,4-pregnadiene-17α,21-diol-3,11,20-trione there is obtained, following reaction with methane-sulfonyl chloride, 9α-fluoro - 16α-ethyl-1,4-pregnadiene-17α,21-diol-3,11,20-trione 21-methane sulfonate, when upon reaction with sodium iodide in acetone is converted to 9α-fluoro-16α-ethyl-21-iodo-1,4-pregnadiene-17α-ol-3,11,20-trione; the latter compound, upon reaction with sodium bisulfite in accordance with the procedure set forth hereinabove, is converted to 9α-fluoro-16α-ethyl-1,4-pregnadiene-17α-ol-3,11,20-trione.

Similarly, 9α-fluoro-16α-propyl-1,4-pregnadiene-17α,21-diol-3,11,20-trione is converted to 9α-fluoro-16α-propyl-1,4 - pregnadiene - 17α,21-diol-3,11,20-trione 21-methane sulfonate, the latter is reacted with sodium iodide to produce 9α-fluoro-16α-propyl-21-iodo-1,4-pregnadiene-17α-ol-3,11,20-trione, which is reacted with sodium bisulfite to form 9α - fluoro-16α-propyl-1,4-pregnadiene-17α-ol-3,11,20-trione.

*Example 136*

To a solution of 85 mg. of 9α-fluoro-16β-methyl-1,4-pregnadiene-17α,21-diol-3,11,20-trione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β - methyl - 1,4-pregnadiene-17α,21-diol-3,11,20-trione 21-methane sulfonate.

To 180 mg. of 9α-fluoro-16β-methyl-1,4-pregnadiene-17α,21-diol-3,11,20-trione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-16β-methyl-21-iodo-1,4-pregnadiene-17α-ol-3,11,20-trione.

This 9α - fluoro - 16β-methyl-21-iodo-1,4-pregnadiene-17α-ol-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 9α - fluoro - 16β-methyl-1,4-pregnadiene-17α-ol-3,11,20-trione.

In similar fashion, starting with 9α-fluoro-16β-ethyl-1,4-pregnadiene-17α,21-diol-3,11,20-trione there is obtained, following reaction with methane sulfonyl chloride, 9α-fluoro - 16β - ethyl-1,4-pregnadiene-17α,21-diol-3,11,20-trione 21-methane sulfonate, which upon reaction with sodium iodide in acetone is converted to 9α-fluoro-16β-ethyl - 21-iodo-1,4-pregnadiene-17α-ol-3,11,20-trione; the latter compound, upon reaction with sodium bisulfite in accordance with the procedure set forth hereinabove, is converted to 9α-fluoro-16β-ethyl-1,4-pregnadiene-17α-ol-3,11,20-trione.

Similarly, 9α - fluoro-16β-propyl-1,4-pregnadiene-17α, 21-diol-3,11,20-trione is converted to 9α-fluoro-16β-propyl - 1,4 - pregnadiene-17α,21-diol-3,11,20-trione 21-methane sulfonate, the latter is reacted with sodium iodide to produce 9α - fluoro-16β-propyl-21-iodo-1,4-pregnadiene-17α-ol-3,11,20-trione, which is reacted with sodium bisulfite to form 9α-fluoro-16β-propyl-1,4-pregnadiene-17α-ol-3,11,20-trione.

*Example 137*

To a solution of 85 mg. of 9α-fluoro-16α-methyl-1,4-pregnadiene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16α - methyl-1,4-pregnadiene-11β,17α,21-triol-3,20-dione 21-methane sulfonate.

To 180 mg. of 9α-fluoro-16α-methyl-1,4-pregnadiene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-16α-methyl-21-iodo-1,4-pregnadiene-11β,17α - 3,20-dione.

This 9α - fluoro-16α-methyl-21-iodo-1,4-pregnadiene-11β,17α-diol-3,20-dione is dissolved in a mixture of 5 ml. of water and 5 ml. of ethanol. To the resulting suspension is added 500 ml. of sodium bisulfite and the mixture is heated under reflux for a period of about 1 hour. The reaction solution is cooled, diluted with water, and the crystalline material which separates is recovered, washed with water, dried, and recrystallized from ethyl acetate to give 9α - fluoro-16α-methyl-1,4-pregnadiene-11β,17α-diol-3,20-dione.

In similar fashion, starting with 9α-fluoro-16α-ethyl-1,4-pregnadiene-11β,17α,21-triol-3,20-dione there is obtained, following reaction with methane sulfonyl chloride, 9α - fluoro-16α-methyl-1,4-pregnadiene-11β,17α,21-triol-3,20-dione 21-methane sulfonate, which upon reaction with sodium iodide in acetone is converted to 9α-fluoro-16α - ethyl-21-iodo-1,4-pregnadiene-11β,17α-diol-3,20-dione; the latter compound, upon reaction with sodium bisulfite in accordance with the procedure set forth hereinabove, is converted to 9α-fluoro-16α-ethyl-1,4-pregnadiene-11β,17α-diol-3,20-dione.

Similarly, 9α - fluoro-16α-propyl-1,4-pregnadiene-11β, 17α,21-triol-3,20-dione is converted to 9α-fluoro-16α-propyl-1,4-pregnadiene-11β,17α,21-triol-3,20-dione 21-methane sulfonate, the latter is reacted with sodium iodide to produce 9α - fluoro-16α-propyl-21-iodo-1,4-pregnadiene-11β,17α-diol-3,20-dione, which is reacted with sodium bisulfite to form 9α - fluoro-16α-propyl-1,4-pregnadiene-11β,17α-diol-3,20-dione.

*Example 138*

To a solution of 85 mg. of 9α-fluoro-16β-methyl-1,4-pregnadiene-11β,17α,21-triol-3,20-dione in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 9α-fluoro-16β-methyl-1,4-pregnadiene-11β,17α,21-triol-3,20 - dione 21-methane sulfonate.

To 180 mg. of 9α-fluoro-16β-methyl-1,4-pregnadiene-11β,17α,21-triol-3,20-dione 21-methane sulfonate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 9α-fluoro-16β-methyl-21-iodo-1,4-pregnadiene-11β,17α-diol-3,20-dione.

This 9α-fluoro-16β-methyl-21-iodo-1,4-pregnadiene-11β,17α-diol-3,20-dione is dissolved in a mixture of 5 ml. of water and 5 ml. of ethanol. To the resulting suspension is added 500 ml. of sodium bisulfite and the mixture is heated under reflux for a period of about 1 hour. The reaction solution is cooled, diluted with water, and the crystalline material which separates is recovered, washed with water, dried, and recrystallized from ethyl acetate to give 9α-fluoro-16β-methyl-1,4-pregnadiene-11β,17α-diol-3,20-dione.

In similar fashion, starting with 9α-fluoro-16β-ethyl-1,4-pregnadiene-11β,17α,21-triol-3,20-dione there is obtained, following reaction with methane-sulfonyl chloride, 9α-fluoro-16β-ethyl-1,4-pregnadiene-11β,17α,21-triol-3,20-dione 21-methane sulfonate, which upon reaction with sodium iodide in acetone is converted to 9α-fluoro-16β-ethyl-21-iodo-1,4-pregnadiene-11β,17α-diol-3,20-dione; the latter compound, upon reaction with sodium bisulfite in accordance with the procedure set forth hereinabove, is converted to 9α-fluoro-16β-ethyl-1,4-pregnadiene-11β,17α-diol-3,20-dione.

Similarly, 9α-fluoro-16β-propyl-1,4-pregnadiene-11β,17α,21-triol-3,20-dione is converted to 9α-fluoro-16β-propyl-1,4-pregnadiene-11β,17α,21-triol-3,20-dione 21-methane sulfonate, the latter is reacted with sodium iodide to produce 9α-fluoro-16β-propyl-21-iodo-1,4-pregnadiene-11β,17α-diol-3,20-dione, which is reacted with sodium bisulfite to form 9α-fluoro-16β-propyl-1,4-pregnadiene-11β,17α-diol-3,20-dione.

We claim:

1. The 17-oxygenated-pregnane having Δ⁴ unsaturation in ring A, a keto group at the 20-position, a member selected from the group consisting of nitrogen and oxygen at the 3-position, a member selected from the group consisting of hydrogen and halogen at the 9α-position, a member selected from the group consisting of keto and β-hydroxy at the 11-position, and characterized by the presence of a methyl substituent attached to the C–16 carbon atom.

2. A 17-oxygenated-pregnane as defined in claim 1, which is further characterized in that the 3-position member is keto and the unsaturation in ring A consists solely of a Δ⁴-double bond.

3. The 17-oxygenated pregnane having Δ¹,⁴-unsaturation in ring A, keto groups at the 3 and 20 positions, a member selected from the group consisting of hydrogen and halogen at the 9α-position, a member selected from the group consisting of keto and β-hydroxy at the 11-position, and characterized by the presence of a methyl substituent attached to the C–16 carbon atom.

4. A 17-oxygenated-pregnane as defined in claim 1, which is further characterized in that the 3-position member is keto, the 9α-position member is fluoro, the 11-position member is β-hydroxy, the 17α-position member is hydroxy and the unsaturation in ring A consists of Δ¹,⁴-double bonds.

5. A 17-oxygenated-pregnane as defined in claim 1, in which the methyl at C–16 is an α-methyl substituent.

6. A 17-oxygenated-pregnane as defined in claim 1, which has the chemical name 16α-methyl-1,4-pregnadiene-11β,17α,21-triol-3,20-dione.

7. A 17-oxygenated-pregnane as defined in claim 1, which has the chemical name 16α-methyl-1,4-pregnadiene-11β,17α,21-triol-3,20-dione 21-lower alkanoate.

8. A 17-oxygenated-pregnane as defined in claim 1, which has the chemical name 16α-methyl-1,4-pregnadiene-11β,17α,21-triol-3,20-dione 21-phosphate.

9. 16α-methyl-9α-fluoro-1,4-pregnadiene-11β,17α,21-triol-3,20-dione.

10. A 17-oxygenated-pregnane as defined in claim 1, which has the chemical name 16α-methyl-9α-fluoro-1,4-pregnadiene-11β,17α,21-triol-3,20-dione 21-lower alkanoate.

11. 16α-methyl-9α-fluoro-1,4-pregnadiene-11,17α,21-triol-3,20-dione 21-phosphate.

12. A 17-oxygenated-pregnane as defined in claim 1, which has the chemical name 16α-methyl-9α-fluoro-1,4-pregnadiene-11β,17α,21-triol-3,20-dione 21-(tertiary-butyl acetate).

13. A 17-oxygenated-pregnane as defined in claim 1, which has the chemical name 16α-methyl-9α-fluoro-1,4-pregnadiene-11β,17α,21-triol-3,20-dione 21-acetate.

14. A 17-oxygenated-pregnane as defined in claim 1, which has the chemical name 16α-methyl-4,6-pregnadiene-11β,17α,21-triol-3,20-dione.

15. A 17-oxygenated-pregnane as defined in claim 1, which has the chemical name 16α-methyl-4,6-pregnadiene-11β,17α,21-triol-3,20-dione 21-lower alkanoate.

16. A 17-oxygenated-pregnane as defined in claim 1, which has the chemical name 16α-methyl-4-pregnene-11β,17α,21-triol-3,20-dione 21-phosphate.

17. A 17-oxygenated-pregnane as defined in claim 1, which has the chemical name 16α-methyl-9α-fluoro-1,4-pregnadiene-11β,17α-diol-3,20-dione.

18. A 17-oxygenated-pregnane as defined in claim 1, which is further characterized as a 16-methyl-11,21-bis-oxygenated-1,4-pregnadiene-17α-ol-3,20-dione having the following formula:

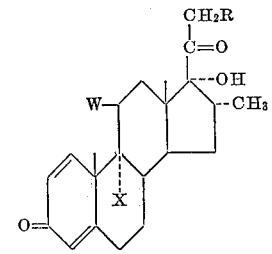

wherein X is selected from the group consisting of hydrogen and fluoro; W is selected from the group consisting of keto and β-hydroxy; and R is selected from the group consisting of hydroxy, phosphoryloxy and lower hydrocarbon carbonyloxy.

19. A 17-oxygenated-pregnane as defined in claim 1, which is further characterized as a 16-methyl-11,21-bis-oxygenated-4-pregnene-17α-ol-3,20-dione having the following formula:

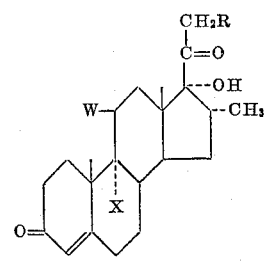

wherein X is selected from the group consisting of hydrogen and fluoro; W is selected from the group consisting of keto and β-hydroxy; and R is selected from the group consisting of hydroxy, phosphoryloxy and lower hydrocarbon carbonyloxy.

20. A 17-oxygenated-pregnane as defined in claim 1, which is further characterized as a 16-methyl-21- oxygenated - 9α - fluoro - 4 -pregnene-11β,17α-diol-3,20-dione having the following formula:

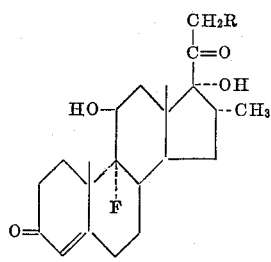

wherein R is selected from the group consisting of hydroxy, phosphoryloxy and lower hydrocarbon carbonyloxy.

21. A 17-oxygenated-pregnane as defined in claim 1, which is further characterized as a compound of the formula:

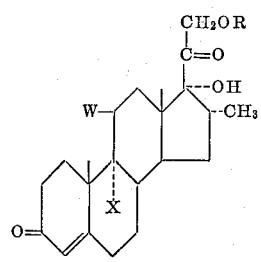

wherein X is selected from the group consisting of hydrogen and fluoro; W is selected from the group consisting of keto and β-hydroxy; and R is selected from the group consisting of hydrogen and lower alkanoyl.

22. A 17-oxygenated-pregnane as defined in claim 1, which is further characterized as a compound of the formula:

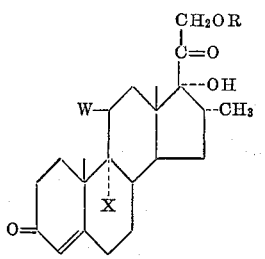

wherein X is selected from the group consisting of hydrogen and fluoro; W is selected from the group consisting of keto and β-hydroxy; and R is selected from the group consisting of hydrogen and lower alkanoyl.

23. A 17-oxygenated-pregnane as defined in claim 1, which has the chemical name 16α-methyl-9α-bromo-4-pregnene-11β,17α,21-triol-3,20-dione 21-lower alkanoate.

24. A 17-oxygenated-pregnane as defined in claim 1, which has the chemical name 16α-methyl-9α-chloro-4-pregnene-11β,17α,21-triol-3,20-dione 21-lower alkanoate.

25. The process that comprises reacting a 16-methyl-11,21-bis-oxygenated-4-pregnene-17α,-ol-3,20-dione compound having the following formula:

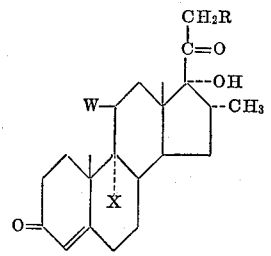

wherein X is selected from the group consisting of hydrogen and fluoro; W is selected from the group consisting of keto and β-hydroxy; and R is selected from the group consisting of hydroxy, phosphoryloxy and lower hydrocarbon carbonyloxy with selenium dioxide to produce the corresponding 16 - methyl-11,21-bis-oxygenated-1,4-pregnadiene-17α-ol-3,20-dione compound.

26. A process as defined in claim 25 in which the compound reacted with selenium dioxide is 16α-methyl-9α-fluoro-4-pregnene-11α,17α,21-triol-3,20-dione 21-acetate, and the product obtained is 16α-methyl-9α-fluoro-1,4-pregnadiene-11β,17α,21-triol-3,20-dione 21-acetate.

27. The process of preparing a 17-oxygenated pregnane as defined in claim 1, and having the chemical formula:

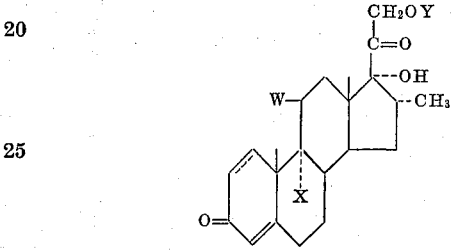

wherein Y is lower alkanoyl, X is selected from the group consisting of hydrogen and halogen, W is selected from the group consisting of keto and β-hydroxy, and having ring A unsaturation selected from the group consisting of Δ⁴ and Δ¹,⁴; which comprises reacting 16-pregnene-3α-ol-11,20-dione 3-lower alkanoate with a methyl Grignard thereby forming 16α-methyl-pregnane-3α-ol-11,20-dione 3-lower alkanoate; reacting the latter compound first with lower alkanoic anhydride followed by an organic peracid to form an intermediate 17,20-epoxy-20-enol alkanoate, and reacting this with a hydrolyzing agent to produce 16α-methyl-pregnane-3α,17α - diol-11,20-dione; reacting the last-named compound first with bromine to produce the corresponding 21-bromo derivative, and then with an alkali metal lower alkanoate to form 16α-methyl-pregnane-3α,17α,21-triol-11,20-dione 21-lower alkanoate; reacting this 21-lower alkanoate with an oxidizing agent to produce 16α-methyl-pregnane-17α,21-diol-3,11,20-trione 21-lower alkanoate; reacting the 16α-methyl-pregnane-17α,21-diol-3,11,20-trione 21-lower alkanoate with bromine followed by a dehydrohalogenating agent to produce a compound having the above-noted chemical formula wherein X is hydrogen; reacting the latter compound, after reduction of the 11-ketone to hydroxy, with a dehydrating agent to form the corresponding Δ⁹⁽¹¹⁾ derivative; reacting the Δ⁹⁽¹¹⁾ derivative with hypobromous acid, followed by a base, to form the 9β,11β-epoxide; and finally reacting this 9β,11β-epoxide with hydrohalic acid to form a compound having the above-noted chemical formula wherein X is halogen.

References Cited

UNITED STATES PATENTS 3,135,774  6/1964  Nathansohn et al. __ 260—397.45

ELBERT L. ROBERTS, *Primary Examiner.*